US012644899B2

(12) United States Patent
Deinum et al.

(10) Patent No.: US 12,644,899 B2
(45) Date of Patent: Jun. 2, 2026

(54) AUTOMATED SPECIMEN PROCESSING SYSTEMS AND METHODS

(71) Applicant: BD KIESTRA B.V., Drachten (NL)

(72) Inventors: Jorn Deinum, Stiens (NL); Johannes Anne Bruinsma, Drachten (NL); Gerard Henstra, Buitenpost (NL); Jan Bart Van Der Vijver, Groningen (NL); Paul Jean Marc Gielen, Leeuwarden (NL); Maarten Rijken, Drachten (NL); Jurjen Sinnema, Joure (NL)

(73) Assignee: BD KIESTRA B.V., Drachten (NL)

( * ) Notice: Subject to any disclaimer, the term of this patent is extended or adjusted under 35 U.S.C. 154(b) by 869 days.

(21) Appl. No.: 17/910,447

(22) PCT Filed: Mar. 11, 2021

(86) PCT No.: PCT/EP2021/056159
§ 371 (c)(1),
(2) Date: Sep. 9, 2022

(87) PCT Pub. No.: WO2021/180836
PCT Pub. Date: Sep. 16, 2021

(65) Prior Publication Data
US 2023/0133241 A1      May 4, 2023

Related U.S. Application Data

(60) Provisional application No. 62/988,171, filed on Mar. 11, 2020.

(51) Int. Cl.
*G01N 35/04*      (2006.01)
*G01N 35/00*      (2006.01)

(52) U.S. Cl.
CPC ....... *G01N 35/04* (2013.01); *G01N 35/00871* (2013.01); *G01N 2035/0405* (2013.01);
(Continued)

(58) Field of Classification Search
CPC ............. G01N 35/04; G01N 35/00871; G01N 2035/0405; G01N 2035/0425; G01N 2035/0491; C12M 99/00; C12M 23/48
See application file for complete search history.

(56) References Cited

U.S. PATENT DOCUMENTS 630,187 A      8/1899    Cunningham
636,245 A    11/1899    Cunningham
(Continued)

FOREIGN PATENT DOCUMENTS

CN      107815395 A      3/2018
CN      108466843 A      8/2018
(Continued)

OTHER PUBLICATIONS

Chinese First Office Action issued in CN application No. 202180028290.9 on Jun. 21, 2025, pp. 30.
(Continued)

*Primary Examiner* — John Mcguirk
(74) *Attorney, Agent, or Firm* — Botos Churchill IP Law LLP

(57)      ABSTRACT

The present disclosure describes automated systems and methods for handling objects, such as culture plates or dishes. For example, in one embodiment, the present disclosure describes an automated stacker and de-stacker comprising a clamping mechanism, a lift pad, a pair of pins, and a cabinet. A stack of culture plates may be stored in the cabinet. During a stacking operation, the pair of pins may be raised to stop a culture plate traveling along a conveyor track. Once stopped, the culture plate may be raised above the conveyor track by the lift pad and clamped by the clamping mechanism. During a de-stacking operation, the clamping mechanism may be opened, and the culture plate may be lowered onto the conveyor track by the lift pad.

15 Claims, 66 Drawing Sheets

(52) U.S. Cl.
CPC .............. *G01N 2035/0425* (2013.01); *G01N 2035/0491* (2013.01)

(56) References Cited

U.S. PATENT DOCUMENTS

| | | | |
|---|---|---|---|
| 1,330,964 | A | 2/1920 | Wheelwright |
| 1,866,369 | A | 7/1932 | Podel |
| 2,453,545 | A | 11/1948 | Justin |
| 2,553,683 | A | 5/1951 | Smith |
| 2,770,392 | A | 11/1956 | Roberts |
| 3,289,861 | A | 12/1966 | Carle |
| 3,702,103 | A | 11/1972 | Price |
| 3,752,361 | A | 8/1973 | VanLinder et al. |
| 3,869,048 | A | 3/1975 | Takahashi |
| 3,908,341 | A | 9/1975 | Conti |
| 3,920,152 | A | 11/1975 | Shields |
| 4,013,179 | A | 3/1977 | Fluck |
| 4,043,460 | A | 8/1977 | Steele |
| 4,431,404 | A | 2/1984 | Cobb et al. |
| 4,457,665 | A | 7/1984 | Fluck |
| 4,709,912 | A | 12/1987 | Illig |
| 4,718,808 | A | 1/1988 | Hoshino |
| 4,809,881 | A | 3/1989 | Becker |
| 4,865,515 | A | 9/1989 | Domer |
| 5,105,980 | A | 4/1992 | Hofmann |
| 5,788,114 | A | 8/1998 | Perego |
| 5,842,598 | A | 12/1998 | Tsuchida |
| 6,193,102 | B1 | 2/2001 | Bevirt |
| 2010/0035338 | A1 | 2/2010 | Bruno et al. |
| 2015/0023773 | A1 | 1/2015 | Redman |
| 2018/0099823 | A1 | 4/2018 | Lizzi et al. |

FOREIGN PATENT DOCUMENTS

| | | | |
|---|---|---|---|
| CN | 109312283 | A | 2/2019 |
| DE | 202014102945 | U1 | 7/2014 |
| EP | 1267203 | A2 | 12/2002 |
| EP | 3228694 | A1 | 10/2017 |
| JP | S58113035 | A | 7/1983 |
| JP | H01109264 | A | 4/1989 |
| JP | H09156640 | A | 6/1997 |
| JP | 2001188044 | A * | 7/2001 |
| JP | 2003176028 | A | 6/2003 |
| JP | 2014152027 | A | 8/2014 |
| WO | 0066467 | A1 | 11/2000 |
| WO | 2010016860 | A2 | 2/2010 |
| WO | 2016183441 | A1 | 11/2016 |
| WO | 2020011875 | A1 | 1/2020 |

OTHER PUBLICATIONS

Wu Fushun, "Design of specialized machinery for vehicle construction" Beijing: China Railway Publishing House, Mar. 31, 1987, 175.
Japanese Office Action issued in corresponding JP Application No. 2022-554471 on Dec. 24, 2024 pp. 9.
International Search Report and Written Opinion for International Application No. PCT/EP2021056159 dated Jul. 22, 2021 (20 pp.).
International Search Report and Written Opinion from International Application No. PCT/US2016/032352 mailed Jul. 22, 2016, (10 pp.).
SciRobotics PetriSel Video—Automated Petri Dish Carousel from SciRobotics, (2013).
Systec MediaFill Video—Systec Mediaprep & Systec Mediafill (culture media sterilizer & automated petri-dish plate-pourer), (2015).
APS One "The Only One all in One Automated Pourer Stacker" A New Standard of Petri Dishes—bioMérieux Pioneering Diagnostics Brochure., (2015), pp. 8.
Systec MediaFill Brochure—Prepare, sterilize and dispense culture media., (2017), pp. 24.
Integra Media Jet Manual, MEDIAJET—Operating Instructions V09. Integra Biosciences AG, (2017), pp. 66.
SciRobotics PetriSel Website—PetriSel™: Petri-Dish Carousel Add-On for Tecan Robots. http://www.scirobotics.com/products/petrisel, (2018), p. 1.
Sarstedt POS 720 Website—Petri Dish Organisation System © 2018—Sarstedt AG & Co. KG, (2018), pp. 2.
Integra MediaJet Operating Instructions—INTEGRA Biosciences. https://www.integra-biosciences.com/united-states/en/media-preparation/mediajet, Nov. 5, 2012.
Croxatto, Antony , et al., "Laboratory automation in clinical bacteriology: what system to choose?", Clin. Microbiol. Infect. vol. 22, No. 3, Mar. 2016, 217-235.
Novak, Susan M., et al., "Automation in the Clinical Microbiology Laboratory", (2013), pp. 567-588.
Japanese Office Action issued in JP application No. 2022-554471 on Aug. 26, 2025, pp. 6.
Decision on Rejection issued in JP application No. 2022-554471 on Jan. 23, 2026, pp. 8.

* cited by examiner

SECTION A–A

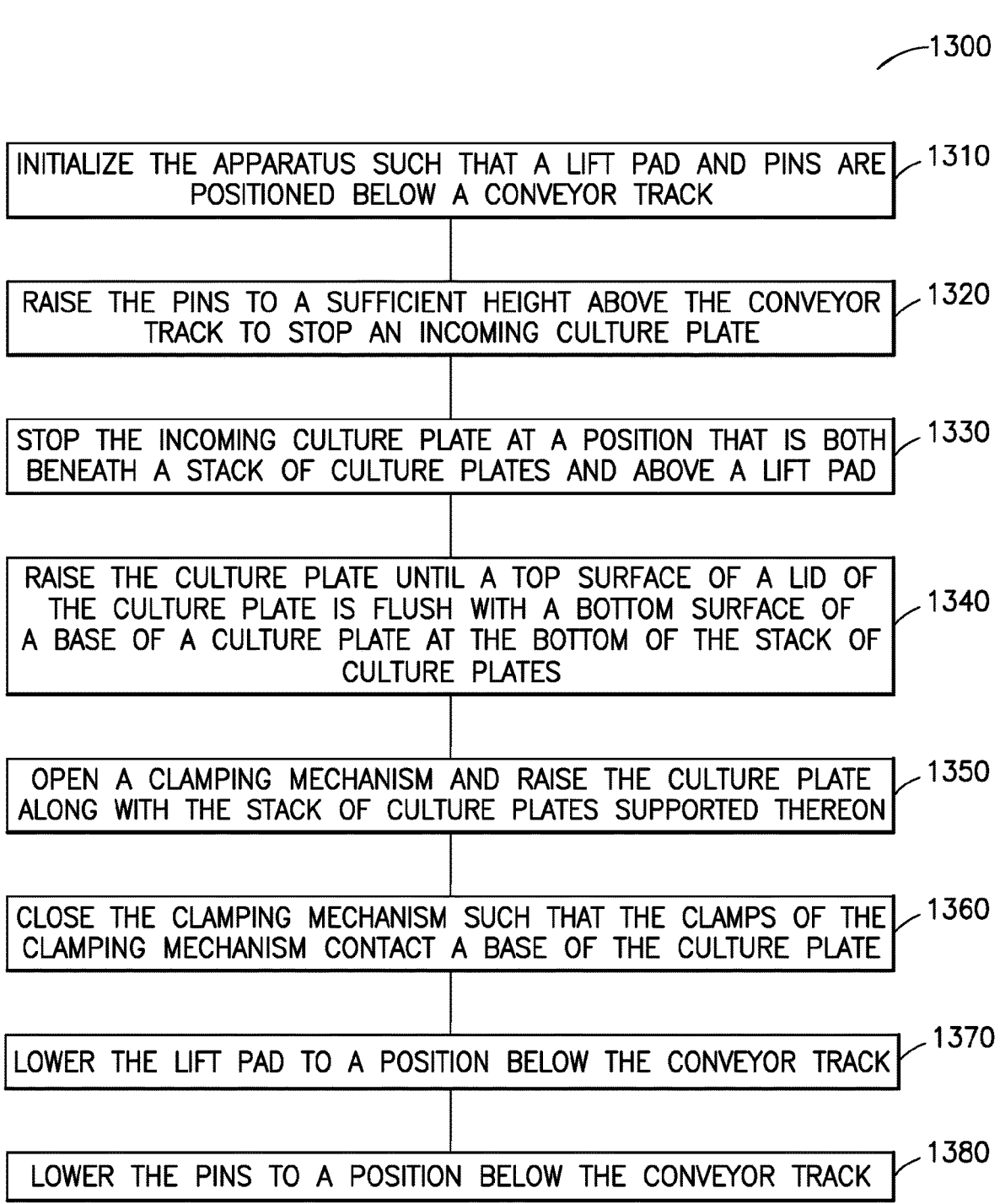

1300

INITIALIZE THE APPARATUS SUCH THAT A LIFT PAD AND PINS ARE POSITIONED BELOW A CONVEYOR TRACK — 1310

RAISE THE PINS TO A SUFFICIENT HEIGHT ABOVE THE CONVEYOR TRACK TO STOP AN INCOMING CULTURE PLATE — 1320

STOP THE INCOMING CULTURE PLATE AT A POSITION THAT IS BOTH BENEATH A STACK OF CULTURE PLATES AND ABOVE A LIFT PAD — 1330

RAISE THE CULTURE PLATE UNTIL A TOP SURFACE OF A LID OF THE CULTURE PLATE IS FLUSH WITH A BOTTOM SURFACE OF A BASE OF A CULTURE PLATE AT THE BOTTOM OF THE STACK OF CULTURE PLATES — 1340

OPEN A CLAMPING MECHANISM AND RAISE THE CULTURE PLATE ALONG WITH THE STACK OF CULTURE PLATES SUPPORTED THEREON — 1350

CLOSE THE CLAMPING MECHANISM SUCH THAT THE CLAMPS OF THE CLAMPING MECHANISM CONTACT A BASE OF THE CULTURE PLATE — 1360

LOWER THE LIFT PAD TO A POSITION BELOW THE CONVEYOR TRACK — 1370

LOWER THE PINS TO A POSITION BELOW THE CONVEYOR TRACK — 1380

FIG.13

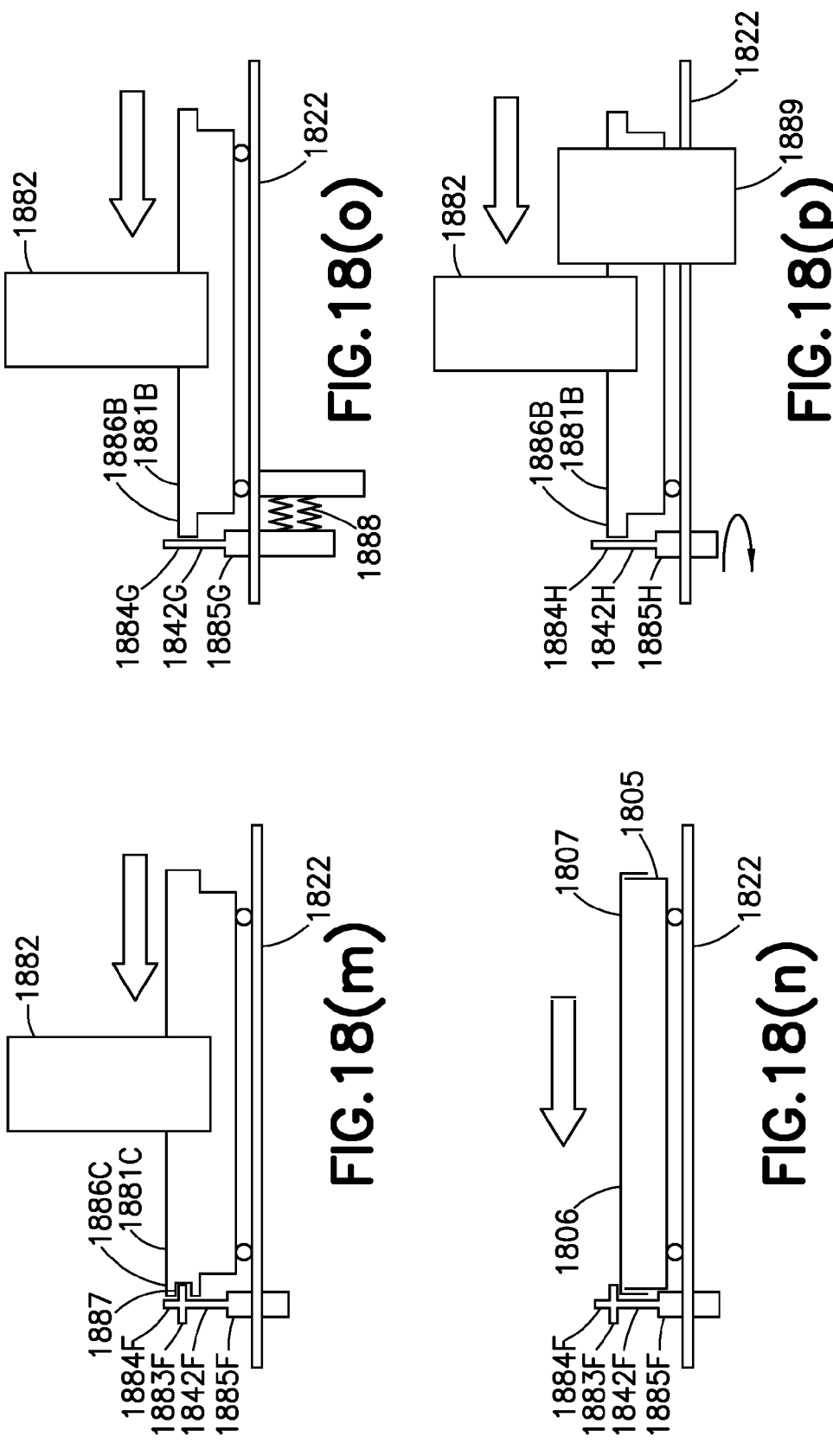

1906

1943    1941        1944  1901   1922

1906        1943        1922        1901

B                                        B 1941        1924

2200

2290

2241

2291

2292

2295

2290

2293

2294

2296

2297

2241

AUTOMATED SPECIMEN PROCESSING SYSTEMS AND METHODS

CROSS REFERENCE TO RELATED APPLICATIONS

The present application is a national phase entry under 35 U.S/C. § 371 of International Application No. PCT/EP2021/056159, filed Mar. 11, 2021, published in English, which application claims the benefit of filing date of U.S. Provisional Application No. 62/988,171, filed on Mar. 11, 2020, the disclosures of which are incorporated by reference herein.

TECHNICAL FIELD

Aspects of the present technology relate to automated systems and methods for handling objects, such as culture plates or dishes.

BACKGROUND

Biological samples such as body fluids (e.g., blood, urine, etc.) water samples, food samples, soil samples, etc. are frequently tested for the presence or absence of microorganisms (e.g., bacteria, fungi, etc.). Such tests typically require the samples to be combined with nutrient media to cultivate the growth of a sufficient amount of microorganisms in the sample to allow for reliable detection. Testing samples for evidence of microbial growth has historically been a manual process. Lab technicians will prepare culture plates, inoculate them with a sample, place the inoculated plates in an incubator, and periodically check the plates for the growth of colonies of bacteria. When there is evidence of microbial growth, a lab technician will manually pick a portion of a colony for further analysis. To prepare the picked colony for further analysis, the lab technician typically combines the picked colony with a solution to create a suspension for downstream testing. Such downstream testing is used to determine, for example, the type of microorganism and/or the antibiotic susceptibilities and resistances of the microorganisms. These process steps are also often done manually, requiring significant numbers of technicians to prepare such samples in large laboratories with high throughput.

As a result, automated specimen processing systems, such as Becton, Dickinson and Company's BD Kiestra™ Total Lab Automation (TLA) system, have been developed to enhance the efficiency of clinical microbiology laboratories. Presently, the BD Kiestra TLA system has several distinct modules, such as the SorterA (a module for media storage and distribution), the BarcodA (a module for barcoding culture plates), the InoqulA™+ (a module for initial specimen processing and inoculation), the ReadA Compact (a module for specimen incubation and imaging), and the ErgonomicA (a workbench). All of these modules are linked together by the two-way ProceedA conveyor system. The number of these modules can be adapted to the requirements of a clinical laboratory to provide a complete lab automation solution. Additional examples of automated specimen processing systems are described in Susan M. Novak & Elizabeth M. Marlowe, *Automation in the Clinical Microbiology Laboratory,* 33 Clinics in Laboratory Medicine 567 (2013) and A. Croxatto et al., *Laboratory Automation in Clinical Bacteriology: What System to Choose?,* 22 Clinical Microbiology and Infection 217 (2016), both of which are incorporated herein by reference.

Within these types of automated systems, two recurring operations for handling culture plates are stacking and de-stacking. For example, culture plates may be delivered to one or more output stacks and picked up manually by a lab technician for follow-up work. In the BD Kiestra TLA system, stackers and de-stackers can be found in the SorterA, the ReadA Compact, and the ErgonomicA modules.

In many automated specimen processing systems, pneumatic actuators are used for stacking and de-stacking. However, such systems require an air compressor, which can be expensive to purchase, run, and maintain. Furthermore, an air compressor capable of providing a sufficient quantity of compressed air to one or more automated specimen processing systems may be quite loud. Thus, a need exists for stackers and de-stackers that are capable of reliably stacking and de-stacking culture plates without the use of compressed air.

BRIEF SUMMARY

The present disclosure describes automated systems and methods for handling objects, such as culture plates or dishes. For example, in one embodiment, the present disclosure describes an automated stacker and de-stacker comprising a clamping mechanism, a lift pad, a pair of pins, and a cabinet. A stack of culture plates may be stored in the cabinet. During a stacking operation, the pair of pins may be raised to stop a culture plate traveling along a conveyor track. Once stopped, the culture plate may be raised above the conveyor track by the lift pad and clamped by the clamping mechanism. During a de-stacking operation, the clamping mechanism may be opened, and the culture plate may be lowered onto the conveyor track by the lift pad. Advantageously, in some embodiments, the automated stackers and de-stackers described herein may be implemented with one or more electric actuators, which may be cheaper to purchase, run, and maintain than pneumatic actuators. Furthermore, the one or more electric actuators may also produce less noise than pneumatic actuators.

One aspect of the present disclosure relates to an automated stacker and de-stacker comprising a lift pad, a clamping mechanism comprising two or more clamps, and one or more processors for controlling the lift pad and the clamping mechanism. The one or more processors are configured to control the lift pad and the clamping mechanism to stack a first culture plate by: raising the lift pad along with the first culture plate resting atop the lift pad until a top surface of a lid of the first culture plate touches or is proximate to a bottom surface of a base of a second culture plate at the bottom of a first stack of culture plates, opening the clamping mechanism, further raising the lift pad along with the first culture plate and the first stack of culture plates supported thereon, and closing the clamping mechanism such that the two or more clamps contact a base of the first culture plate. The one or more processors are also configured to control the lift pad and the clamping mechanism to de-stack a third culture plate by: raising the lift pad until a top surface of the lift pad touches or is proximate to a bottom surface of a base of the third culture plate, opening the clamping mechanism, lowering the lift pad along with the third culture plate and a second stack of culture plates supported thereon, closing the clamping mechanism such that the two or more clamps contact a base of a fourth culture plate within the second stack of culture plates and that is resting atop a lid of the third culture plate, and further lowering the lift pad to separate the third culture plate from the second stack of culture plates.

In some embodiments, a force applied to the first and fourth culture plates by the clamping mechanism after it closes is small enough to permit the first and fourth culture plates to slide downwards until the lid of the first culture plate and a lid of the fourth culture plate contacts the two or more clamps. In some embodiments, each of the two or more clamps of the clamping mechanism comprise two edges positioned at an angle between 80 and 160 degrees relative to each other, and wherein each of the edges contact the bases of the first and fourth culture plates at different contact points.

In some embodiments, the automated stacker and de-stacker is incorporated into an automated specimen processing system that also includes a conveyor system comprising a track configured to transport culture plates to and from the automated stacker and de-stacker. In such embodiments, the further lowering of the lift pad to separate the third culture plate from the second stack of culture plates comprises lowering the lift pad to a position beneath the track and consequently placing the third culture plate on the track. In some embodiments, the lift pad comprises a shield configured to stop other culture plates traveling along the track while the lift pad is raised above the track.

In some embodiments, the automated stacker and de-stacker is in cooperative communication with a stopping mechanism comprising one or more pins. In such embodiments, the one or more processors of the automated stacker and de-stacker are further configured to control the one or more pins for stacking the first culture plate by raising the one or more pins above the track to stop the first culture plate from continuing to travel along the track at a position above the lift pad. In such embodiments, the one or more processors of the automated stacker and de-stacker are further configured to control the one or more pins for de-stacking the third culture plate by lowering the one or more pins below the track to permit the third culture plate to travel along the track. In some embodiments, at least one motor is coupled to the one or more pins and the lift pad such that the one or more processors can control the one or more pins and the lift pad by controlling the at least one motor. In some embodiments, the one or more pins contact the base of the first culture plate, but not the lid of the first culture plate, when stopping the first culture plate from continuing to travel along the track.

In some embodiments, the automated stacker and de-stacker is in cooperative communication with a flipper stopper comprising at least one flipper having two or more edges separated by a bend. In such embodiments, the one or more processors of the automated stacker and de-stacker are further configured to control the flipper stopper for stacking the first culture plate by rotating the at least one flipper to stop the first culture plate as it travels along the track at a position above the lift pad. In such embodiments, the one or more processors of the automated stacker and de-stacker are further configured to control the flipper stopper for de-stacking the third culture plate by rotating the at least one flipper to permit the third culture plate to travel along the track. In some embodiments, the at least one flipper is rotated by a pair of actuators when the pair of actuators apply opposing forces to separate portions of the flipper. In some embodiments, the at least one flipper is rotated by a moving magnet actuator. In some embodiments, the at least one flipper is coupled to a shaft disposed in a slot defined in a housing or a guide structure.

Another aspect of the present disclosure relates to a method comprising: positioning a first culture plate beneath a stack of culture plates and above a lift pad, raising the lift pad along with the first culture plate resting atop the lift pad until a top surface of a lid of the first culture plate touches or is proximate to a bottom surface of a base of a second culture plate at the bottom of the stack of culture plates, opening the clamping mechanism, further raising the lift pad along with the first culture plate and the stack of culture plates supported thereon, and closing the clamping mechanism such that two or more clamps of the clamping mechanism contact a base of the first culture plate.

In some embodiments, a force applied to the first and fourth culture plates by the clamping mechanism after it closes is small enough to permit the first culture plate to slide downwards until the lid of the first culture plate contacts the two or more clamps.

In some embodiments, the method further comprises: raising the lift pad until a top surface of the lift pad touches or is proximate to a bottom surface of a base of a third culture plate, opening the clamping mechanism a second time, lowering the lift pad along with the third culture plate and a second stack of culture plates supported thereon, closing the clamping mechanism such that the two or more clamps contact a base of a fourth culture plate within the second stack of culture plates, wherein the fourth culture plate is resting atop a lid of the third culture plate, and further lowering the lift pad to separate the third culture plate from the second stack of culture plates.

Yet another aspect of the present disclosure relates to a method comprising: raising a lift pad until a top surface of the lift pad touches or is proximate to a bottom surface of a base of a first culture plate at the bottom of a stack of culture plates, opening a clamping mechanism, lowering the lift pad along with the first culture plate and the stack of culture plates supported thereon, closing the clamping mechanism such that the two or more clamps contact a base of a second culture plate within the stack of culture plates, wherein the second culture plate is resting atop a lid of the first culture plate, and further lowering the lift pad to separate the first culture plate from the stack of culture plates.

Yet another aspect of the present disclosure relates to a stopping mechanism comprising one or more pins and one or more processors for controlling the one or more pins, wherein the one or more processors are configured to raise the one or more pins above a track of a conveyor system to stop an object from continuing to travel along the track, and lower the one or more pins below the track to permit the object to travel along the track.

Yet another aspect of the present disclosure relates to a stopping mechanism comprising a platform hingedly engaged with a pin and one or more processors for controlling the platform, wherein the one or more processors are configured to rotate the platform about the pin in a first direction to stop an object from continuing to travel along a track of a conveyor system, and rotate the platform about the pin in a second direction opposite the first direction to permit the object to travel along the track.

Yet another aspect of the present disclosure relates to a stopping mechanism comprising at least one flipper having two or more edges separated by a bend and one or more processors for controlling the at least one flipper, wherein the one or more processors are configured to rotate the at least one flipper in a first direction to stop an object from continuing to travel along a track of a conveyor system, and rotate the at least one flipper in a second direction opposite the first direction to permit the object to travel along the track.

Yet another aspect of the present disclosure relates to a transfer mechanism comprising an arm having a first end and a second end, a pivot joint positioned at the first end of the arm, a post positioned at the second end of the arm, and one or more processors for controlling the arm, wherein the one or more processors are configured to rotate the arm about the pivot joint in a first direction to stop, with the post, an object from continuing to travel along a first track of a conveyor system, and rotate the arm about the pivot joint in a second direction opposite the first direction to push, with the post, the object from the first track to a second track of the conveyor system.

BRIEF DESCRIPTION OF DRAWINGS

FIGS. 2(a)-2(c) illustrate different side-views of the conveyor system. FIG. 2(d) illustrates a top-view of the conveyor system. FIGS. 2(e)-2(g) illustrate different cross-sections of the conveyor system.

FIG. 11(a) illustrates a side-view of the automated stacker and de-stacker. FIG. 11(b) illustrates a side-view of a lift mechanism of the automated stacker and de-stacker. FIG. 11(c) illustrates a side-view of a clamping mechanism of the automated stacker and de-stacker. FIG. 11(d) illustrates a side-view of a linear actuator of the automated stacker and de-stacker. FIG. 11(e) illustrates a side-view of a pair of pins of the automated stacker and de-stacker. FIG. 11(f) illustrates a cross-section of the automated stacker and de-stacker when the lift mechanism is raised.

FIG. 13 illustrates a method for stacking that may be performed by an automated stacker and de-stacker that may be integrated into an automated specimen processing system.

FIG. 11(a) illustrates a side-view of the automated stacker and de-stacker integrated with a conveyor system. FIG. 11(b) illustrates a side-view of the automated stacker and de-stacker. FIGS. 17(c) and 17(d) illustrate different side views of a clamping mechanism of the automated stacker and de-stacker. FIGS. 17(e) and 17(f) illustrate different side views of a lift mechanism of the automated stacker and de-stacker. FIGS. 17(g) and 17(h) illustrate different side views of a pair of pins of the automated stacker and de-stacker. FIGS. 17(i)-17(k) illustrate different potential states of the lift mechanism and the pair of pins of the automated stacker and de-stacker.

FIGS. 18(a)-18(d) and 18(e) illustrate a first stopping mechanism. FIG. 18(a) illustrates a side view of the first stopping mechanism. FIG. 18(b) illustrates a top view of the first stopping mechanism. FIGS. 18(c) and 18(e) illustrate different cross-sections of the first stopping mechanism. FIGS. 18(d) and 18(f) illustrate different cross-sections of a second stopping mechanism. FIGS. 18(g) and 18(h) illustrate different cross-sections of a third stopping mechanism. FIGS. 18(m) and 18(n) illustrate different cross-sections of a sixth stopping mechanism. FIG. 18(o) illustrates a cross-section of a seventh stopping mechanism. FIG. 18(p) illustrates a cross-section of an eighth stopping mechanism. FIG. 18(q) illustrates a top view of a ninth stopping mechanism.

FIGS. 19(a)-19(d) illustrate different cross-sections of the stopping mechanism. FIG. 19(e) illustrates a top view of the stopping mechanism.

In FIGS. 22(b) and 22(c), a portion of a housing of the flipper stopper has been removed.

FIG. 23(a) illustrates a side-view of the flipper stopper integrated with a conveyor system. FIG. 23(b) illustrates a side-view of the flipper stopper without a portion of a housing of the flipper stopper. FIG. 23(c) illustrates a side-view of the flipper stopper without the housing.

FIG. 28(*b*) illustrates the two-way highway module of FIG. 28(*a*) with an automated output stacker. FIG. 28(*c*) illustrates the two-way highway module of FIG. 28(*a*) with an automated stacker and de-stacker. FIG. 28(*d*) illustrates a one-way highway module. FIG. 28(*e*) illustrates a 90-degree turn module, a T-intersection module, and a 180-degree turn module. FIG. 28(*f*) illustrates a shortcut module.

DETAILED DESCRIPTION

Figures 1A, 1B:
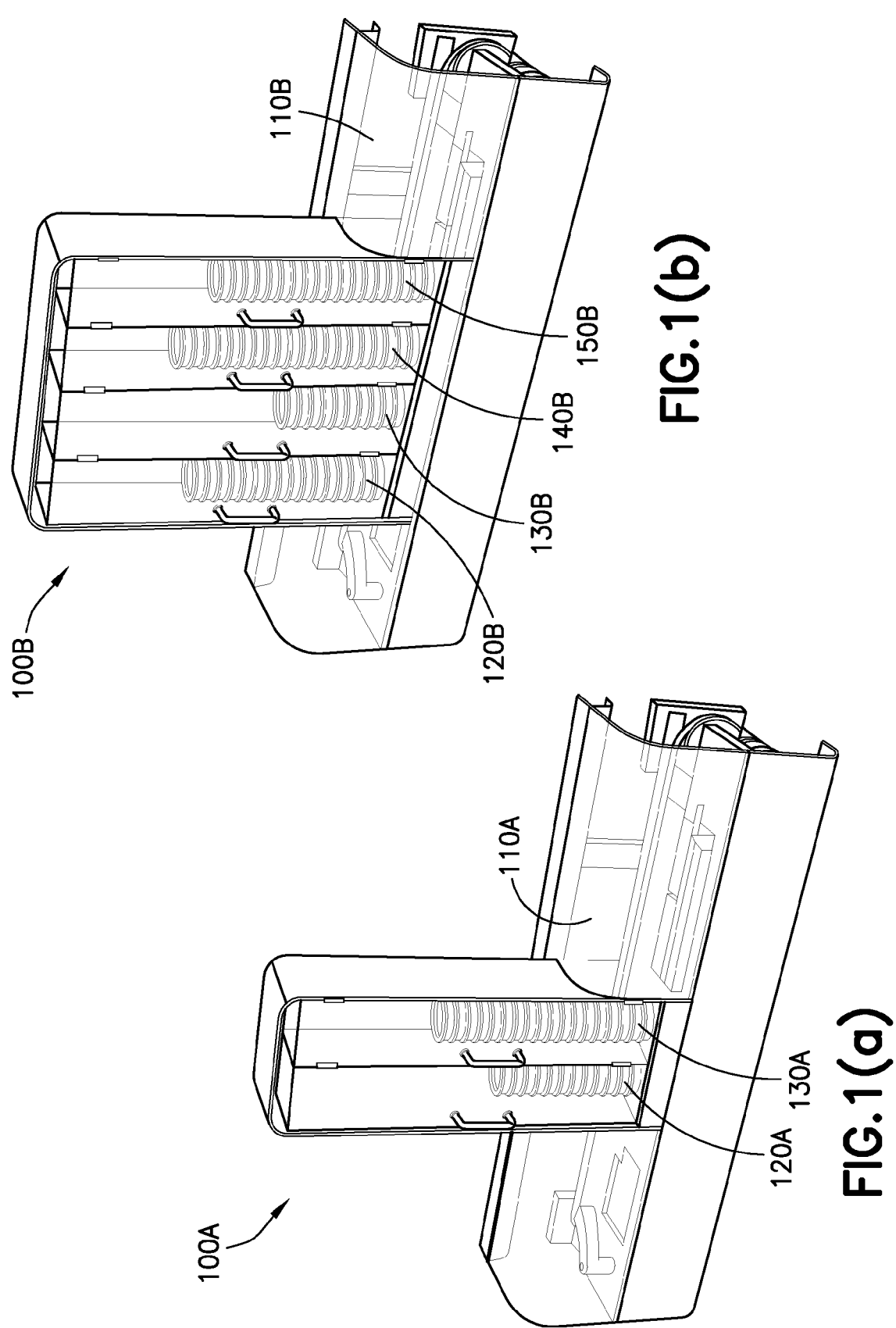
FIGS. 1(a) and 1(b) illustrate two different modules that may be integrated into an automated specimen processing system.
Figures 2A, 2B:
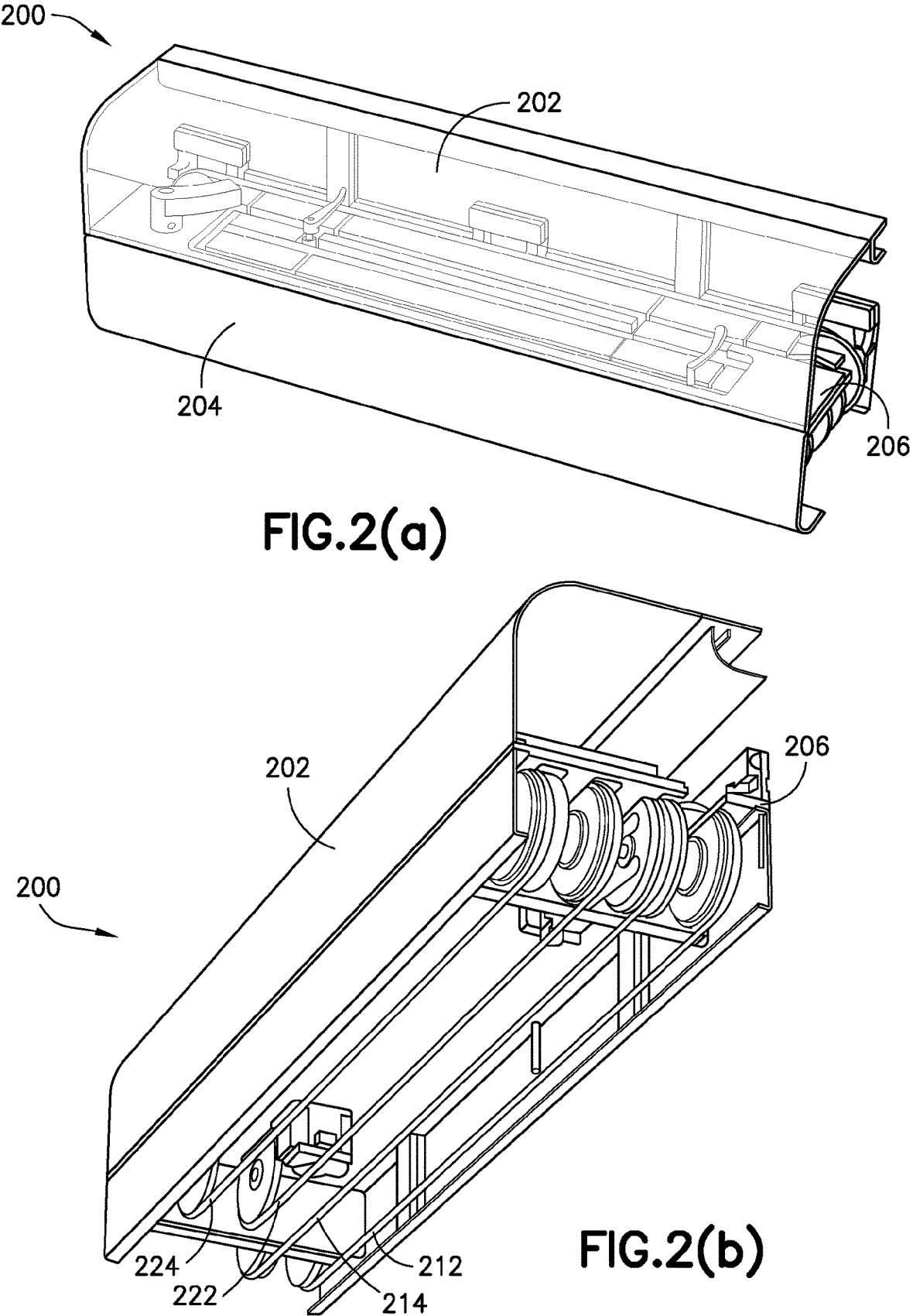
FIGS. 2(a)-2(g) illustrate a conveyor system that may be integrated into an automated specimen processing system. More specifically.
Figure 2C:
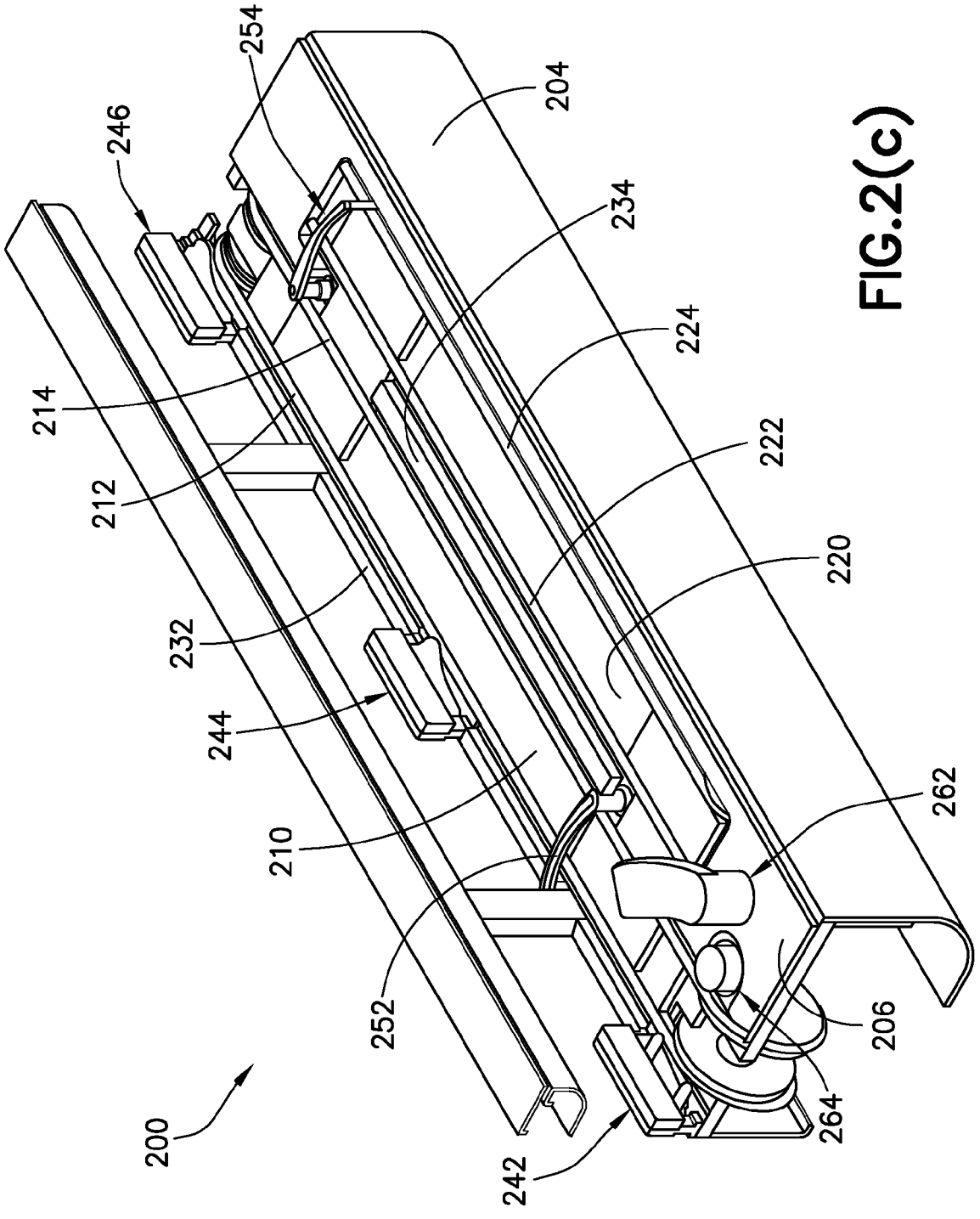
Figures 2D, 2E:
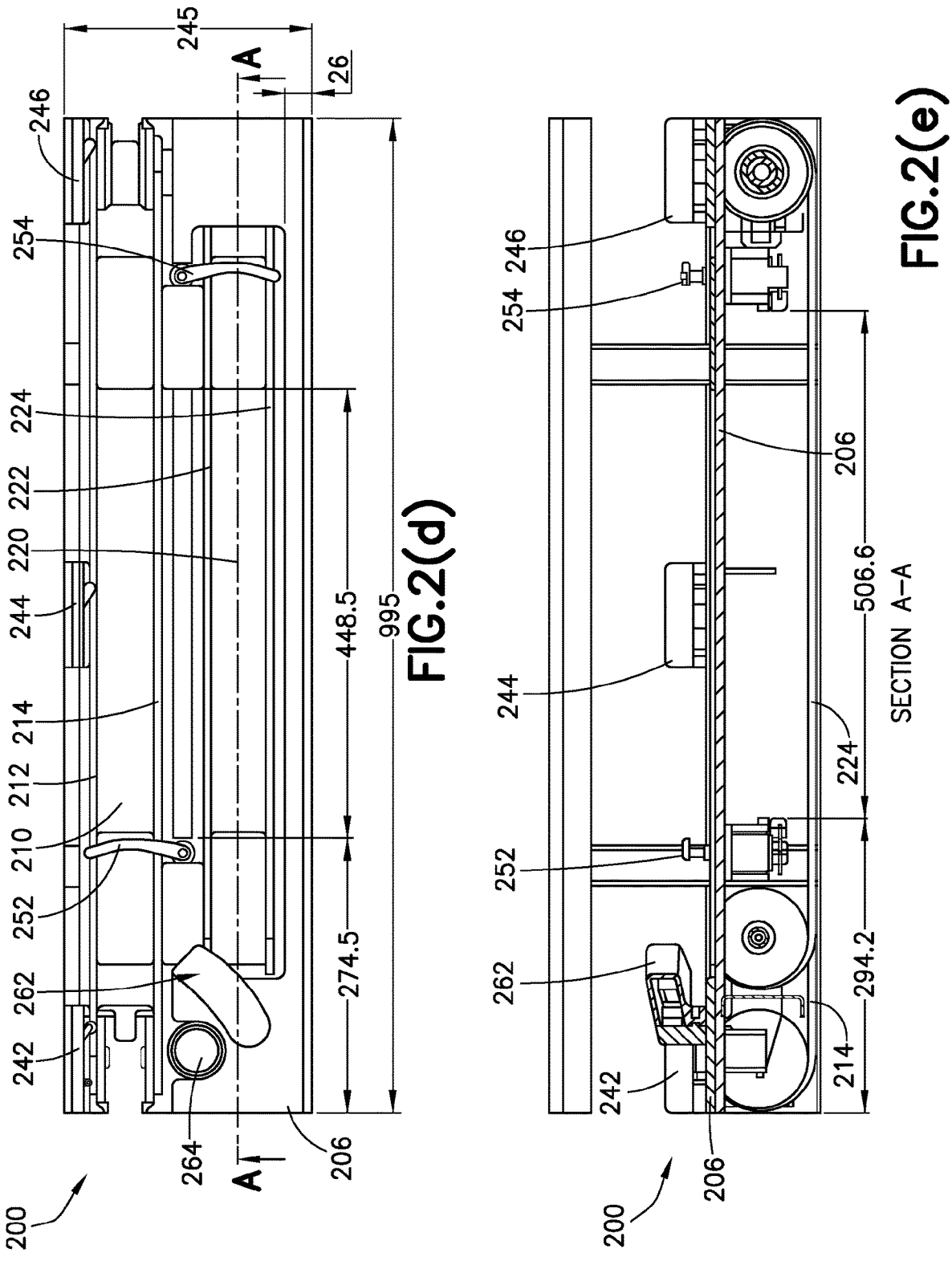
Figure 2F:
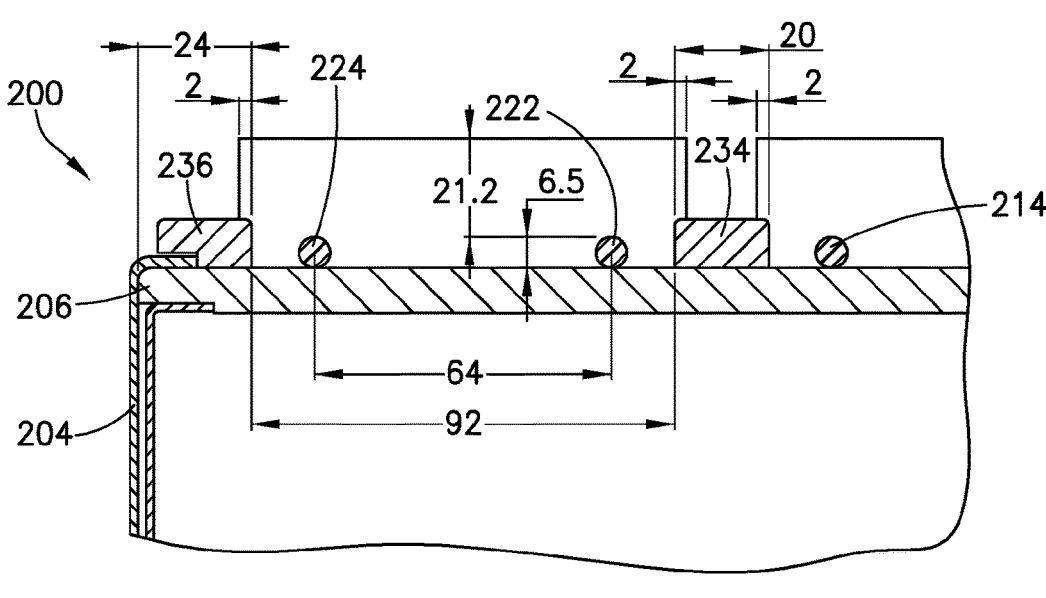
Figure 2G:
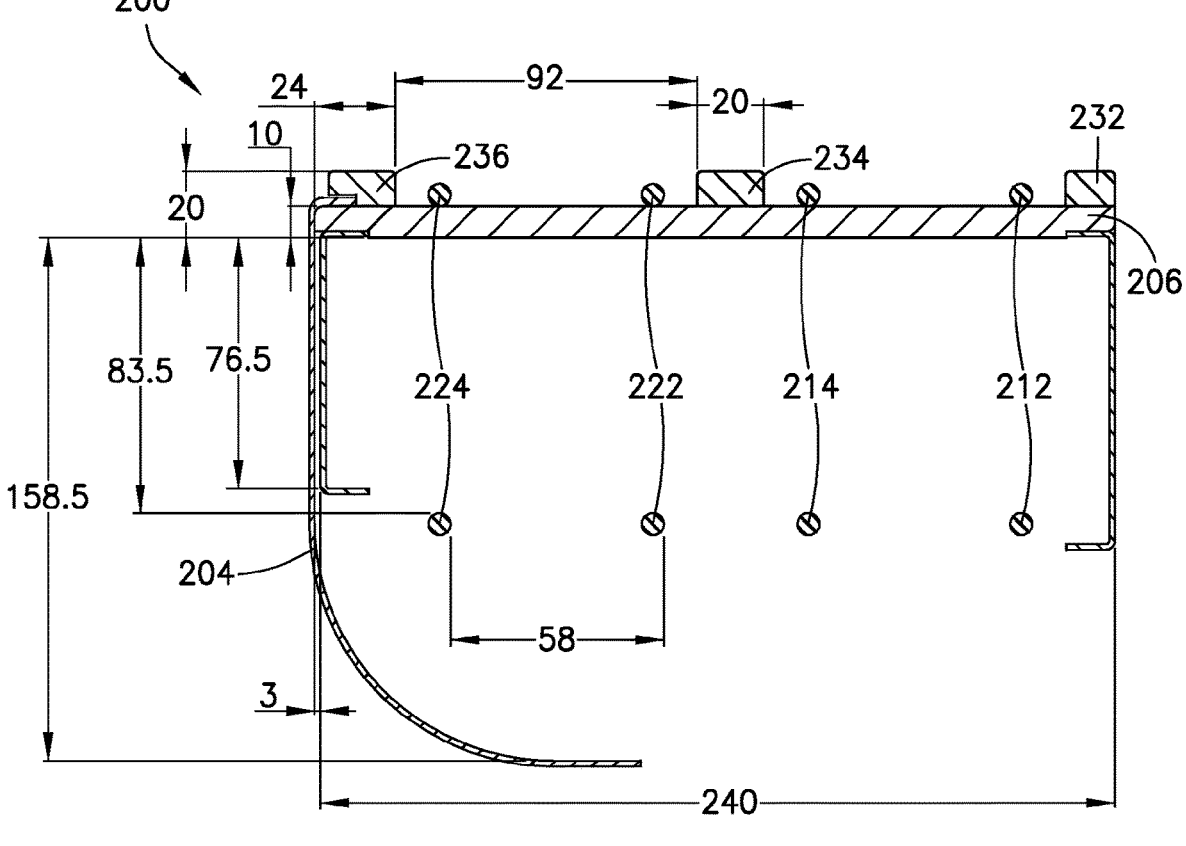

Embodiments of the present disclosure are described in detail with reference to the figures wherein like reference numerals identify similar or identical elements. Many of the figures are drawn to scale. In such instances, measurements are provided in millimeters. However, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

FIG. 1(*a*) illustrates a module 100A that may be integrated into an automated specimen processing system (e.g., the BD Kiestra TLA system). As shown, module 100A includes a conveyor system 110A and cabinets 120A and 130A. Cabinets 120A and 130A may each contain a stack of culture plates. Furthermore, automated stackers and de-stackers may be positioned beneath cabinets 120A and 130A under the stacks of culture plates. In other embodiments, the number of cabinets and/or automated stackers and de-stackers may be varied. For example, as shown in FIG. 1(*b*), a module 100B may include four separate cabinets for housing stacks of culture plates. Moreover, separate stackers and de-stackers may be positioned beneath each of these cabinets. As shown, module 100B includes a conveyor system 110B and cabinets 120B, 130B, 140B, and 150B. In some embodiments, an automated specimen processing system may include multiple modules (e.g., module 100A or 100B). For example, in some embodiments, module 100A and 100B may be positioned adjacently such that culture plates may exit module 100A and immediately enter module 100B.

FIGS. 2(*a*)-2(*g*) illustrate various views of a conveyor system 200 that may, for example, be integrated into modules 100A and 100B of FIGS. 1(*a*)-1(*b*). More specifically, FIGS. 2(*a*)-2(*c*) illustrate three-dimensional renderings of conveyor system 200 and FIGS. 2(*d*)-2(*g*) are scaled drawings that include measurements in millimeters. In other embodiments, the dimensions of conveyor system 200 may be modified. As shown, conveyor system 200 includes top cover 202, bottom cover 204, stage 206, main track 210, side track 220, beam 232, beam 234, beam 236, stopping mechanism 242, stopping mechanism 244, stopping mechanism 246, off-ramp catcher 252, on-ramp catcher 254, scanner 262, and scanner drive 264. Main track 210 includes belt 212 and 214. Side track 220 includes belt 222 and 224. In some of FIGS. 2(*a*)-2(*g*), top cover 202 and/or bottom cover 204 are not illustrated so that other aspects of conveyor system 200 can be seen more clearly.

During operation, culture plates may traverse stage 206 along main track 210 and/or side track 220. Culture plates may enter and exit conveyor system 200 on main track 210. As a culture plate travels along main track 210, it may be stopped by stopping mechanisms 242, 244, and/or 246. Furthermore, as a culture plate enters conveyor system 200, it may be rotated by scanner drive 264 such that a barcode on the culture plate faces scanner 262. Scanner 262 may then scan the barcode. The barcode information may be used by an automated specimen processing system to track the positions of the culture plates that are being processed. After a culture plate has been scanned, it may be transferred to side track 220 by off-ramp catcher 252. Furthermore, after the culture plate has traveled the length of side track 220, it may be transferred back to the main track 210 by on-ramp catcher 254. In some embodiments, main track 210 and side track 220 are separately controlled.

Figures 3A, 3B:
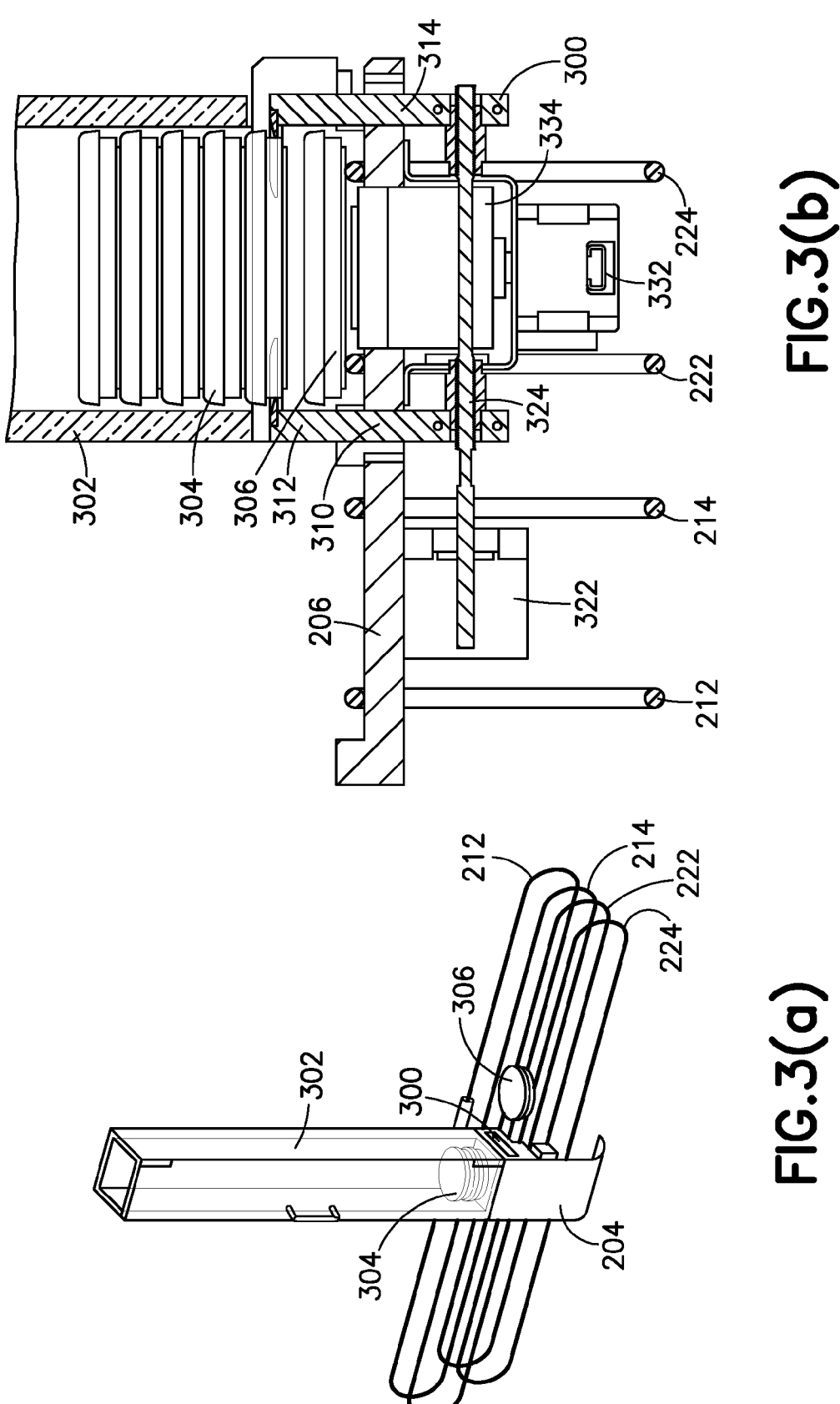
FIGS. 3(a) and 3(b) illustrate a side-view and a cross-section, respectively, of a cabinet for storing a stack of culture plates and an automated stacker and de-stacker that may be integrated into an automated specimen processing system.

In some embodiments, one or more automated stackers and de-stackers may be placed along side track 220. In some embodiments, portions of the one or more automated stackers may extend through beams 234 and 236. An example of an automated stacker and de-stacker that may be integrated with conveyor system 200 is illustrated in FIGS. 3(*a*)-3(*b*). As shown, automated stacker and de-stacker 300 includes clamping mechanism 310, motor 322, bi-directional lead screw 324, motor 332, and lift pad 334. Clamping mechanism 310 includes clamps 312 and 314. A cabinet 302 may be positioned above and supported by automated stacker and de-stacker 300. A stack of culture plates 304 positioned within cabinet 302 may also be supported by automated stacker and de-stacker 300. When automated stacker and de-stacker 300 is integrated with conveyor system 200, a culture plate 306 may pass through automated stacker and de-stacker 300 as it travels along side track 220 atop belts 222 and 224.

During operation, clamps 312 and 314 of clamping mechanism 310 may hold the culture plate at the bottom of the stack of culture plates 304. Clamping mechanism may be opened and closed by motor 322. More specifically, motor 322 may rotate bi-directional lead screw 324, which is connected to clamps 312 and 314. As shown in FIG. 3(*b*), the entire stack of culture plates 304 may be held above side track 320 so that another culture plate (e.g., culture plate 306) may travel underneath the stack of culture plates 304 without contacting them. Additional culture plates may be raised and added to the stack of culture plates 304 by lift pad 334. Similarly, culture plates may be lowered and removed from the stack of culture plates 304 by lift pad 334. Lift pad 334 is raised and lowered by motor 332. In some embodiments, motor 332 is connected to lift pad 334 via a lead screw. In some embodiments, motors 322 and 332 are electric motors (e.g., AC motors, DC motors, stepper motors, etc.).

Figures 4, 5A, 5B:
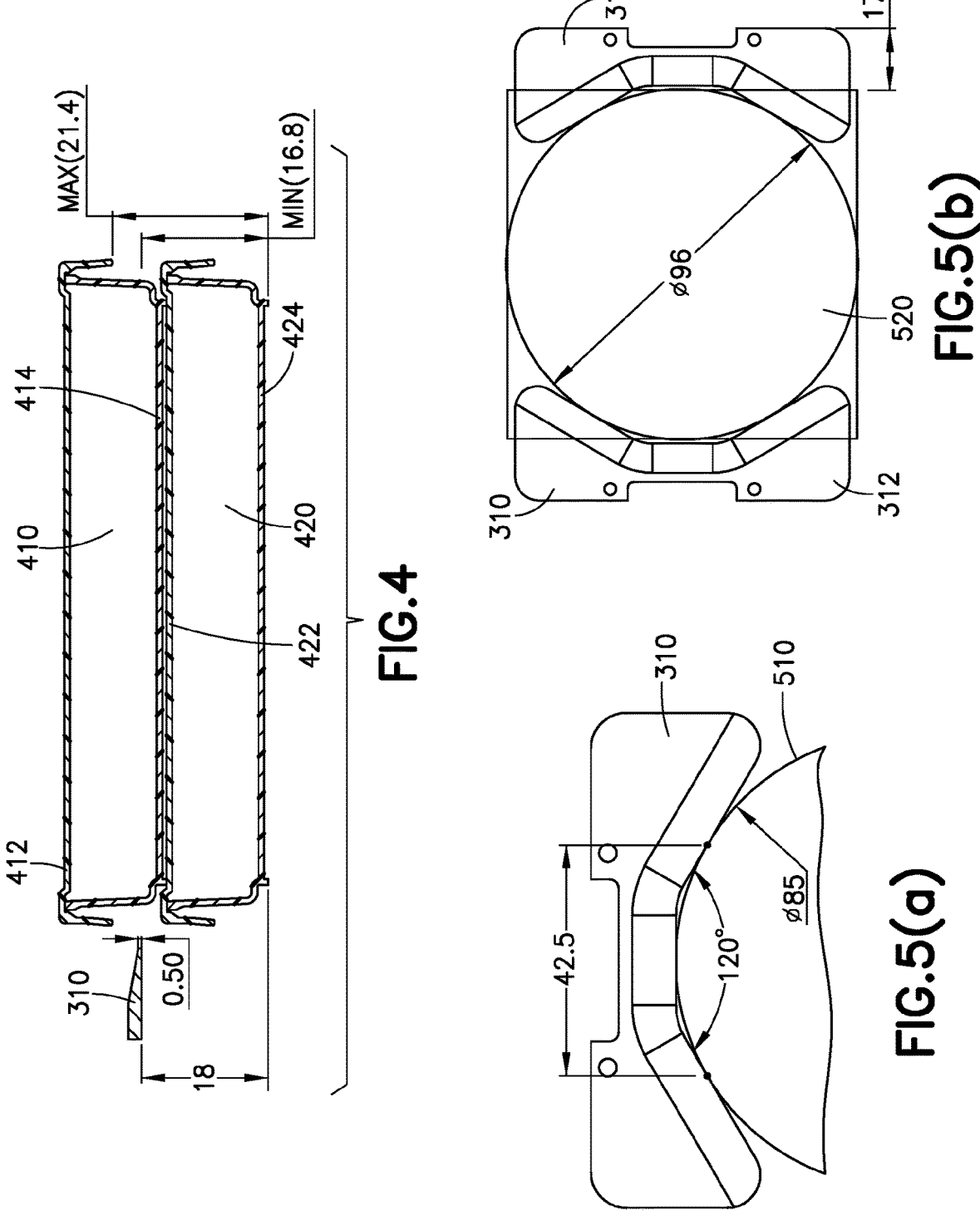
FIG. 4 illustrates how a clamping mechanism of the automated stacker and de-stacker of FIG. 3(b) may be configured to contact a culture plate within a stack of culture plates.
FIGS. 5(a) and 5(b) illustrate different top-views of a clamping mechanism of the automated stacker and de-stacker of FIG. 3(b).

FIG. 4 illustrates how a clamp (e.g., clamp 312 or 314) of clamping mechanism 310 may be configured to contact a culture plate within a stack of culture plates. As shown, culture plate 410 includes lid 412 and base 414. Similarly, culture plate 420 includes lid 422 and base 424. In this embodiment, a clamp of clamping mechanism 310 is configured to contact base 414 of culture plate 410 (not lid 412). If lid 412 was clamped (instead of base 414), base 414 would fall back down onto track 220. In this embodiment, the thickness of the portion of the clamp of clamping mechanism 310 contacting culture plate 410 is 0.5 mm. Furthermore, in this embodiment, the clamp of clamping mechanism 310 contacts base 414 at a height of 18 mm relative to the bottom of culture plate 420. However, the clamp of clamping mechanism 310 could be configured to contact base 414 at any height between 16.8 mm and 21.4 mm relative to the bottom of culture plate 420. Nonetheless, by selecting a value in the middle of that range, there is a higher tolerance for error. In other embodiments, different dimensions may be used.

FIGS. 5(a)-5(b) illustrate top-views of clamping mechanism 310. As shown in FIG. 5(a), a clamp (e.g., clamp 312 or 314) of clamping mechanism 310 may be configured to contact a culture plate 510 at two different points. In this embodiment, culture plate 510 has a diameter of 85 mm and the two different contact points are 42.5 mm apart. However, in other embodiments, different dimensions may be used. In this embodiment, the two edges of the clamp of clamping mechanism 310 contacting culture plate 510 are positioned at an angle of 120 degrees relative to each other. However, in other embodiments, this angle may be increased in order to increase the distance between the two points at which the clamp of clamping mechanism 310 contacts culture plate 510. Furthermore, in other embodiments, this angle may be decreased in order to increase the useable actuation distance of clamping mechanism 310. Thus, in other embodiments, the angle between the two edges of the clamp of clamping mechanism 310 may, for example, be anywhere between 80 and 160 degrees. As shown in the embodiment of FIG. 5(b), clamping mechanism 310 may be opened such that a culture plate 520 having a diameter of 96 mm or less can be released. In other embodiments, different dimensions may be used.

Figure 6A:
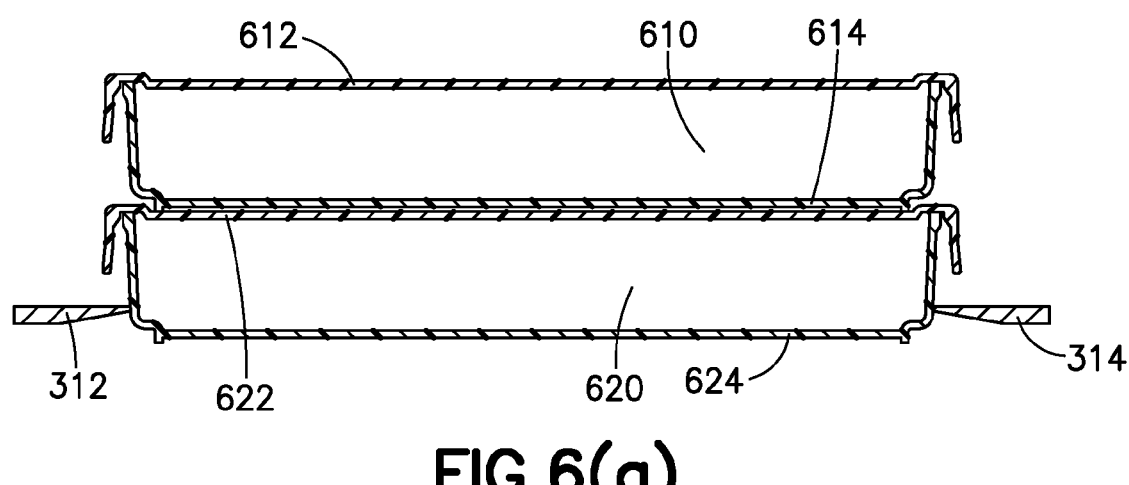
FIGS. 6(a) and 6(b) illustrate how the clamping mechanism of the automated stacker and de-stacker of FIG. 3(b) may be configured to support a stack of culture plates.
Figure 6B:
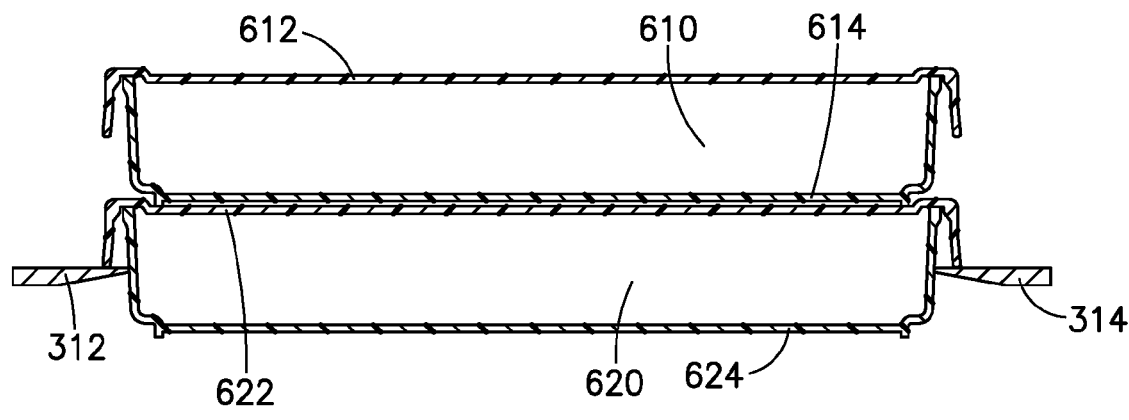

FIGS. 6(a)-6(b) illustrate how clamping mechanism 310 may be configured to support a stack of culture plates. As shown, the stack of culture plates includes culture plates 610 and 620. Culture plate 610 includes lid 612 and base 614. Similarly, culture plate 620 includes lid 622 and base 624. As shown in FIG. 6(a), the clamping force applied by clamping mechanism 310 to culture plate 620 is sufficient to hold the weight of the entire stack of culture plates. Alternatively, as shown in FIG. 6(b), the clamping force applied by clamping mechanism to culture plate 620 is only sufficient to hold the weight of base 624. In this situation, the stack of culture plates is permitted to slide downwards until lid 622 contacts clamps 312 and 314 of clamping mechanism 310. To illustrate the advantages of such a configuration, assume that the stack consists of 50 culture plates and has a total weight of 2310 grams. Further, assume that the coefficient of friction between the culture plates and clamps 312 and 314 is 0.3. Under these parameters, the clamping force applied in FIG. 6(a) is 75.5 newtons and the clamping force applied in FIG. 6(b) is only 1.5 newtons. Therefore, in the configuration of FIG. 6(b), base 624 is under significantly less stress than it is in the configuration of FIG. 6(a).

Figures 8A, 8B:
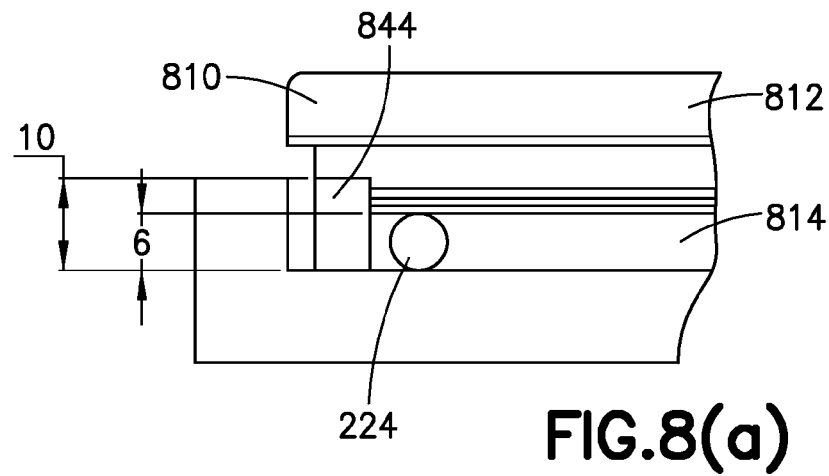
FIGS. 8(a) and 8(b) illustrate a side-view and a top-view, respectively, of how a pin of the automated stacker and de-stacker of FIG. 3(b) may be configured to contact a culture plate on a conveyor track.

FIGS. 8(a)-8(b) illustrate a side-view and top-view, respectively, of automated stacker and de-stacker 300, wherein automated stacker and de-stacker 300 includes pins 842 and 844. As shown, pins 842 and 844 may be raised to stop a culture plate 810 as it travels along side track 220 atop belts 222 and 224. Pins 842 and 844 may also be lowered to permit culture plate 810 to pass. In some embodiments, pins 842 and 844 may be coupled to lift 334 such that lift 334 and pins 842 and 844 can be raised and lowered by the same mechanism (e.g., motor 332). As shown in this embodiment, pins 842 and 844 have a height of 10 mm and a diameter of 6 mm. Furthermore, pins 842 and 844 are spaced apart by 80 mm. However, in other embodiments, different dimensions may be used.

Figure 7:
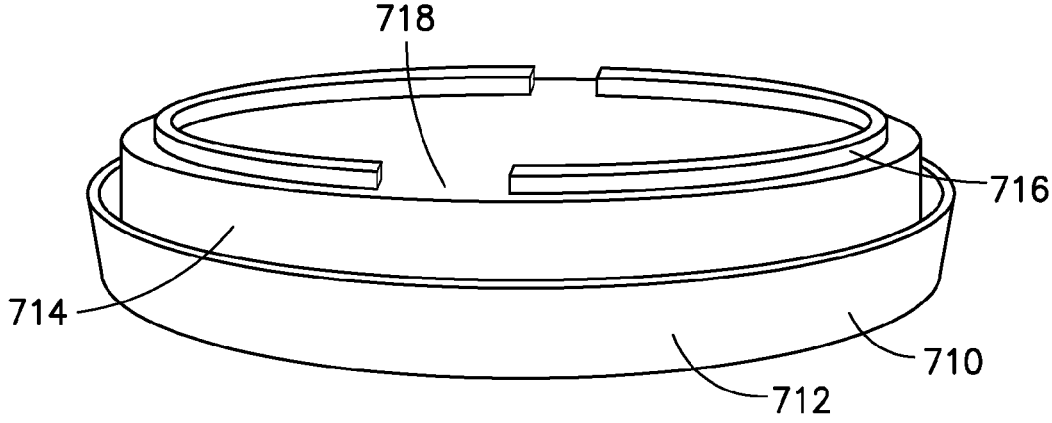
FIG. 7 is a photograph of a rim of a culture plate.

As shown in FIG. 8(a), pins 842 and 844 are configured to contact a base 814 (not a lid 812) of a culture plate 810. Advantageously, this configuration minimizes the distance pins 842 and 844 need to be raised and lowered. In embodiments where the space underneath side track 220 is scarce, this is particularly important. However, pins 842 and 844 should still be raised to a sufficient height above side track 220 (e.g., 4 mm) that prevents culture plate 810 from jumping over pins 842 and 844. Similarly, pins 842 and 844 should be lowered to a sufficient height below side track 220 that allows culture plate 810 to pass over pins 842 and 844 (e.g., 2.5 mm). For example, in some instances, a portion of a rim of base 814 may extend below belts 222 and 224. This may occur when a gap in the rim of base 814 aligns with belt 222 or 224. An example of a culture plate having a rim with a gap is illustrated in FIG. 7. As shown, a culture plate 710 includes lid 712 and base 714. Base 714 includes rim 716, which has a gap 718.

Figure 9:
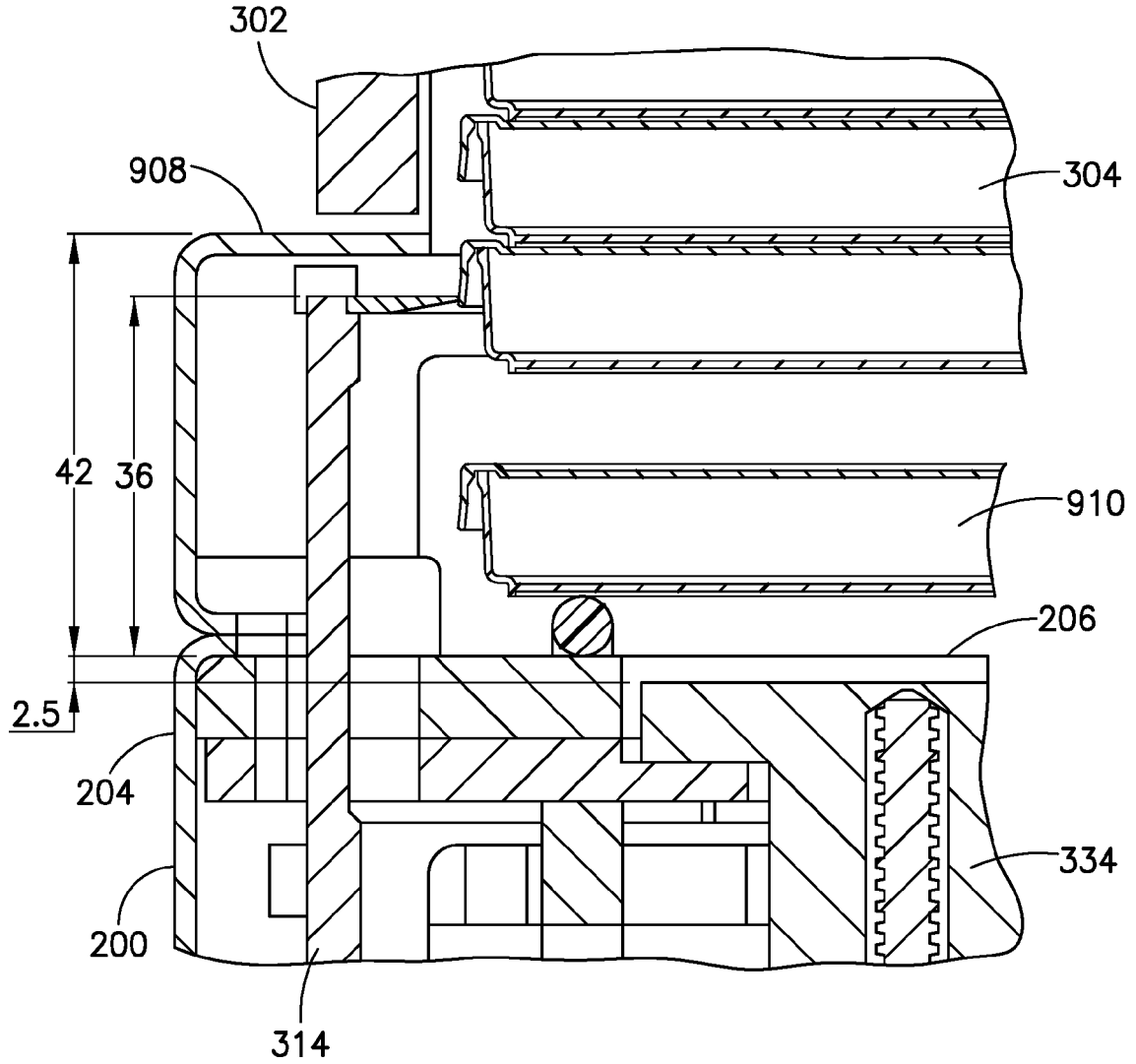
FIG. 9 illustrates a side-view of the automated stacker and de-stacker of FIG. 3(b).

FIG. 9 illustrates a side-view of automated stacker and de-stacker 300. As shown, conveyor system 200 further includes side cover 908, which is positioned above bottom cover 204. Furthermore, lift pad 334 has been lowered to a position that is 2.5 mm below the surface of stage 206. Much like pins 842 and 844, lift pad 334 has been lowered to a position below the surface of stage 206 to ensure that a culture plate (e.g., culture plate 910) traveling along side track 220 can pass over lift pad 334. During stacking and/or de-stacking processes, lift pad 334 may be raised to a position above clamps 312 and 314 of clamping mechanism 310. For example, in some embodiments, lift pad 334 may be raised to a position where a top surface of lift pad 334 is flush with a top surface of side cover 908. Therefore, in this embodiment, lift pad 334 may be raised 44.5 mm (i.e., 2.5 mm plus 42 mm).

Figure 10:
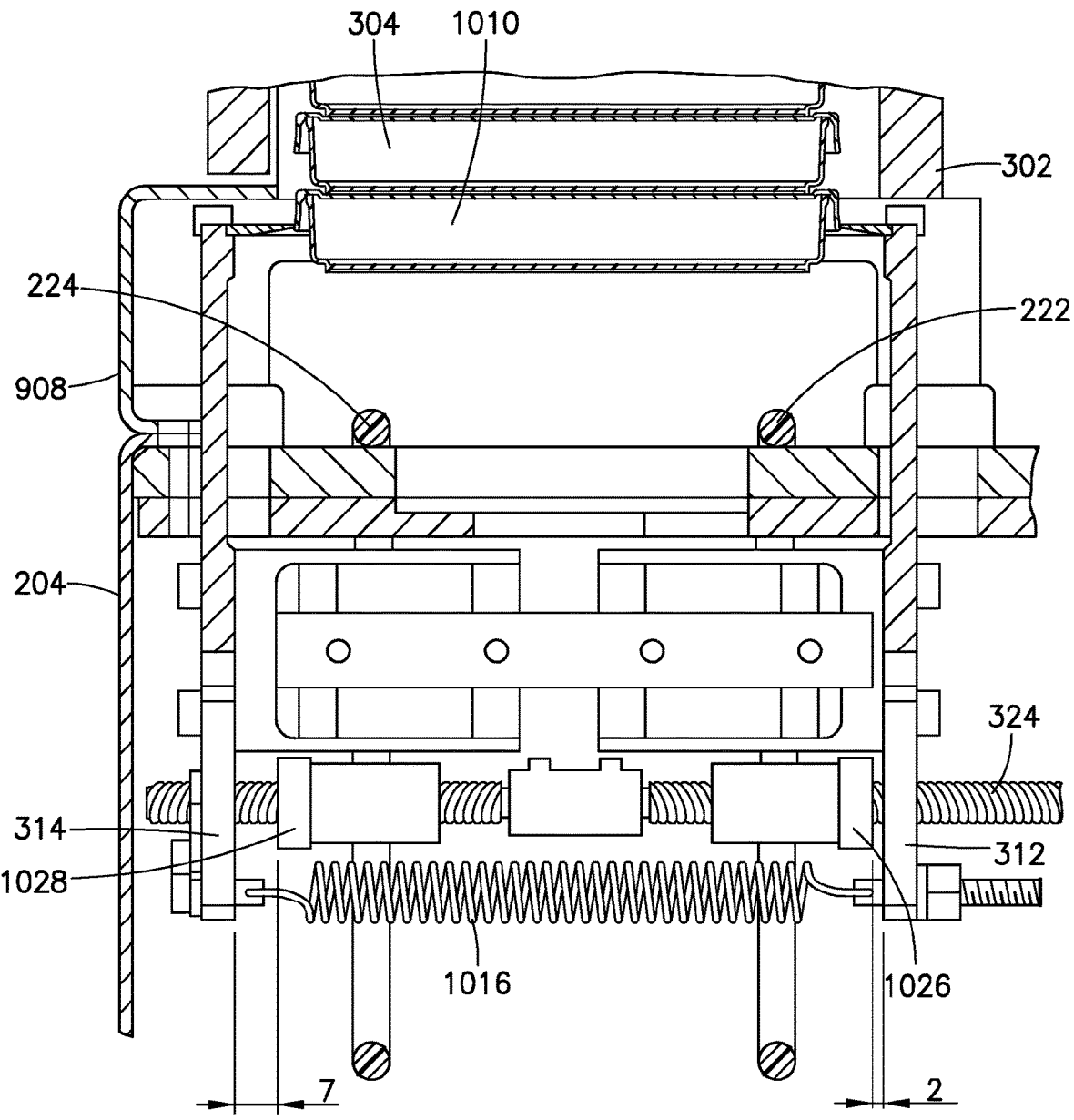
FIG. 10 illustrates a side-view of the automated stacker and de-stacker of FIG. 3(b).
Figure 11A:
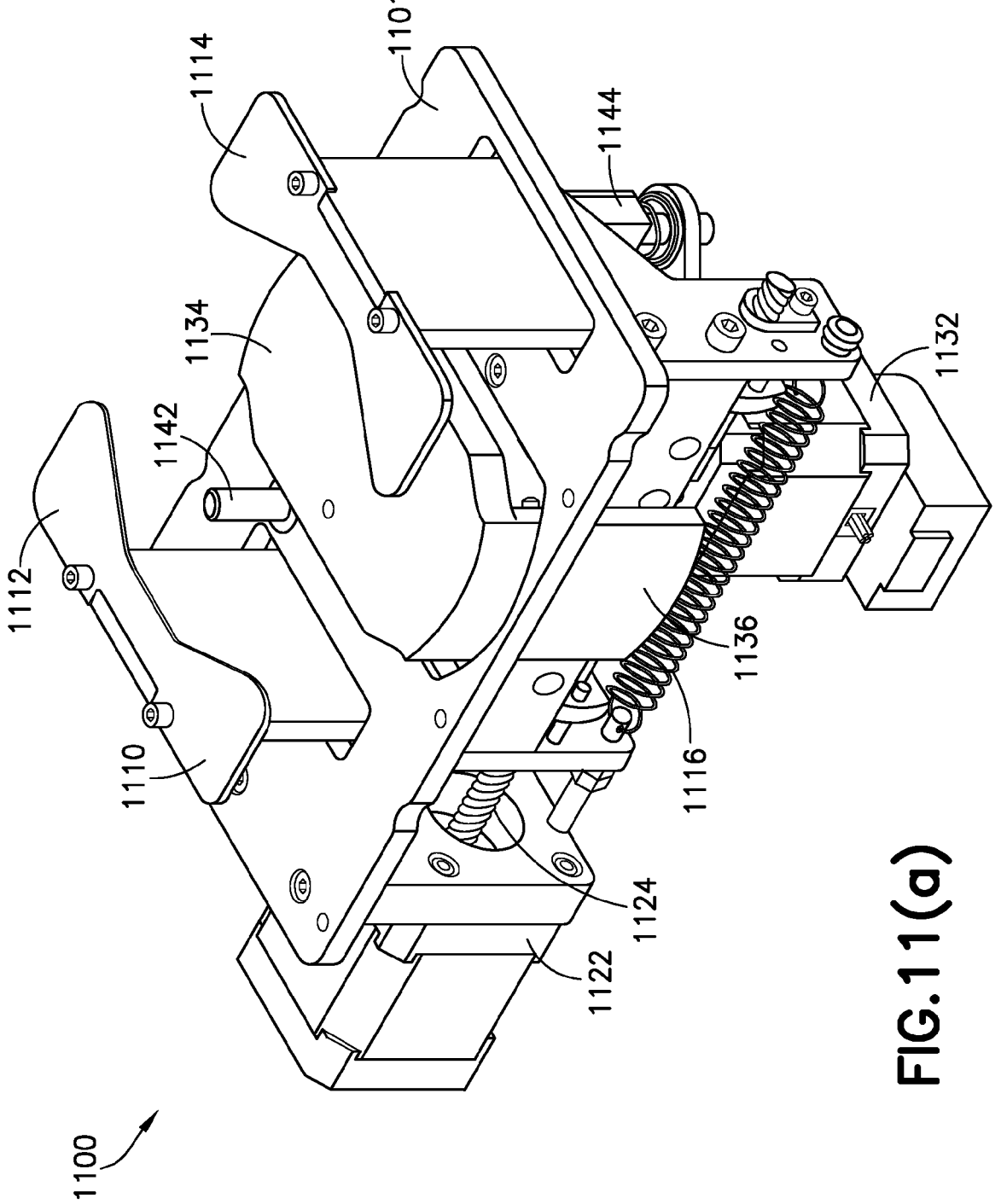
FIGS. 11(a)-11(f) illustrate an automated stacker and de-stacker that may be integrated into an automated specimen processing system. More specifically.
Figures 11B, 11C:
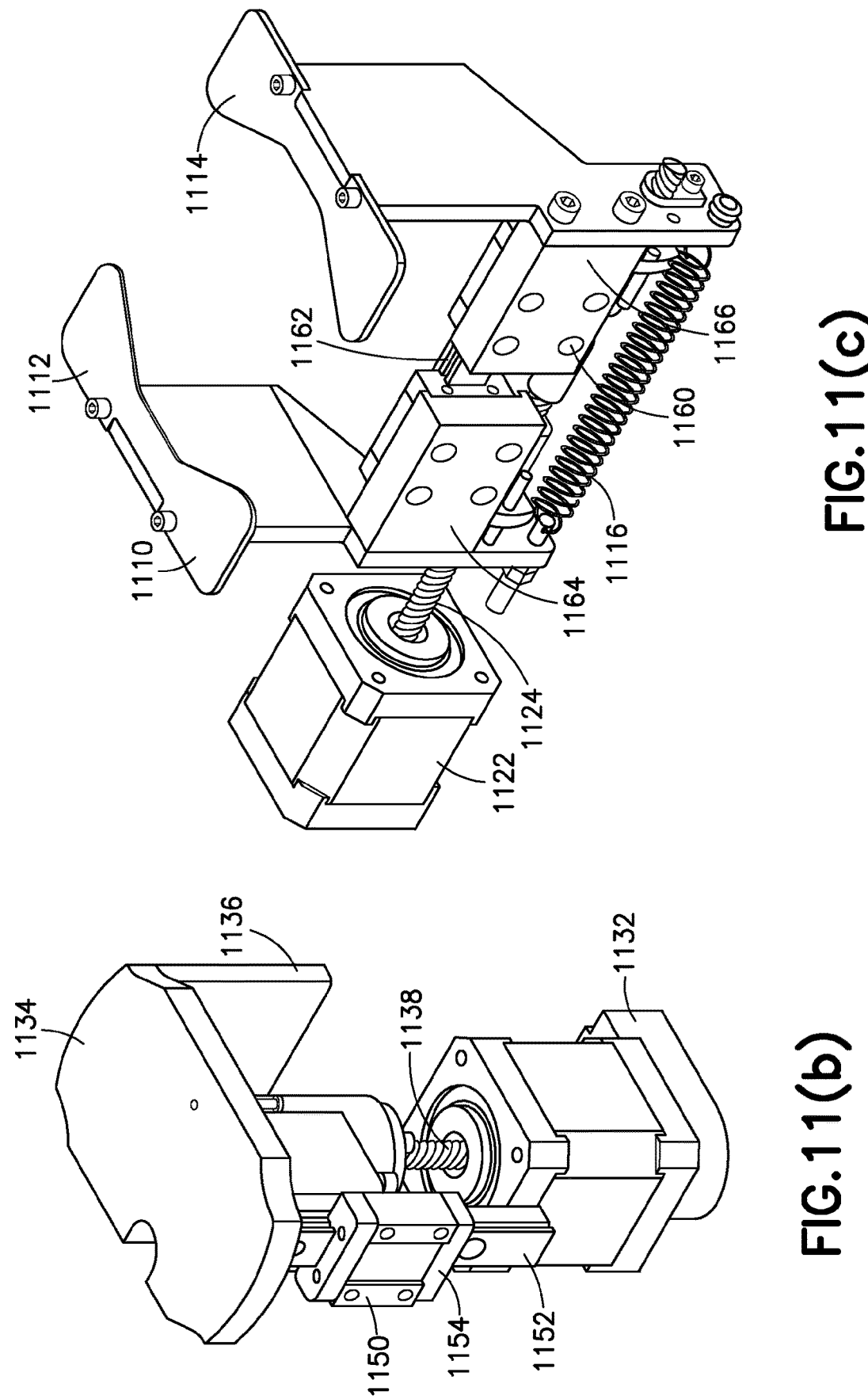
Figure 11E:
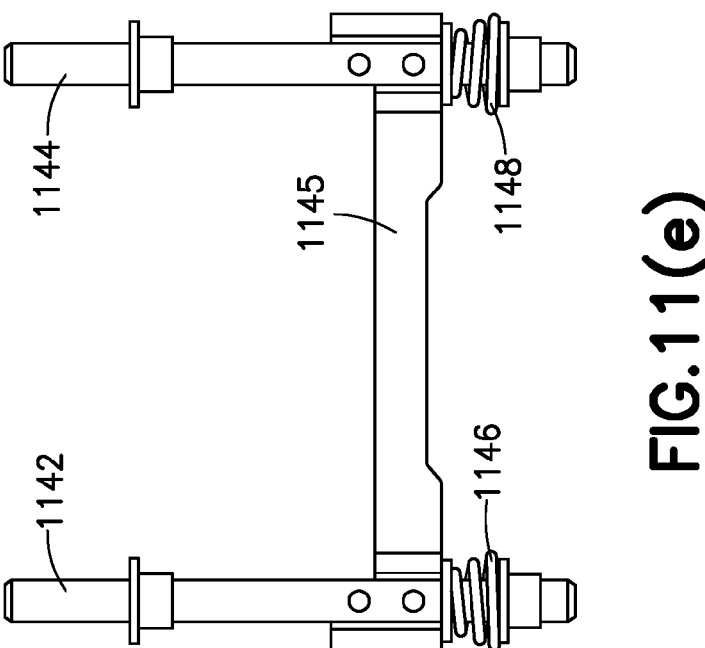
Figure 11D:
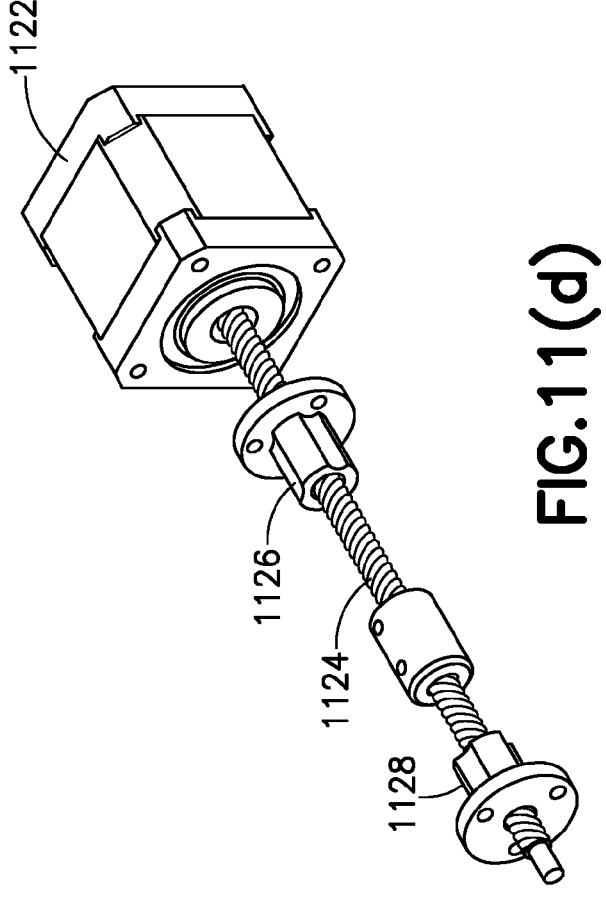
Figure 11F:
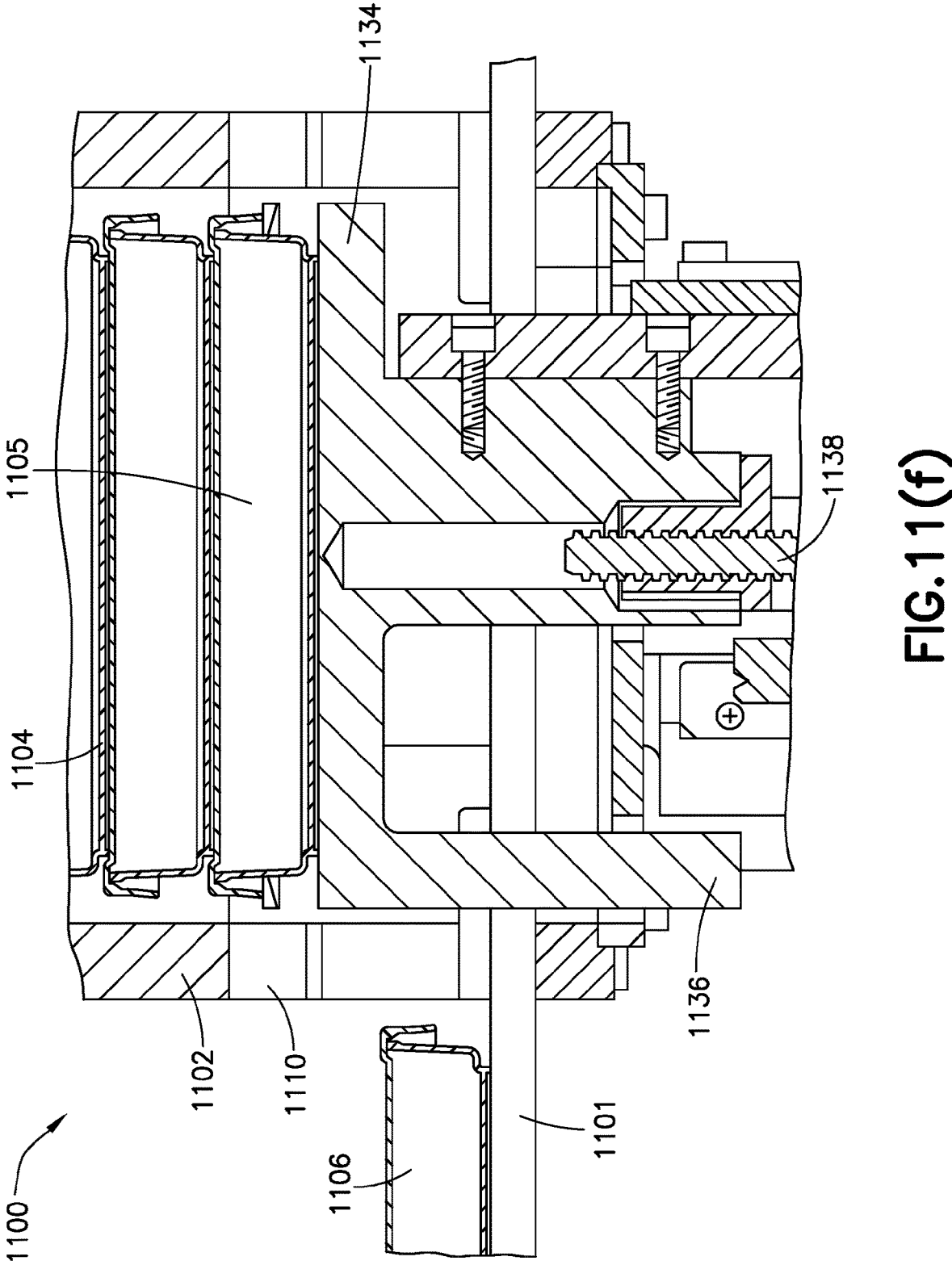

FIG. 10 illustrates a side-view of automated stacker and de-stacker 300. As shown, the clamping force of clamping mechanism 310 is provided by a spring 1016. Clamping mechanism 310 is opened by rotating bi-directional lead screw 324 using motor 322. As bi-directional lead screw 324 is rotated in a first direction (e.g., clockwise or counterclockwise), lead nuts 1026 and 1028 move away from clamps 312 and 314, respectively. As bi-directional lead screw 324 is rotated in a second opposite direction (e.g., clockwise or counterclockwise), lead nuts 1026 and 1028 move towards clamps 312 and 314, respectively. When lead nuts 1026 and 1028 contact and push against clamps 312 and 314, respectively, clamping mechanism 310 starts to open.

In some embodiments, spring 1016 may provide a sufficient clamping force to center a culture plate during a de-stacking process. As shown, the stack of culture plates 304 positioned within cabinet 302 includes culture plate 1010. Culture plate 1010 is positioned at the bottom of the stack of culture plates 304 and it is being held by clamping mechanism 310. Furthermore, culture plate 1010 is held in a position such that clamp 312 is 2 mm away from lead nut 1026 and clamp 314 is 7 mm away from lead nut 1028. Thus, culture plate 1010 is not centered above side track 220, which includes belts 222 and 224. In such a situation, as bi-directional lead screw 324 is rotated in a second direction and lead nuts 1026 and 1028 move towards clamps 312 and 314, respectively, lead nut 1026 will contact clamp 312 before lead nut 1028 contacts clamp 314. When this occurs, spring 1016 may be configured to provide a sufficient clamping force to pull clamp 314 towards lead nut 1028 as (a) lead nut 1026 pushes against clamp 312 and (b) lead nut 1028 continues to move towards clamp 314. In such embodiments, spring 1016 may provide a clamping force that is greater than or equal to the force required to overcome the friction between the stack of culture plates 304 and lift pad 334, allowing culture plate 1010 to slide laterally underneath the stack of culture plates.

FIGS. 11(*a*)-11(*f*) illustrate various side-views and/or components of an automated stacker and de-stacker 1100. As shown in FIG. 11(*a*), much like automated stacker and de-stacker 300 discussed above, automated stacker and de-stacker 1100 includes clamping mechanism 1110, spring 1116, motor 1122, bi-directional lead screw 1124, motor 1132, lift pad 1134, pin 1142, and pin 1144. Clamping mechanism 1110 includes clamps 1112 and 1114. Lift pad 1134 includes shield 1136. As shown, automated stacker and de-stacker 1100 is mounted to top plate 1101. In some embodiments, top plate 1101 may form part of a stage of a conveyor system (e.g., stage 206 of conveyor system 200 of FIGS. 2(*a*)-2(*g*)). As shown, portions of clamp 1112, clamp 1114, lift pad 1134, pin 1142, and pin 1144 may extend through top plate 1101. In some embodiments, motors 1122 and 1132 are electric motors (e.g., AC motors, DC motors, stepper motors, etc.).

As shown in FIG. 11(*b*), motor 1132 is connected to lift pad 1134 via lead screw 1124. Furthermore, a linear guideway 1150 is coupled to lift pad 1134. Linear guideway 1150 includes rail 1152 and bearing block 1154. Lift pad 1134 is coupled to rail 1152, which can slide upwards and downwards through bearing block 1154. Bearing block 1154 may be coupled to another stationary component of automated stacker and de-stacker 1100 (e.g., top plate 1101) and/or a conveyor system (e.g., stage 206 of conveyor system 200 of FIGS. 2(*a*)-2(*g*)). During operation, motor 1132 may rotate lead screw 1138 clockwise or counterclockwise in order to raise or lower lift pad 1134. As lift pad 1134 is raised and lowered by motor 1132, linear guideway 1150 provides stability to lift pad 1134.

As shown in FIG. 11(*c*), spring 1116, bi-directional lead screw 1124, and linear guideway 1160 extend from clamp 1112 to clamp 1114. Linear guideway 1160 includes rail 1162 and bearing blocks 1164 and 1166. Clamps 1112 and 1114 are coupled to bearing blocks 1164 and 1166, respectively, both of which can slide along rail 1162. As shown in FIG. 11(*d*), lead nuts 1126 and 1128 are positioned on bi-directional lead screw 1124. When automated stacker and de-stacker 1100 is assembled, lead nuts 1126 and 1128 are positioned on bi-directional lead screw 1124 between clamps 1112 and 1114.

During operation, motor 1122 may rotate bi-directional lead screw 1124 clockwise or counterclockwise in order to open or close clamping mechanism 1110. For example, in order to open clamping mechanism 1110, motor 1122 may rotate bi-directional lead screw 1124 such that lead nuts 1126 and 1128 move towards clamps 1112 and 1114, respectively. When lead nuts 1126 and 1128 contact and push against clamps 1112 and 1114, respectively, they may exert a force that is greater than and opposes a clamping force (e.g., 23 newtons) of spring 1116. When this happens, clamping mechanism starts to open. During this process, linear guideway 1160 provides stability to clamps 1112 and

1114. Similarly, in order to close clamping mechanism 1110, motor 1122 may rotate bi-directional lead screw 1124 such that lead nuts 1126 and 1128 move away from clamps 1112 and 1114, respectively. When lead nuts 1126 and 1128 are no longer contacting clamps 1112 and 1114, respectively, clamping mechanism 1110 is closed.

Advantageously, clamping mechanism 1110 does not require any electricity to stay in a closed position because the clamping force is provided by spring 1116. Electricity is used in this embodiment to open clamping mechanism 1110. Therefore, in the event of a power outage, a stack of culture plates will remain clamped and secured in automated stacker and de-stacker 1100. Furthermore, by using spring 1116, clamping mechanism 1110 can easily adapt to culture plates with different diameters.

As shown in FIG. 11(*e*), pins 1142 and 1144 are urged upward by springs 1146 and 1148, respectively. Furthermore, pin 1142 is coupled to pin 1144 via crossbar 1145. Springs 1146 and 1148 are positioned beneath crossbar 1145. During operation, lift pad 1134 may be used to lower pins 1142 and 1144. For example, lift pad 1134 may be lowered by motor 1132 to a position where a portion of lift pad 1134 contacts crossbar 1145 and pushes springs 1146 and 1148 into a retracted state. Therefore, motor 1132 can advantageously be used to actuate lift pad 1134 and pins 1142 and 1144. However, in other embodiments, multiple motors can be used to actuate these components. In some embodiments, the portion of lift pad 1134 that contacts crossbar 1145 is a notch that can be adjusted with two or more screws. In some embodiments, pins 1142 and 1144 are guided by a pair of sleeve bearings with flanges. In some embodiments, pins 1142 and 1144 are configured to contact a base (not a lid) of a culture plate. In other embodiments, pins 1142 and 1144 are configured to contact a lid of a culture plate. In some embodiments, springs 1146 and 1148 may be configured to raise pins 1142 and 1144 by 6.5 mm to a position that is 4 mm above top plate 1101. In some embodiments, springs 1146 and 1148 are conical compression springs, which, advantageously, can be fully flattened when compressed and minimize the space required by automated stacker and de-stacker 1100.

As shown in FIG. 11(*f*), cabinet 1102 may be positioned above and supported by automated stacker and de-stacker 1100. A stack of culture plates 1104 positioned within cabinet 1102 may also be supported by automated stacker and de-stacker 1100. As shown, lift pad 1134 is raised to a position where it is touching culture plate 1105, which is at the bottom of the stack of culture plates 1104. Furthermore, shield 1136 of lift pad 1134 is preventing another culture plate 1106 traveling towards automated stacker and de-stacker 1100 from accidentally getting caught underneath lift pad 1134.

Figure 12:
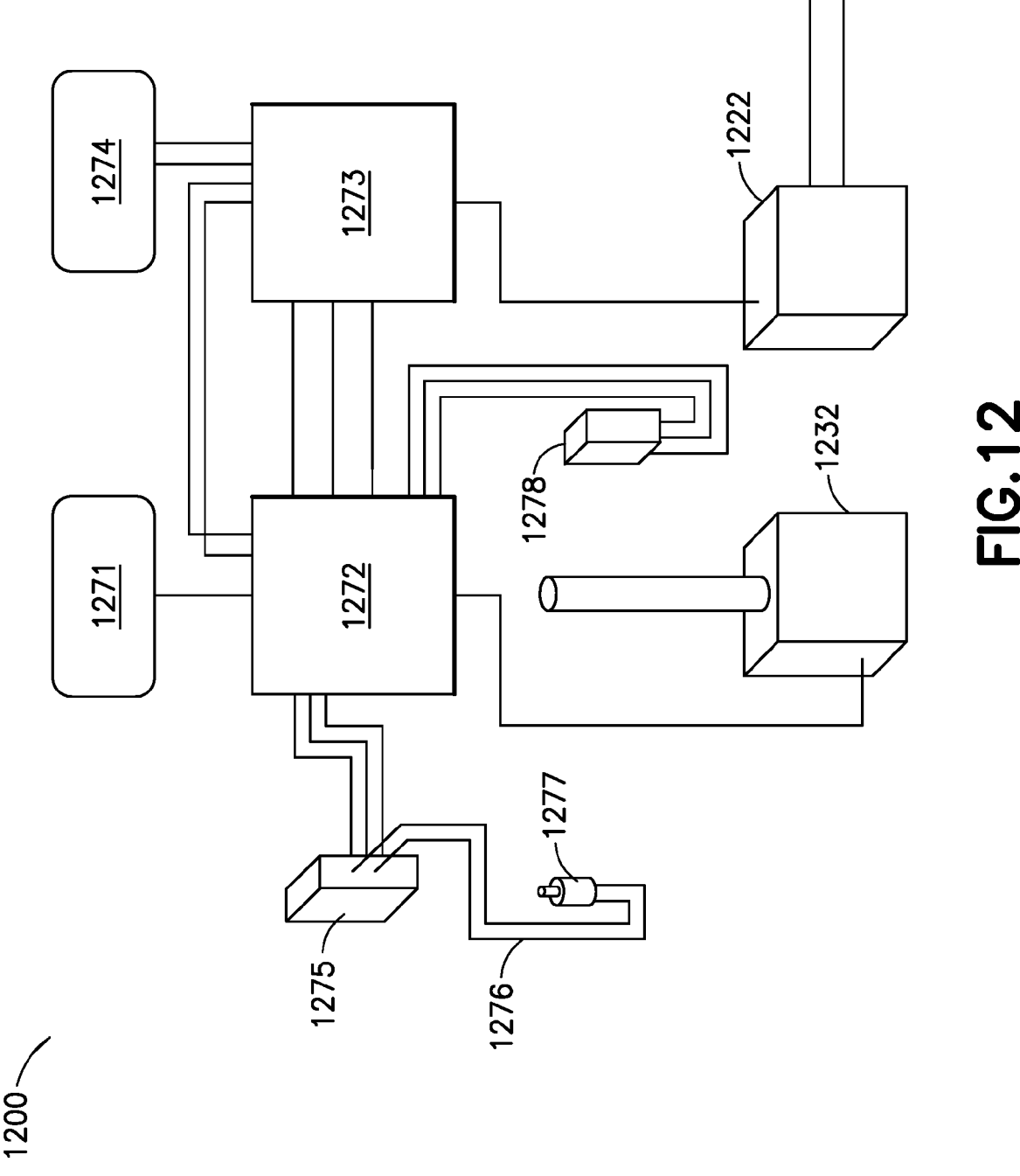
FIG. 12 illustrates a schematic of the control circuitry of an automated stacker and de-stacker that may be integrated into an automated specimen processing system.
Figure 14A:
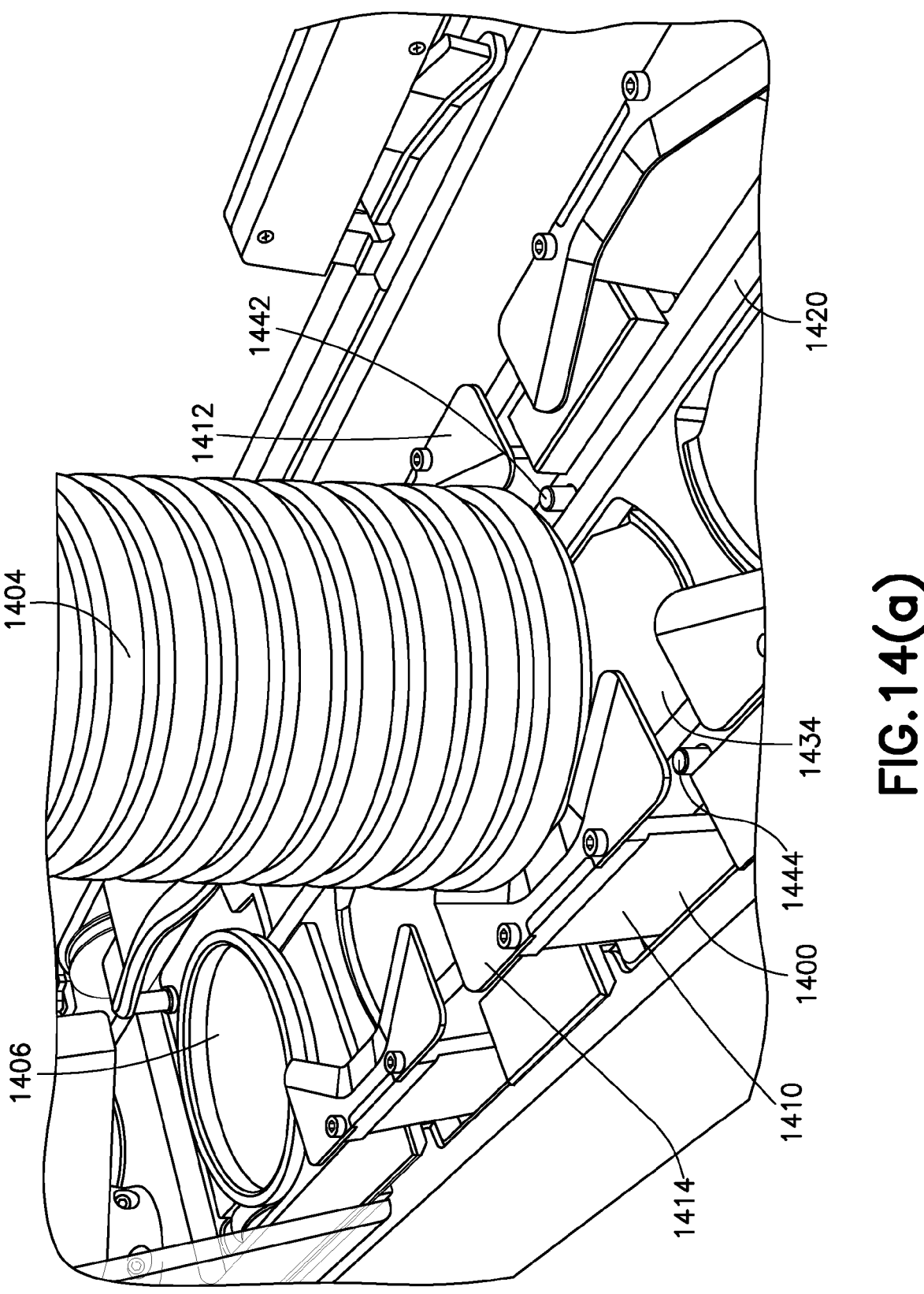
FIGS. 14(a)-14(h) illustrate different potential states of an automated stacker and de-stacker that has been integrated into an automated specimen processing system.
Figure 14B:
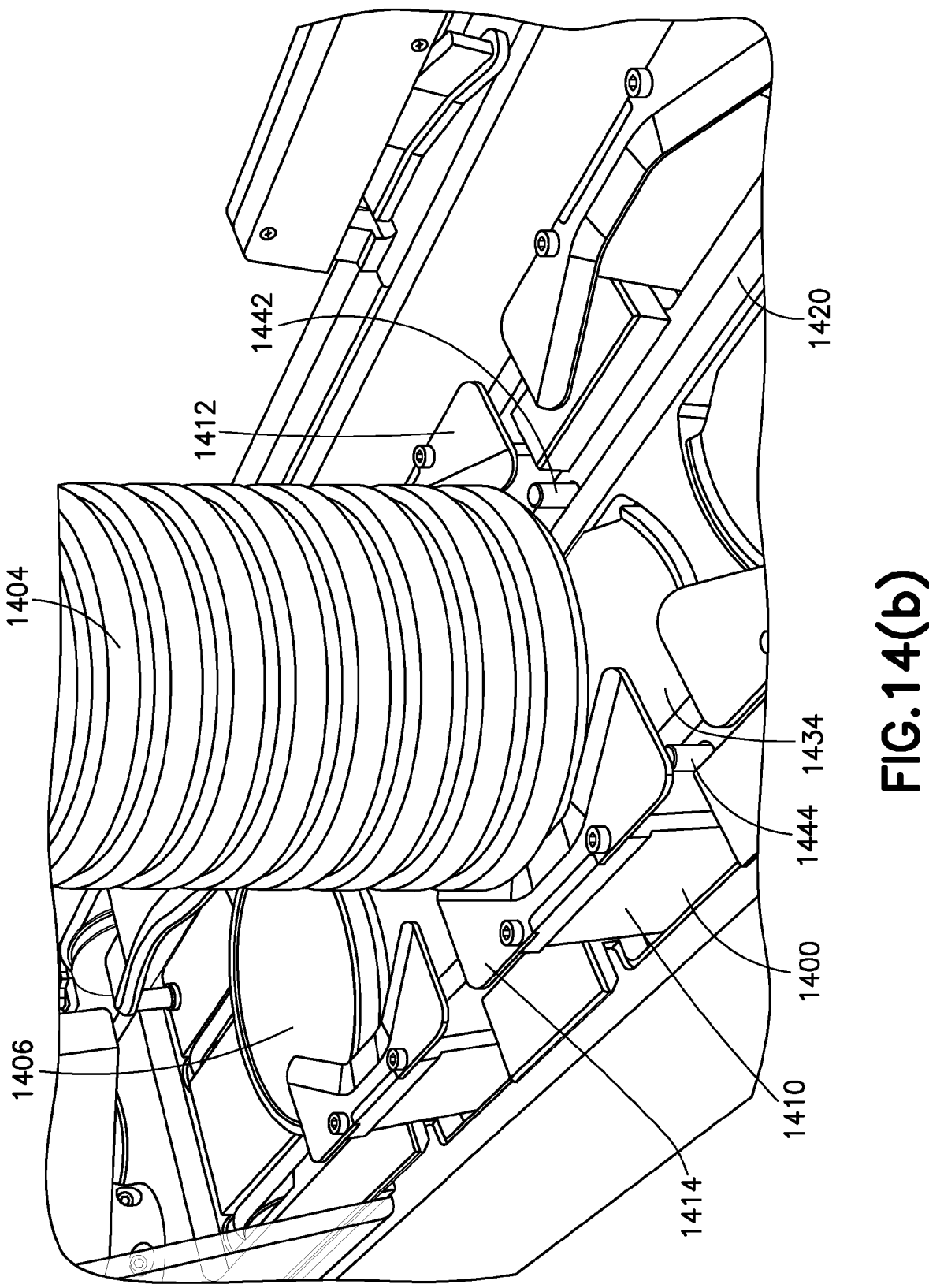
Figure 14C:
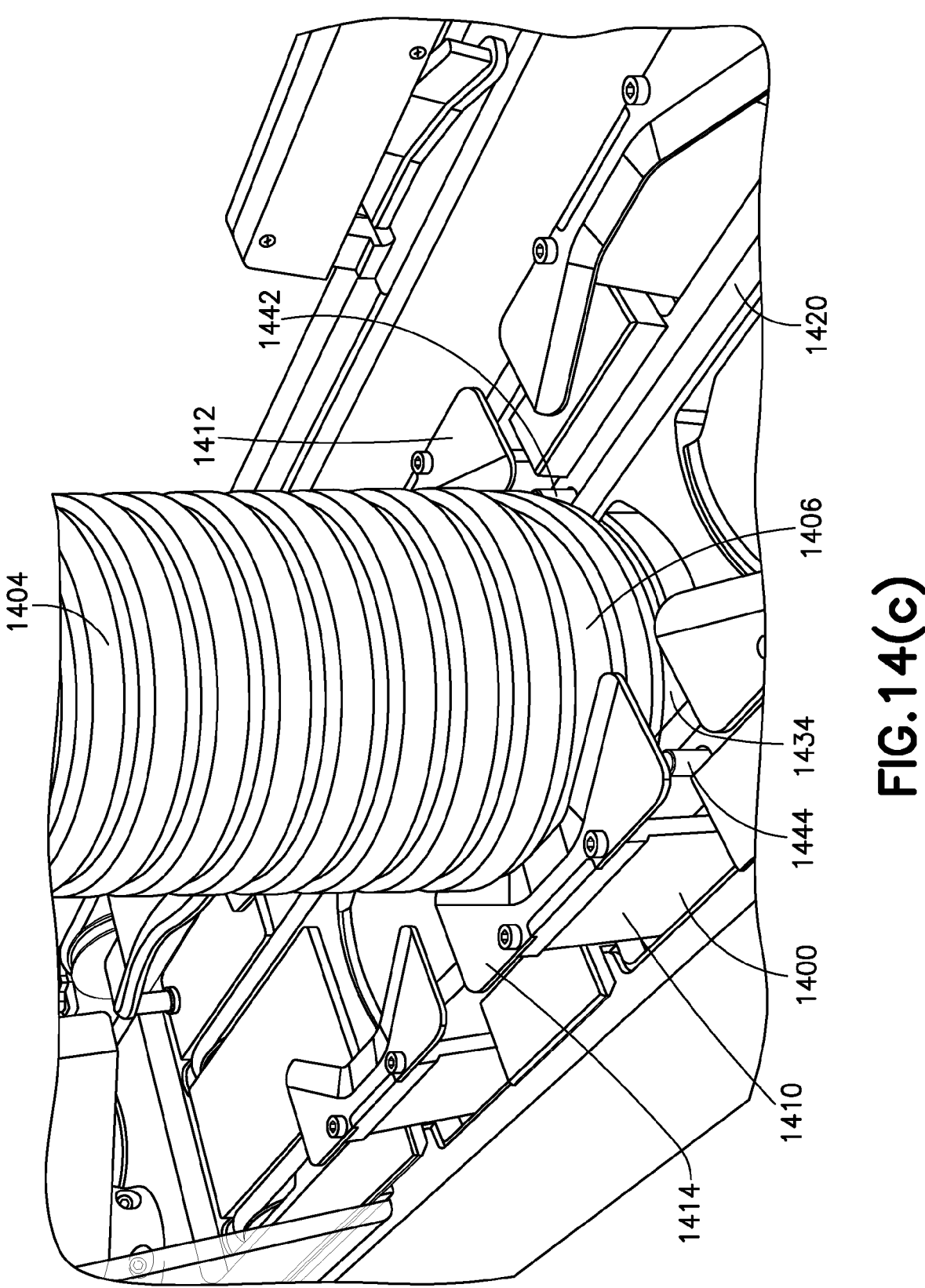
Figure 14D:
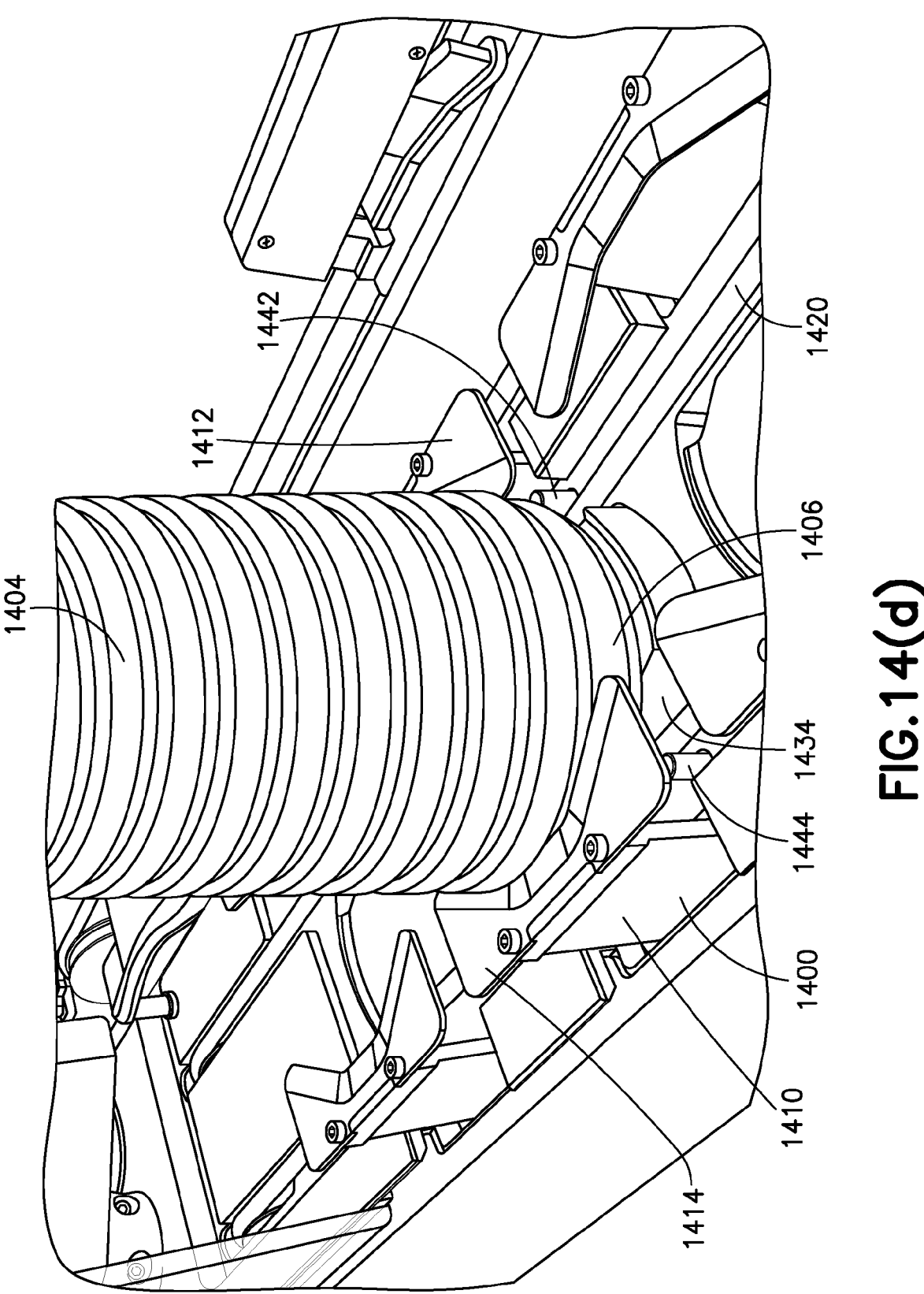
Figure 14E:
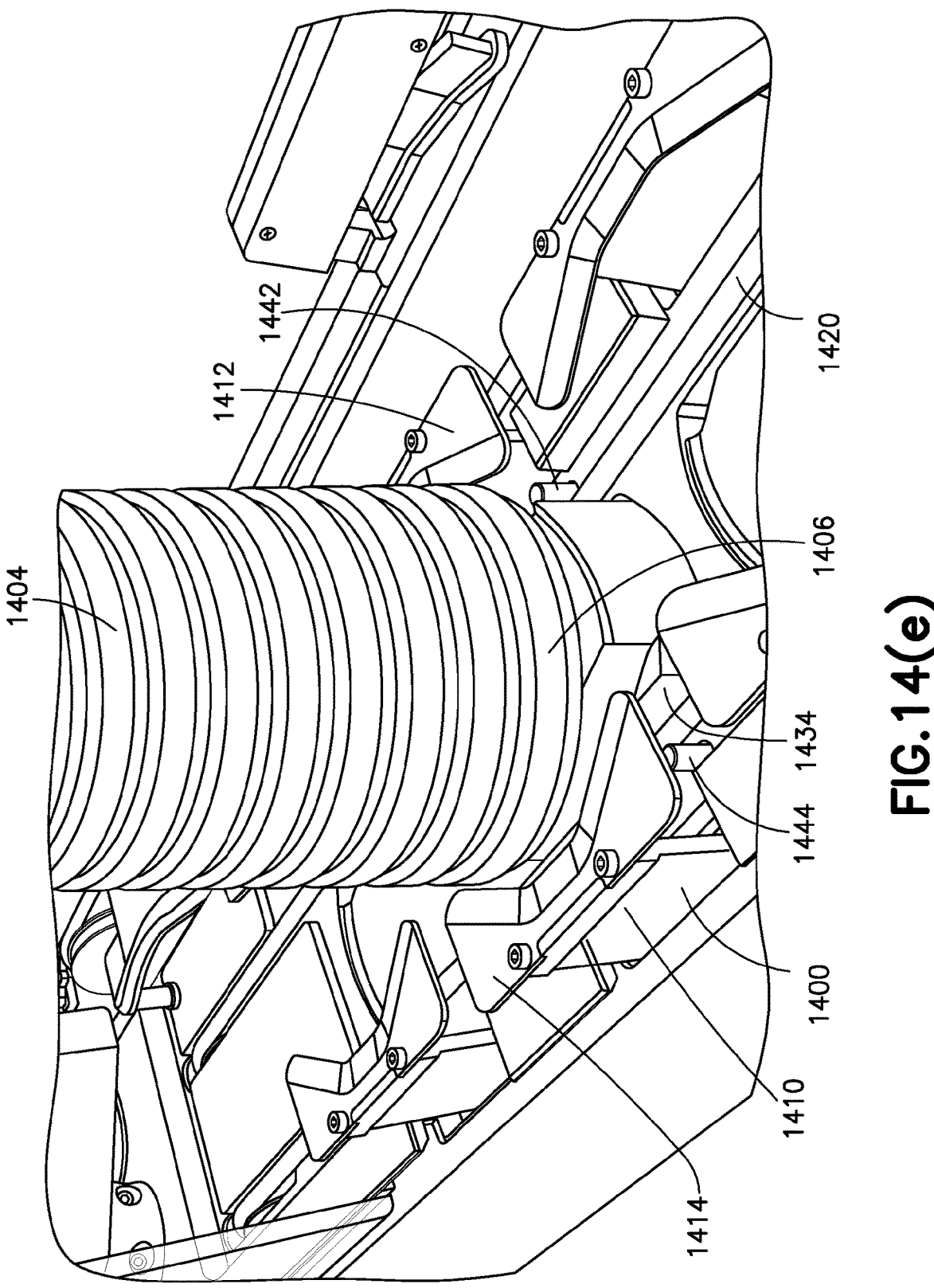
Figure 14F:
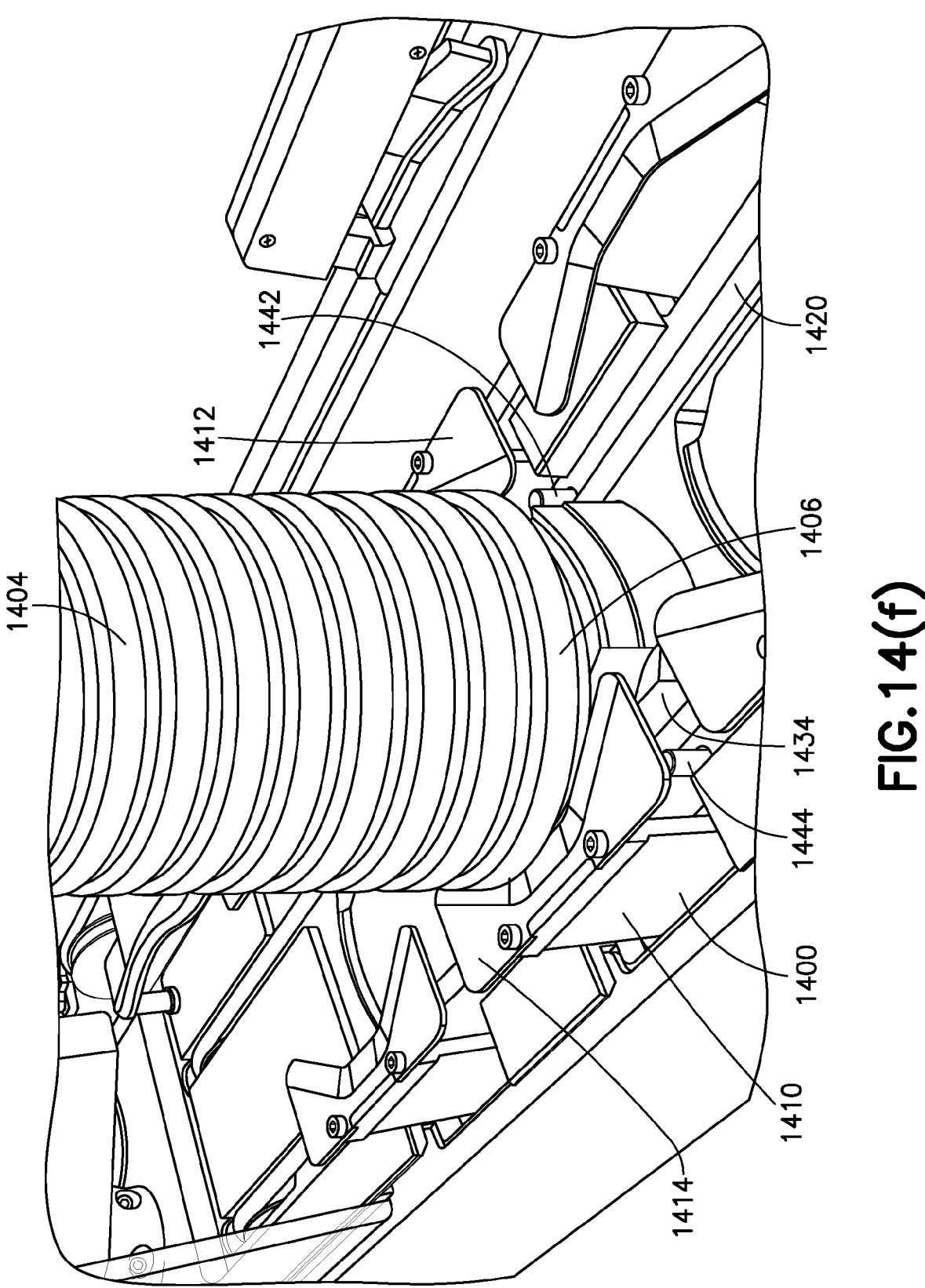
Figure 14G:
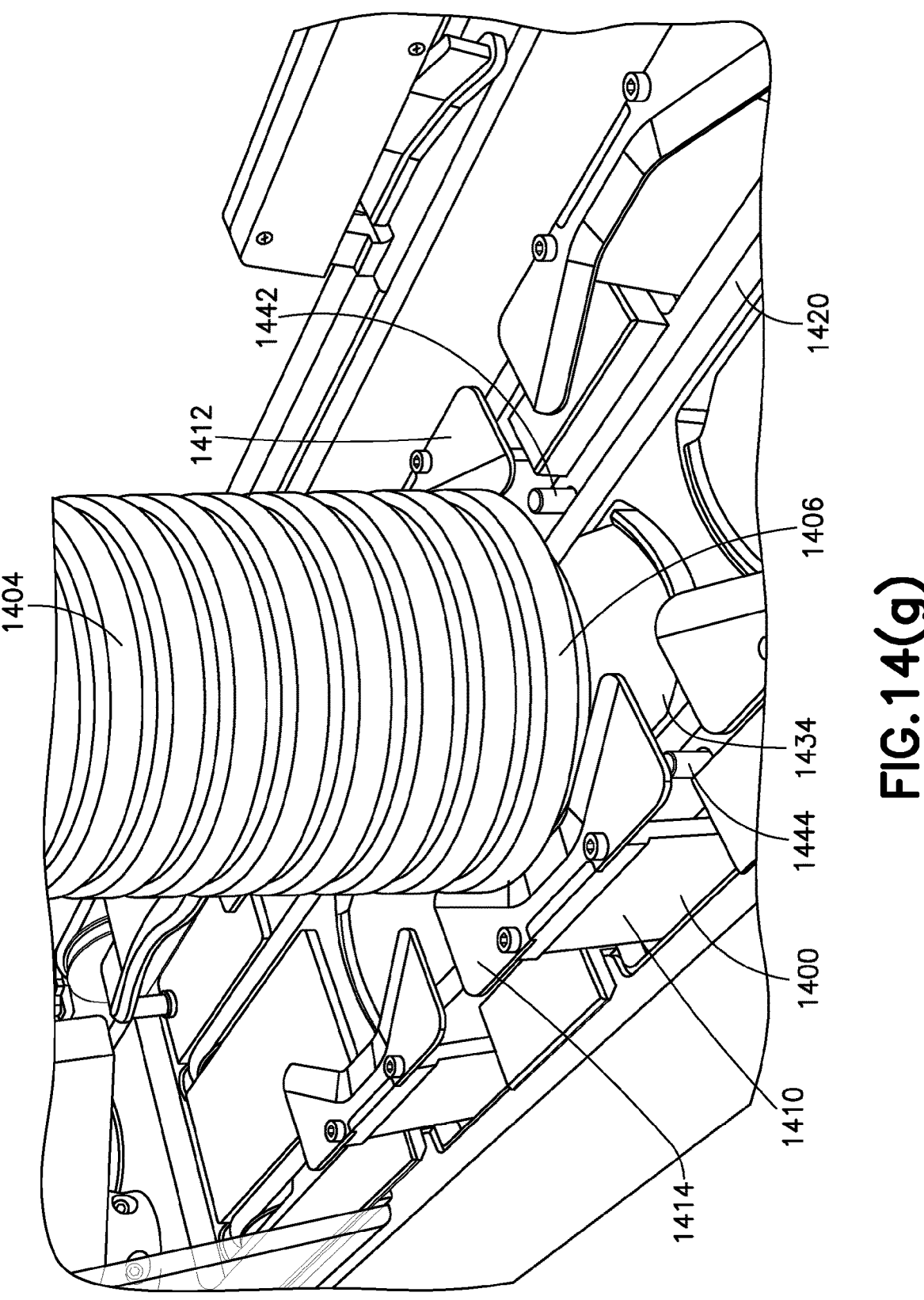
Figure 14H:
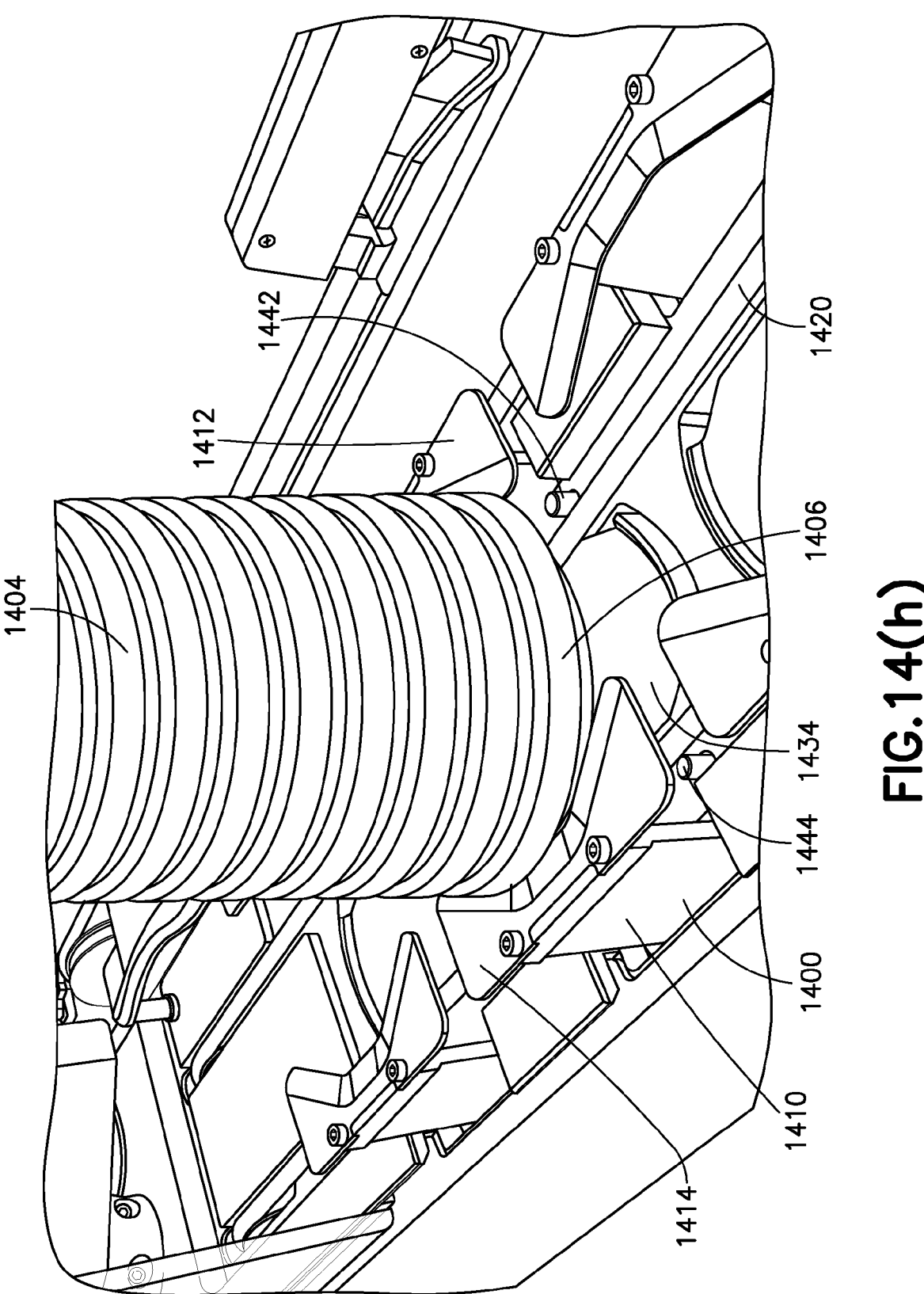

FIG. 12 illustrates a schematic of the control circuitry of an automated stacker and de-stacker (e.g., automated stacker and de-stacker 300 or 1100). In this schematic, lines with arrows generally indicate a flow of data, and lines without arrows are power supply connections. In this embodiment, control circuitry 1200 includes controllers 1271, 1272, and 1273. Controllers 1272 and 1273 control motors 1222 and 1232, respectively. In some embodiments, controllers 1272 and 1273 may be dedicated motor controllers. As shown, controller 1272 receives data from an optical sensor 1276 having a sensor module 1275 (e.g., SICK's WLL170-2P132 Fiber Optic Sensor) and a sensor cable 1277 (e.g., SICK's LL3-DB01 Fiber Optic Sensor Cable). In other embodiments, optical sensor 1276 may not include a sensor cable (e.g., SICK's VTE6-P3121S01 Photoelectric Proximity Sensor). Similarly, controller 1273 receives data from an optical sensor 1278 (e.g., Panasonic's PM-Y45 Photoelectric Sensor). Sensors 1276 and 1278 may transmit, for example, infrared or visible light. Power supply 1274 provides power to controllers 1272 and 1273, which then provide power to sensors 1276 and 1278, respectively. In some embodiments, control circuitry 1200 may include multiple power supplies.

Sensor 1276 may be used to determine whether a culture plate is ready to be stacked. For example, if control circuitry 1200 is used to control automated stacker and de-stacker 1100, sensor 1276 may be used to determine whether a culture plate is positioned beneath clamping mechanism 1110. In some such embodiments, sensor cable 1277 may be mounted to top plate 1101 and sensor module 1275 may be mounted elsewhere. During operation, sensor module 1275 sends light through sensor cable 1277. When an object, such as a culture plate, is above sensor cable 1277, the light initially sent by sensor module 1275 is reflected back to it through sensor cable 1277. When this occurs, sensor 1276 may send controller 1272 a signal through a wire indicating that a culture plate is positioned above it. In some embodiments, the detection distance of sensor 1276 can be adjusted using a dial on sensor module 1275.

Sensor 1278 may be used to determine whether a lift pad is in a particular position. For example, if control circuitry 1200 is used to control automated stacker and de-stacker 1100, sensor 1278 may be used to determine whether lift pad 1134 is in a starting position. In some embodiments, while in a starting position, lift pad 1134 may be positioned beneath top plate 1101 and holding pins 1142 and 1144 in a retracted position. In some embodiments, sensor 1278 is a U-shaped optical sensor. In some such embodiments, sensor 1278 sends a signal to controller 1272 through a wire when an object breaks a beam of light between the two sides of the U-shape of sensor 1278. Advantageously, this type of sensor can be highly accurate, compact, and inexpensive, and it does not exert any additional force on the components of automated stacker and de-stacker 1100.

In some embodiments, controllers 1272 and/or 1273 may be used to detect whether motor 1222 and/or 1232 has stalled. For example, if control circuitry 1200 is used to control automated stacker and de-stacker 1100, a stall detection process may be used to determine whether clamping mechanism 1110 is in a particular position. For example, motor 1222 will stall when clamping mechanism 1110 is in a fully extended open position. In such a position, clamps 1112 and 1114 are pushed against portions of the openings in top plate 1101 through which clamps 1112 and 114 extend. When this occurs, controller 1273 will detect that motor 1222 has stalled and, consequently, that clamping mechanism 1110 is in a fully extended open position. Advantageously, this type of detection process does not require an additional sensor.

However, in some embodiments, control circuitry 1200 may include additional sensors. For example, if control circuitry 1200 is used to control automated stacker and de-stacker 1100, additional sensors may be used to determine (a) whether cabinet 1102 is full, (b) whether cabinet 1102 is empty, (c) whether a culture plate is in a stacking position where it can be added to the stake of plate 1104 in cabinet 1102, (d) the position of clamping mechanism 1110, (e) the position of lift pad 1134, and/or (f) the position of pins 1142 and 1144. Furthermore, in some embodiments, sensors 1276 and/or 1278 may be replaced with different types of sensors. For example, sensors 1276 and/or 1278 may be replaced with one or more ultrasonic sensors, inductive sensors, and/or capacitive sensors.

As shown in FIG. 12, communication between controllers 1272 and 1273 is handled by three data lines. Two wires connect outputs on controller 1272 to inputs on controller 1273. If control circuitry 1200 is used to control automated stacker and de-stacker 1100, these wires may carry a signal that tells controller 1273 to either open or close clamping mechanism 1110. Furthermore, another wire may carry a feedback signal from an output on controller 1273 to an input on controller 1272. If control circuitry 1200 is used to control automated stacker and de-stacker 1100, that wire may carry a signal that tells controller 1272 whether clamping mechanism 1110 is open or closed. As shown, communication between controllers 1271 and 1272 is handled by a single data line. If control circuitry 1200 is used to control automated stacker and de-stacker 1100, this data line may carry a signal from controller 1271 to controller 1272 that tells controller 1272 to either stack or de-stack a culture plate.

In some embodiments, controllers 1271, 1272, and/or 1273 may communicate through any one of the following types of communication interfaces or standards: USB, Ethernet, RS-232, Serial Peripheral Interface ("SPI"), Inter-Integrated Circuit ("I2C"), Controller Area Network ("CAN"), or a custom-defined communications interface. Controllers 1271, 1272, and/or 1273 may communicate may also communicate wirelessly through, for example, WiFi, Bluetooth, ZigBee, or a custom-defined wireless communications protocol. Similarly, numerous communication interfaces or standards can be utilized between controllers 1272 and 1273 and sensors 1276 and 1278, respectively.

Those skilled in the art will appreciate that various modifications can be made to control circuitry 1200 of FIG. 12. For example, in some embodiments, control circuitry 1200 may include an additional data line for carrying a signal from controller 1271 to controller 1273 that tells controller 1273 to either stack or de-stack a culture plate. As another example, in some embodiments, the roles of controllers 1272 and 1273 may be reversed. For example, controller 1273 may receive commands from controller 1271 and send commands to controller 1272. As another example, in some embodiments, controllers 1272 and 1273 may not directly communicate. Instead, controllers 1272 and 1273 may receive commands from controller 1271 and send data to controller 1271. As yet another example, in some embodiments, controllers 1271, 1272, and/or 1273 may be combined as a single integrated controller.

FIG. 13 illustrates a method 1300 for stacking that may be performed by an automated stacker and de-stacker (e.g., automated stacker and de-stacker 300 or 1100). It is to be understood that the arrows in FIG. 13 are meant to illustrate one possible order in which the various processes of the method 1300 may be performed. However, in some embodiments, the blocks illustrated in FIG. 13 may be rearranged. Moreover, in some embodiments, one or more blocks may be added and/or removed. FIGS. 14(*a*)-14(*h*) illustrate an automated stacker and de-stacker 1400 in an automated specimen processing system that is performing an embodiment of method 1300. In some embodiments, automated stacker and de-stacker 1400 may be structured and/or operated in much the same way as automated stackers and de-stackers 300 and/or 1100.

In block 1310, an automated stacker and de-stacker (e.g., automated stacker and de-stacker 1400) is initialized such that a lift pad (e.g., lift pad 1434) and pins (e.g., pins 1442 and 1444) are positioned below a conveyor track (e.g., side track 1420). An embodiment of block 1310 is illustrated in FIG. 14(*a*).

In block 1320, the pins (e.g., pins 1442 and 1444) are raised to a sufficient height above the conveyor track (e.g., side track 1420) to stop an incoming culture plate (e.g., culture plate 1406). In some embodiments, this may also involve raising the lift pad (e.g., lift pad 1434). For example, as explained above with reference to automated stacker and de-stacker 1100 of FIGS. 11(*a*)-11(*f*), motor 1132 (FIG. 11(*e*) controls lift pad 1434 and pins 1142 and 1144. An embodiment of block 1320 is illustrated in FIG. 14(*b*). As shown, pins 1442 and 1444 extend above side track 1420, and a top surface of lift pad 1434 is positioned immediately below side track 1420.

In block 1330, the incoming culture plate (e.g., culture plate 1406) is stopped by the raised pins (e.g., pins 1442 and 1444) at a position that is both directly beneath a stack of culture plates (e.g., stack of culture plates 1404) and directly above the lift pad (e.g., lift pad 1434). An embodiment of block 1330 is illustrated in FIG. 14(*c*).

In block 1340, the culture plate (e.g., culture plate 1406) is raised by the lift pad (e.g., lift pad 1434) to a position where a top surface of a lid of the culture plate touches or is proximate to a bottom surface of a base of a culture plate at the bottom of the stack of culture plates (e.g., stack of culture plates 1404). In embodiments where the culture plate is merely raised to a position proximate to the stack of culture plates, there is a small gap therebetween. After a clamping mechanism (e.g., clamping mechanism 1410) is opened, the stack of culture plates may fall the short distance of the gap. However, after the stack of culture plates touches the top surface of the lid of the culture plate, the culture plate can support the stack of culture plates. An embodiment of block 1340 is illustrated in FIG. 14(*d*).

In block 1350, the clamping mechanism (e.g., clamping mechanism 1410) is opened and the culture plate (e.g., culture plate 1406) is raised along with the entirety of the stack of culture plates (e.g., stack of culture plates 1404) by the lift pad. In this block, the culture plate may be raised to a position where the clamps (e.g., clamps 1412 and 1414) of the clamping mechanism will contact the culture plate when the clamping mechanism is closed again. An embodiment of block 1350 is illustrated in FIG. 14(*e*).

In block 1360, the clamping mechanism (e.g., clamping mechanism 1410) is closed. As shown in FIG. 14(*f*), the clamps (e.g., clamps 1412 and 1414) of clamping mechanism 1410 contact culture plate 1406 when clamping mechanism 1410 is closed. More specifically, the clamps contact a base of culture plate 1406. As discussed above in relation to FIGS. 6(*a*)-6(*b*), the clamping force applied to culture plate 1406 by clamping mechanism 1410 can be minimized in this type of configuration. However, other configurations may be used.

In block 1370, the lift pad (e.g., lift pad 1434) is lowered to a position below the conveyor track (e.g., side track 1420). An embodiment of block 1370 is illustrated in FIG. 14(*g*). In some embodiments, the lift pad may be lowered to a similar position that it was in during block 1320. For example, in FIGS. 14(*b*) and 14(*g*), lift pad 1434 is in a similar position.

In block 1380, the pins (e.g., pins 1442 and 1444) are lowered to a position below the conveyor track (e.g., side track 1420). In some embodiments, this may also involve lowering the lift pad (e.g., lift pad 1434). For example, as explained above with reference to automated stacker and de-stacker 1100 of FIGS. 11(*a*)-11(*f*), motor 1132 controls lift pad 1134 and pins 1142 and 1144. An embodiment of block 1380 is illustrated in FIG. 14(*h*).

Figure 15:
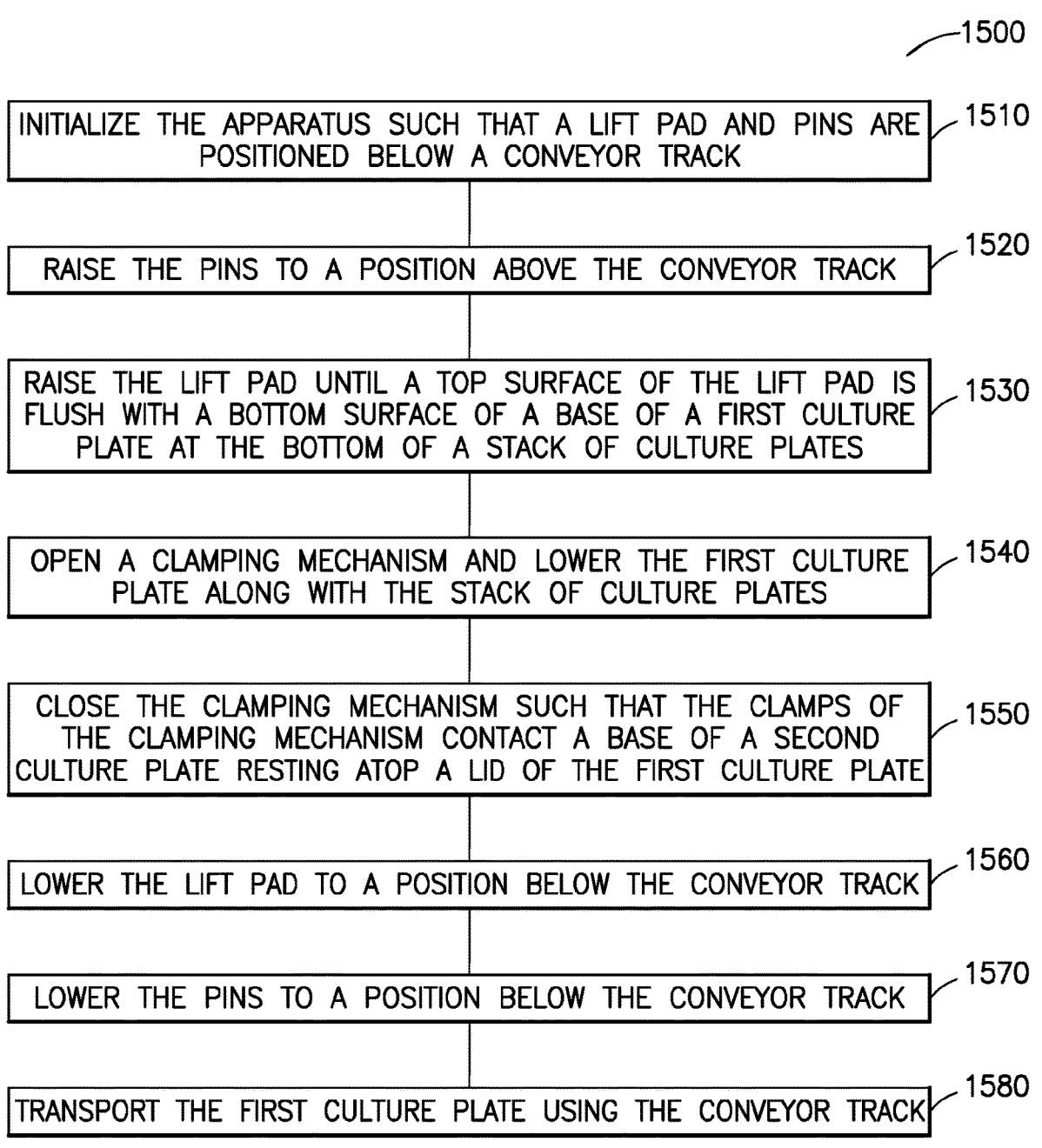
FIG. 15 illustrates a method for de-stacking that may be performed by an automated stacker and de-stacker that may be integrated into an automated specimen processing system.
Figure 16A:
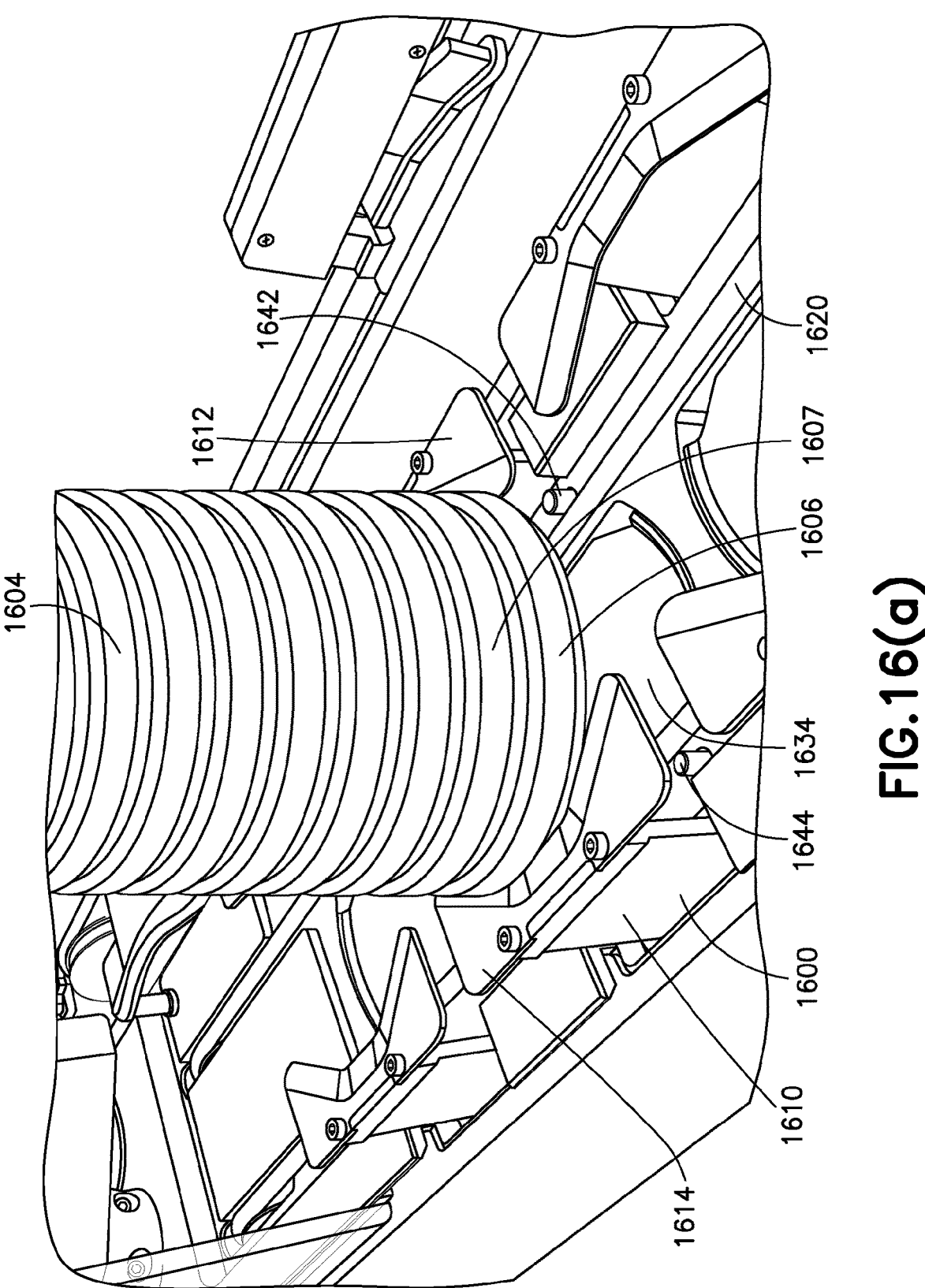
FIGS. 16(a)-16(h) illustrate different potential states of an automated stacker and de-stacker that has been integrated into an automated specimen processing system.
Figure 16B:
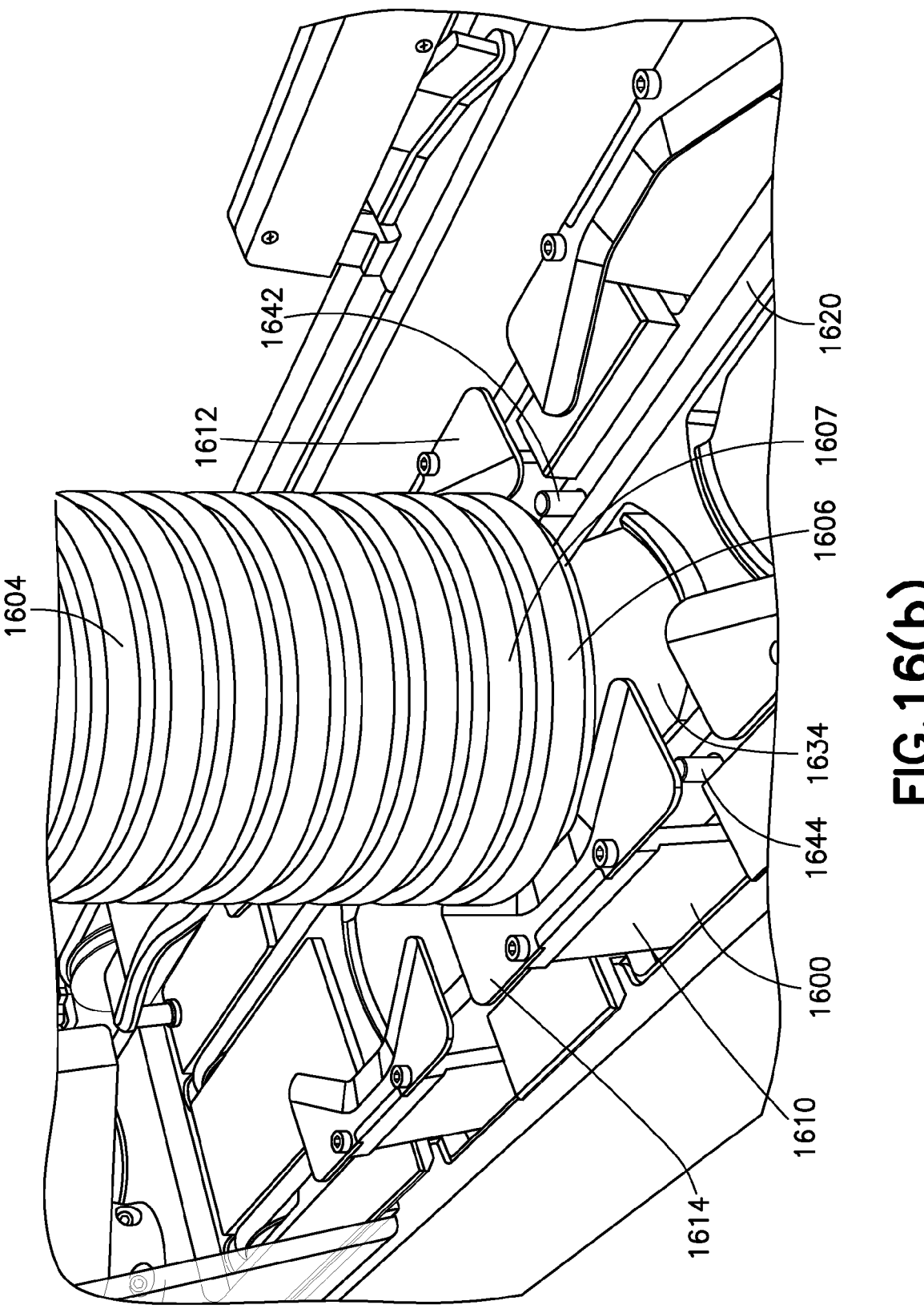
Figure 16C:
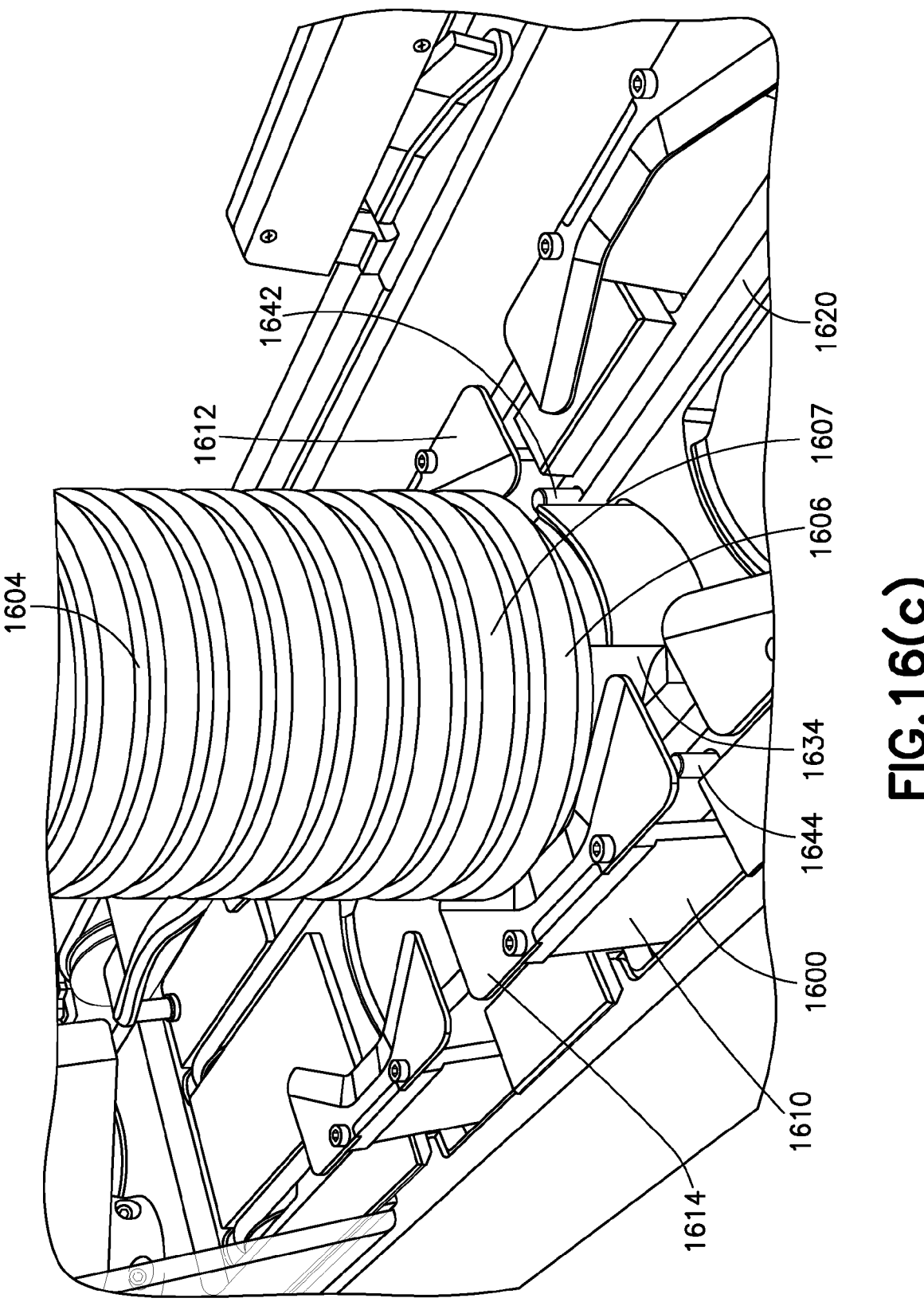
Figure 16D:
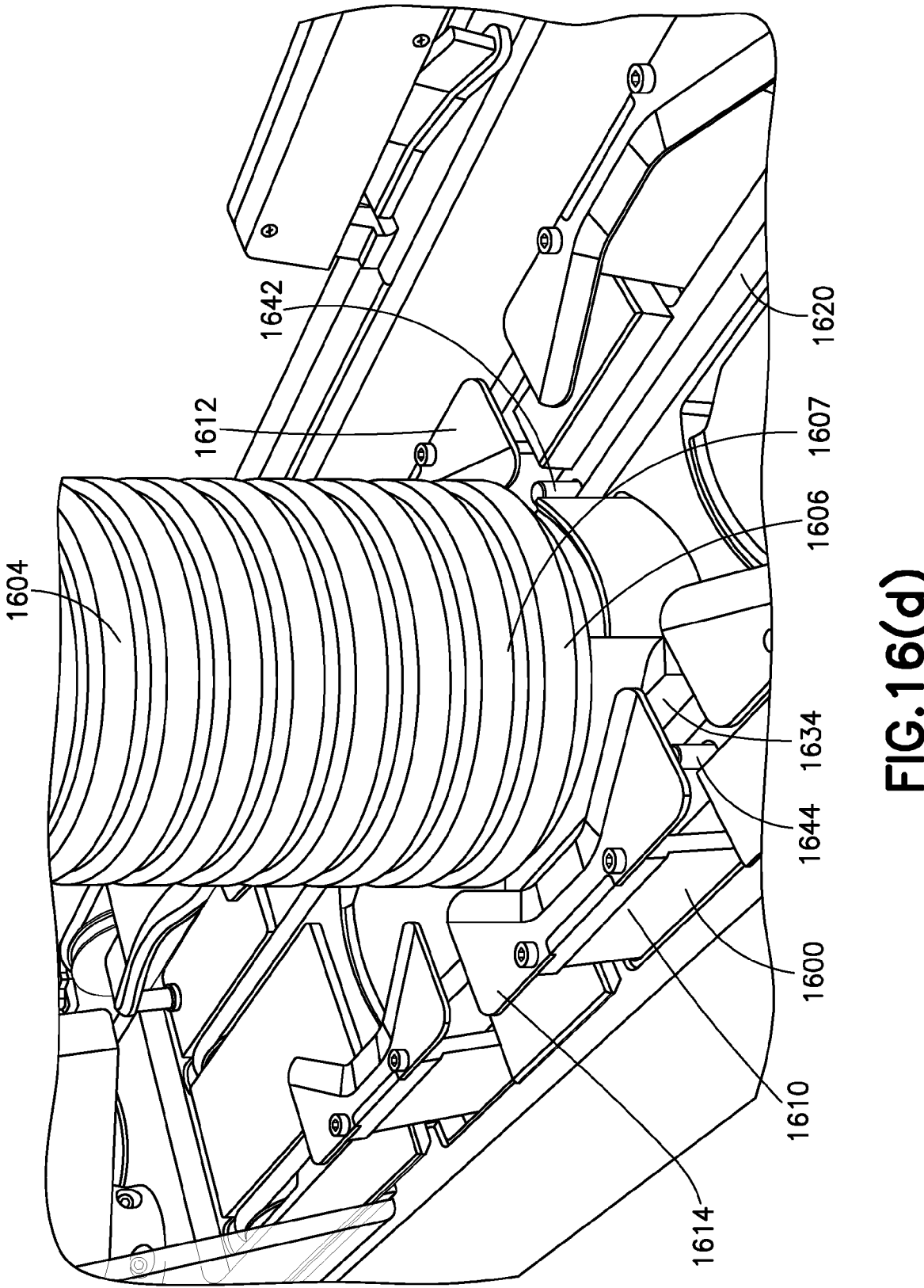
Figure 16E:
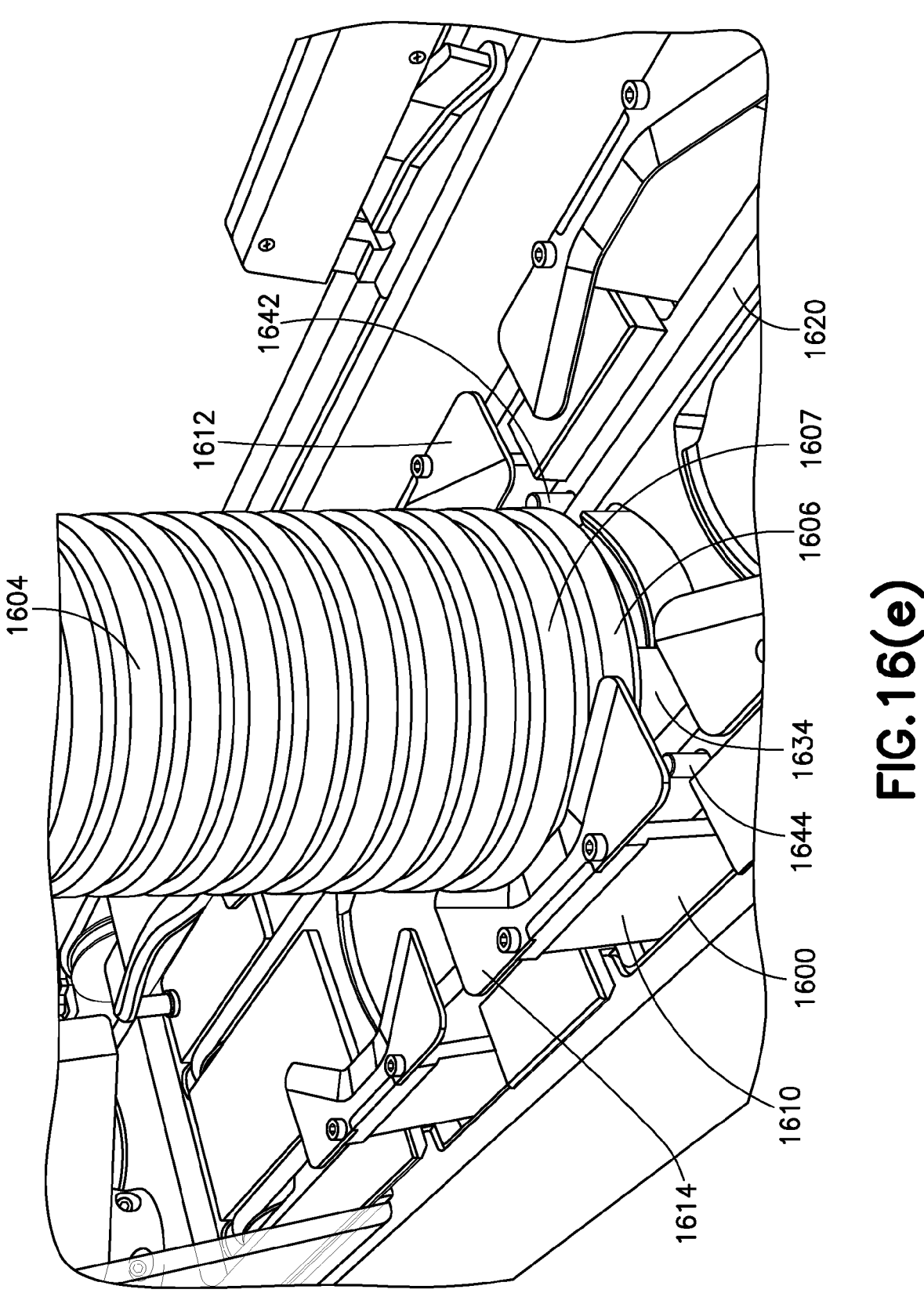
Figure 16F:
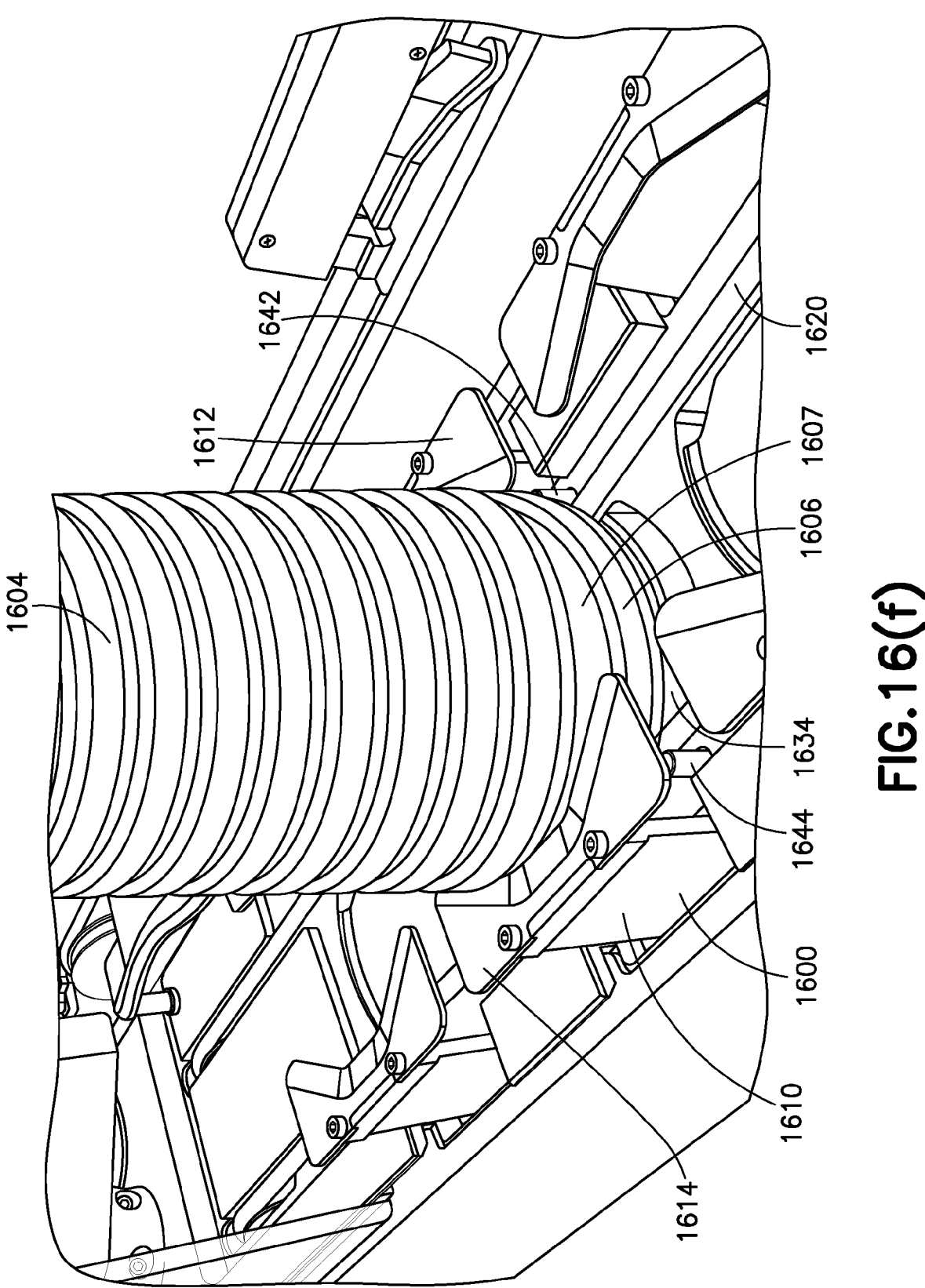
Figure 16G:
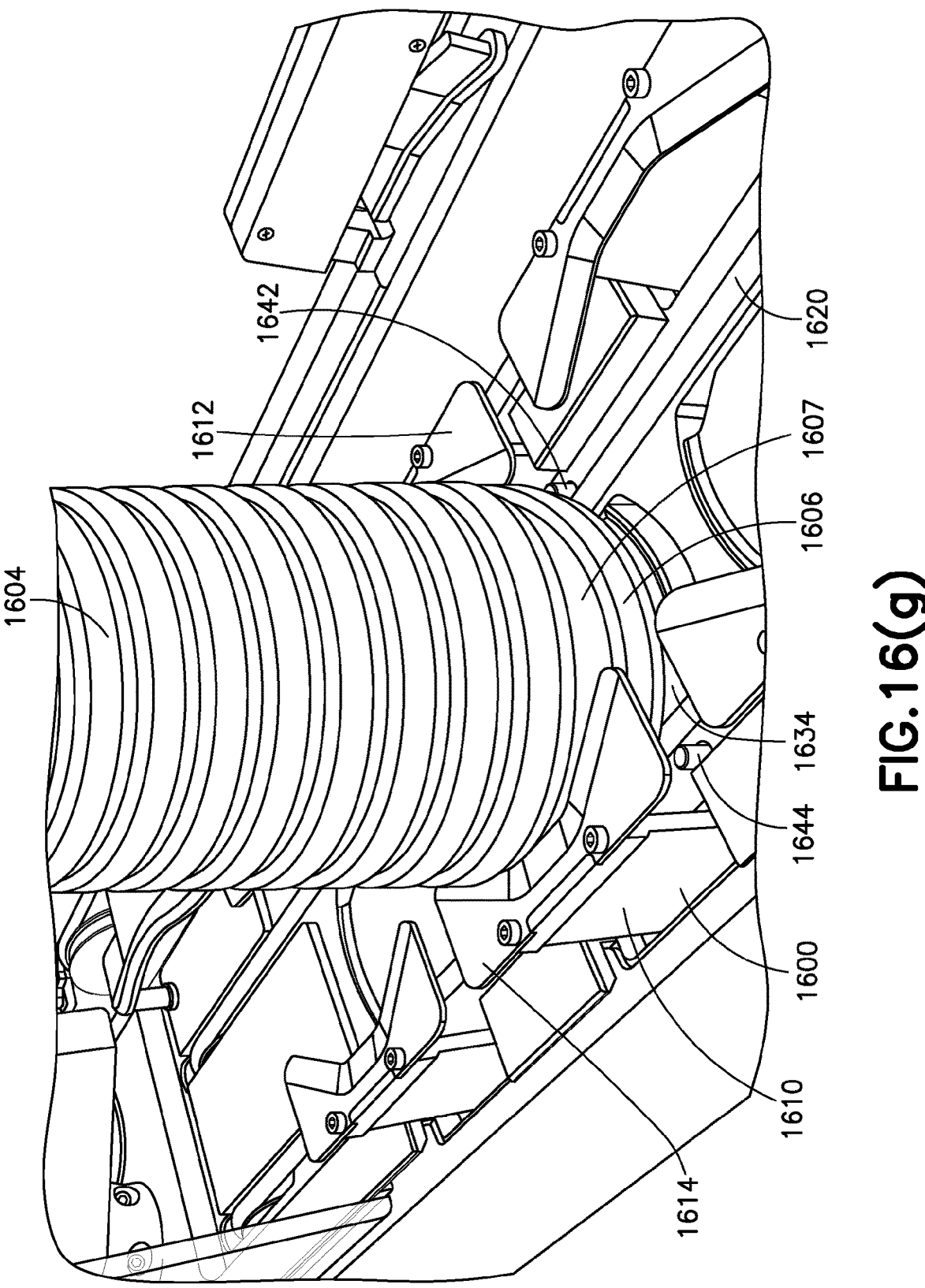
Figure 16H:
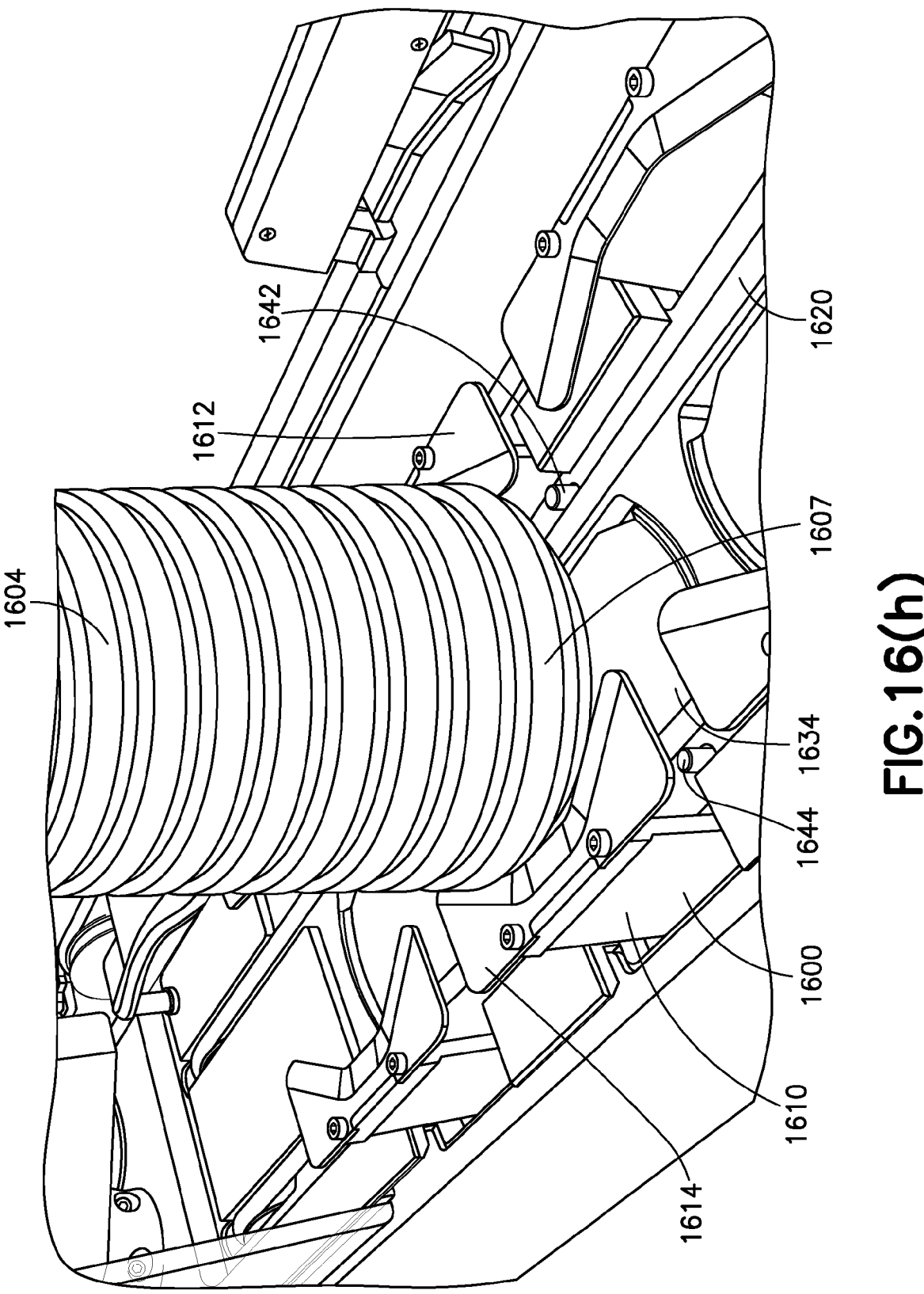

FIG. 15 illustrates a method 1500 for de-stacking that may be performed by an automated stacker and de-stacker (e.g., automated stacker and de-stacker 300 or 1100). It is to be understood that the arrows in FIG. 15 are meant to illustrate one possible order in which the various processes of the method 1500 may be performed. However, in some embodiments, the blocks illustrated in FIG. 15 may be rearranged. Moreover, in some embodiments, one or more blocks may be added and/or removed. FIGS. 16(*a*)-16(*h*) illustrate an automated stacker and de-stacker 1600 in an automated specimen processing system that is performing an embodiment of method 1500. In some embodiments, automated stacker and de-stacker 1600 may be structured and/or operated in much the same way as automated stackers and de-stackers 300 and/or 1100.

In block 1510, an automated stacker and de-stacker (e.g., automated stacker and de-stacker 1600) is initialized such that a lift pad (e.g., lift pad 1634) and pins (e.g., pins 1642 and 1644) are positioned below a conveyor track (e.g., side track 1620). An embodiment, of block 1510 is illustrated in FIG. 16(*a*).

In block 1520, the pins (e.g., pins 1642 and 1644) are raised to a position above the conveyor track (e.g., side track 1620). In some embodiments, this may also involve raising the lift pad (e.g., lift pad 1634). For example, as explained above with reference to automated stacker and de-stacker 1100 of FIGS. 11(*a*)-11(*f*), motor 1132 controls lift pad 1134 and pins 1142 and 1144. An embodiment of block 1520 is illustrated in FIG. 16(*b*). As shown, pins 1642 and 1644 extend above side track 1620, and a top surface of lift pad 1634 is positioned immediately below side track 1620.

In block 1530, the lift pad (e.g., lift pad 1634) is raised to a position where a top surface of the lift pad touches or is proximate to a bottom surface of a base of a first culture plate (e.g., culture plate 1606) at the bottom of the stack of culture plates (e.g., stack of culture plates 1604). In embodiments where the lift pad is merely raised to a position proximate to the stack of culture plates, there is a small gap therebetween. After a clamping mechanism (e.g., clamping mechanism 1610) is opened, the stack of culture plates may fall the short distance of the gap. However, after the stack of culture plates touches the top surface of the lift pad, the lift pad can support the stack of culture plates. An embodiment, of block 1530 is illustrated in FIG. 16(*c*).

In block 1540, the clamping mechanism (e.g., clamping mechanism 1610) is opened and the first culture plate (e.g., culture plate 1606) is lowered along with the entirety of the stack of culture plates (e.g., stack of culture plates 1604) by the lift pad. In this block, a second culture plate (e.g., culture plate 1607) resting atop a lid of the first culture plate may be lowered to a position where the clamps (e.g., clamps 1612 and 1614) of the clamping mechanism will contact the second culture plate when the clamping mechanism is closed again. An embodiment, of block 1540 is illustrated in FIG. 16(*d*).

In block 1550, the clamping mechanism (e.g., clamping mechanism 1410) is closed. As shown in FIG. 16(*e*), the clamps (e.g., clamps 1612 and 1614) of clamping mechanism 1610 contact culture plate 1607 when clamping mechanism 1610 is closed. More specifically, the clamps contact a base of culture plate 1607. As discussed above in relation to FIGS. 6(*a*)-6(*b*), the clamping force applied to culture plate 1607 by clamping mechanism 1610 can be minimized in this type of configuration. However, other configurations may be used.

In block 1560, the lift pad (e.g., lift pad 1634) is lowered to a position below the conveyor track (e.g., side track 1620). An embodiment, of block 1560 is illustrated in FIG. 16(*f*). In some embodiments, the lift pad may be lowered to a similar position that it was in during block 1520. For example, in FIGS. 16(*b*) and 16(*f*), lift pad 1634 is in a similar position.

In block 1570, the pins (e.g., pins 1642 and 1644) are lowered to a position below the conveyor track (e.g., side track 1620). In some embodiments, this may also involve lowering the lift pad (e.g., lift pad 1634). For example, as explained above with reference to automated stacker and de-stacker 1100 of FIGS. 11(*a*)-11(*f*), motor 1132 controls lift pad 1134 and pins 1142 and 1144. An embodiment, of block 1570 is illustrated in FIG. 16(*g*).

In block 1580, the first culture plate (e.g., culture plate 1606) is transported to another location within the automated specimen processing system by the conveyor track (e.g., side track 1620). An embodiment, of block 1580 is illustrated in FIG. 16(*h*).

FIGS. 17(*a*)-17(*k*) illustrate various side-views and/or components of another automated stacker and de-stacker. As shown, automated stacker and de-stacker 1700 includes clamping mechanism 1710, motor 1722, motor 1732, lift pad 1734, pin 1742, pin 1744, controller 1772, controller 1773, sensor 1776, sensor 1777, sensor 1778, and sensor 1779. Clamping mechanism 1710 includes clamps 1712 and 1714. Controller 1772 controls motor 1732, which is used to raise and lower lift pad 1734, pin 1742, and pin 1744. Controller 1773 controls motor 1722, which is used to open and close clamping mechanism 1710. In some embodiments, motors 1722 and 1732 are electric motors (e.g., AC motors, DC motors, stepper motors, etc.). In some embodiments, controllers 1772 and 1773 may be structured and/or operated in much the same way as controllers 1272 and 1273 of FIG. 12, respectively. Furthermore, in some embodiments, controllers 1772 and 1773 may receive commands from another controller (not shown), such as controller 1271, and send data to that controller.

Sensor 1776 may be used to determine whether a culture plate is ready to be stacked. For example, sensor 1776 may be used to determine whether a culture plate is positioned beneath clamping mechanism 1710. In some embodiments, sensor 1776 may be an optical sensor (e.g., SICK's VTE6-P3121S01 Photoelectric Proximity Sensor). As shown, lift pad 1734 includes a hole 1739 through which sensor 1776 can transmit and/or receive signals. For example, sensor 1776 can transmit light signals and receive reflected light signals through hole 1739. When an object, such as a culture plate, is above sensor 1776, the light initially transmitted by sensor 1776 is reflected back to it through hole 1739. When this occurs, sensor 1776 may send controller 1772 a signal indicating that a culture plate is positioned above it. In some embodiments, the detection distance of sensor 1776 can be adjusted using a dial (not shown).

Sensors 1777, 1778, and 1779 may be used to determine whether lift pad 1734 is in a particular position. For example, sensor 1277 may be used to determine whether lift pad 1734 is in the position illustrated in FIG. 17(*i*), sensor 1278 may be used to determine whether lift pad 1734 is in the position illustrated in FIG. 17(*j*), and sensor 1279 may be used to determine whether lift pad 1734 is in the position illustrated in FIG. 17(*k*). In some embodiments, sensors 1777, 1778, and/or 1779 may be U-shaped optical sensors (e.g., Panasonic's PM-Y45 Photoelectric Sensor). In some such embodiments, sensors 1777, 1778, and/or 1779 may send signals to controller 1772 when an object (e.g., an arm 1737 of lift pad 1734) breaks a beam of light between the two sides of the U-shape of sensors 1777, 1778, and/or 1779.

In some embodiments, additional sensors that are structured and/or operated in much the same way as sensors 1777, 1778, and/or 1779 may be included in automated stacker and de-stacker 1700 to determine whether other components, such as clamping mechanism 1710, are in a particular position.

As shown in FIG. 17(*a*) automated stacker and de-stacker 1700 may be incorporated into an automated specimen processing system including stage 1701, belt 1702, belt 1703, belt 1704, belt 1705, wall 1708, and wall 1709. During operation, a culture plate may travel along belts 1704 and 1705 towards automated stacker and de-stacker 1700. Walls 1708 and 1709 may help guide the culture plate towards automated stacker and de-stacker 1700 by ensuring that the culture plate does not slide off of belts 1704 and 1705. In some embodiments, belts 1702 and 1703 may form part of a main track (e.g., main track 210) and belts 1704 and 1705 may form part of a main track (e.g., side track 220). In such embodiments, the automated specimen processing system may also include one or more mechanisms for transferring culture plates between the main track and the side track (e.g., off-ramp catcher 252 and/or on-ramp catcher 254).

As shown in FIG. 17(*b*) automated stacker and de-stacker 1700 includes two separate components. One component includes motor 1732, lift pad 1734, pin 1742, pin 1744, and controller 1772. This component may be coupled to a bottom surface of stage 1701. The other component includes clamping mechanism 1710, motor 1722, and controller 1773. As shown in FIG. 17(*a*), this component may be coupled to walls 1708 and 1709 through support beams 1713 and 1715. In other embodiments, the components of automated stacker and de-stacker 1700 may be more integrated. For example, a single controller may control motors 1722 and 1732.

As shown in FIGS. 17(*c*) and 17(*d*), spring 1716 extends from clamp 1712 to clamp 1714. Furthermore, bearing block 1764, bearing block 1766, and bearing block 1768 are coupled to clamp 1712, clamp 1714, and bi-directional lead screw 1724, respectively. During operation, motor 1722 may rotate bi-directional lead screw 1724 clockwise or counterclockwise in order to open or close clamping mechanism 1710. For example, in order to open clamping mechanism 1710, motor 1722 may rotate bi-directional lead screw 1724 such that bearing block 1768 moves downward. Due to the wedge-like shape of bearing block 1768, as it moves downward, it pushes bearing blocks 1764 and 1766 in an outward direction. For example, from the perspective of FIGS. 17(*c*) and 17(*d*), as bearing block 1768 moves downward, bearing block 1768 pushes bearing block 1764 in a leftward direction, and it pushes bearing block 1766 in a rightward direction. Similarly, in order to close clamping mechanism 1710, motor 1722 may rotate bi-directional lead screw 1724 such that bearing block 1768 moves upward. As bearing block 1768 moves upward, spring 1716 pulls bearing blocks 1764 and 1766 in an inward direction. For example, from the perspective of FIGS. 17(*c*) and 17(*d*), as bearing block 1768 moves downward, spring 1716 pulls bearing block 1764 in a rightward direction, and it pulls bearing block 1766 in a leftward direction.

Advantageously, much like clamping mechanism 1110, clamping mechanism 1710 does not require any electricity to stay in a closed position because the clamping force is provided by spring 1716. Electricity is used in this embodiment to open clamping mechanism 1710. Therefore, in the event of a power outage, a stack of culture plates will remain clamped and secured in automated stacker and de-stacker 1700. Furthermore, by using spring 1716, clamping mechanism 1710 can easily adapt to culture plates with different diameters.

Figure 17A:
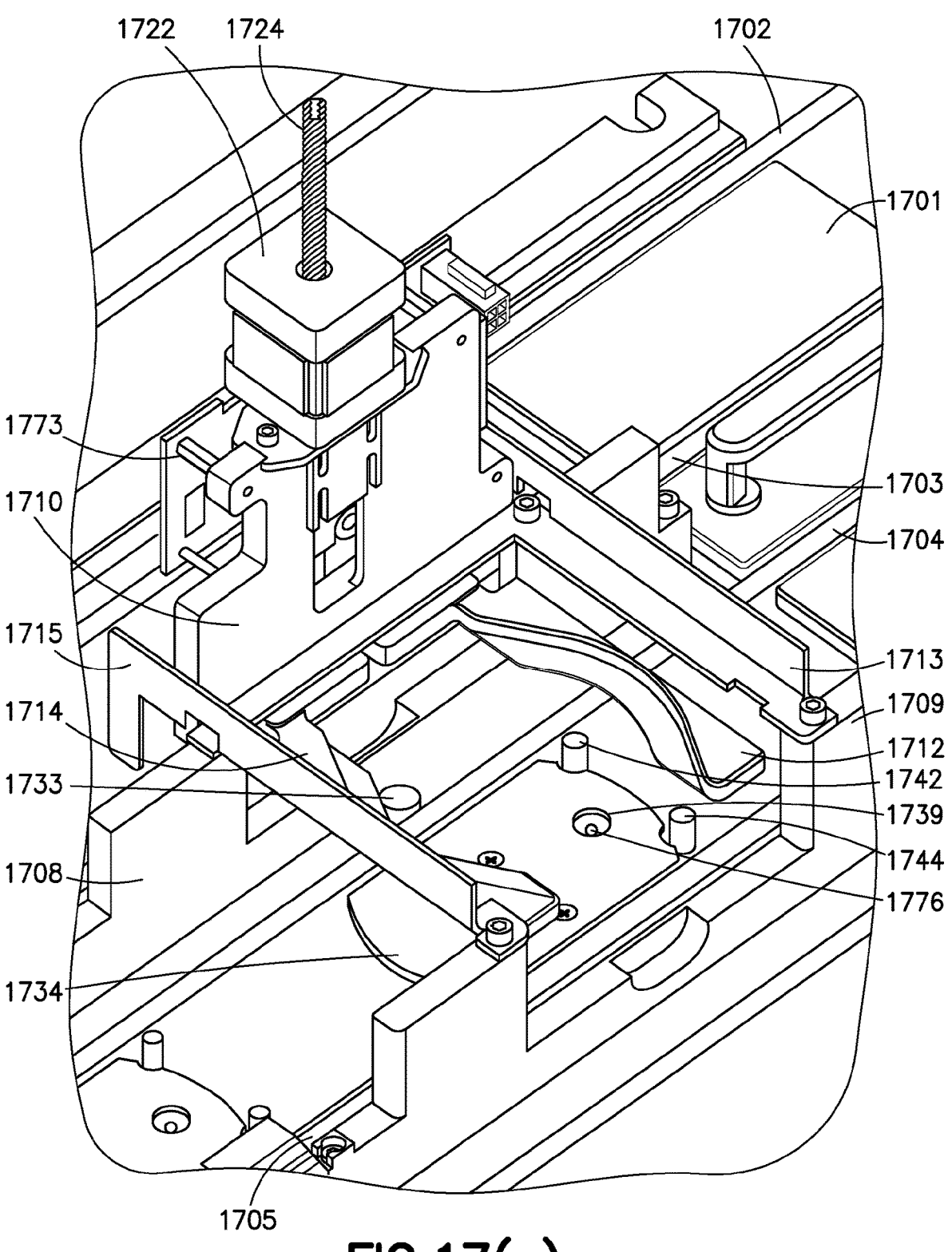
FIGS. 17(a)-17(k) illustrate an automated stacker and de-stacker that may be integrated into an automated specimen processing system. More specifically.
Figure 17B:
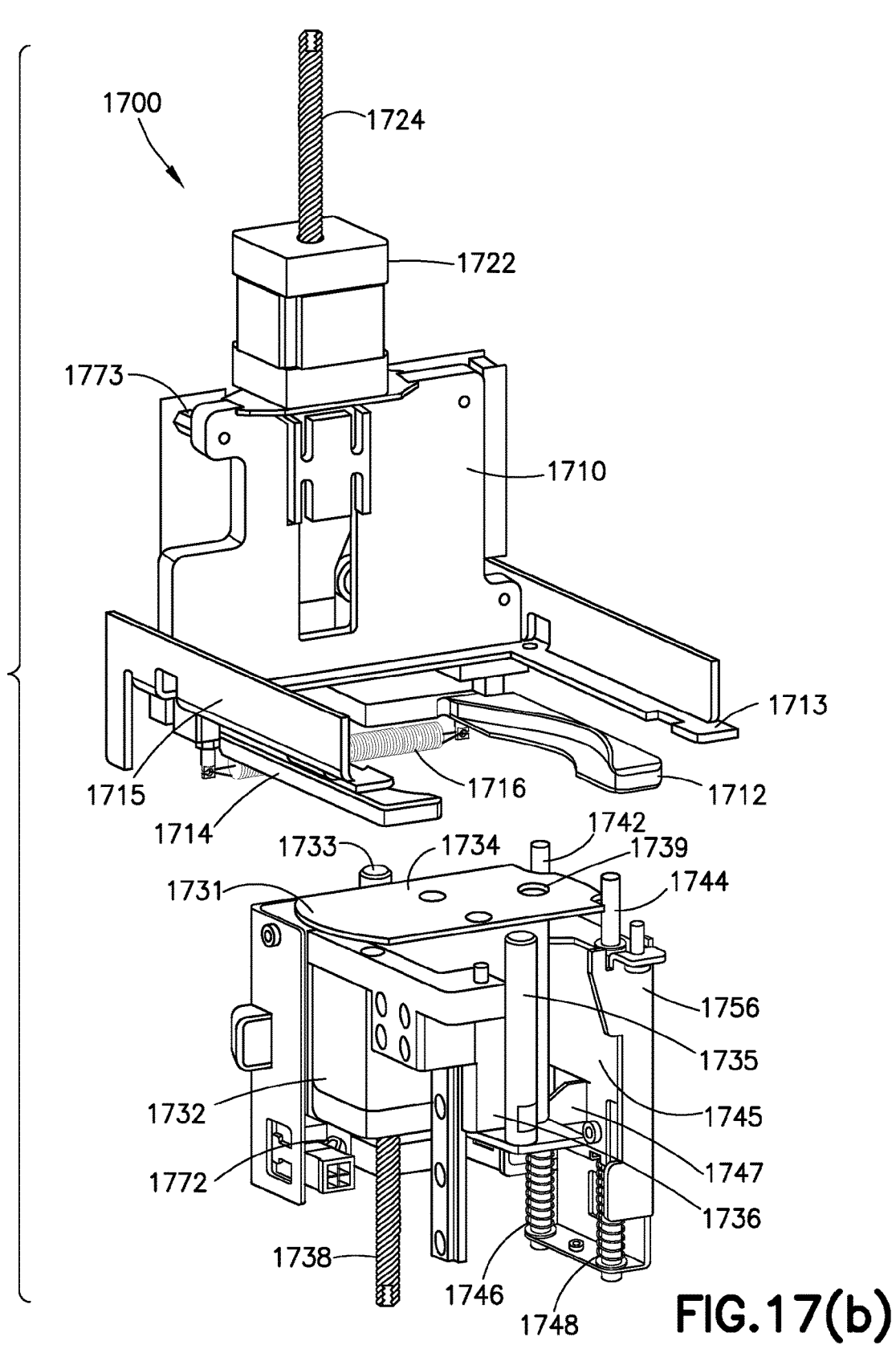
Figure 17C:
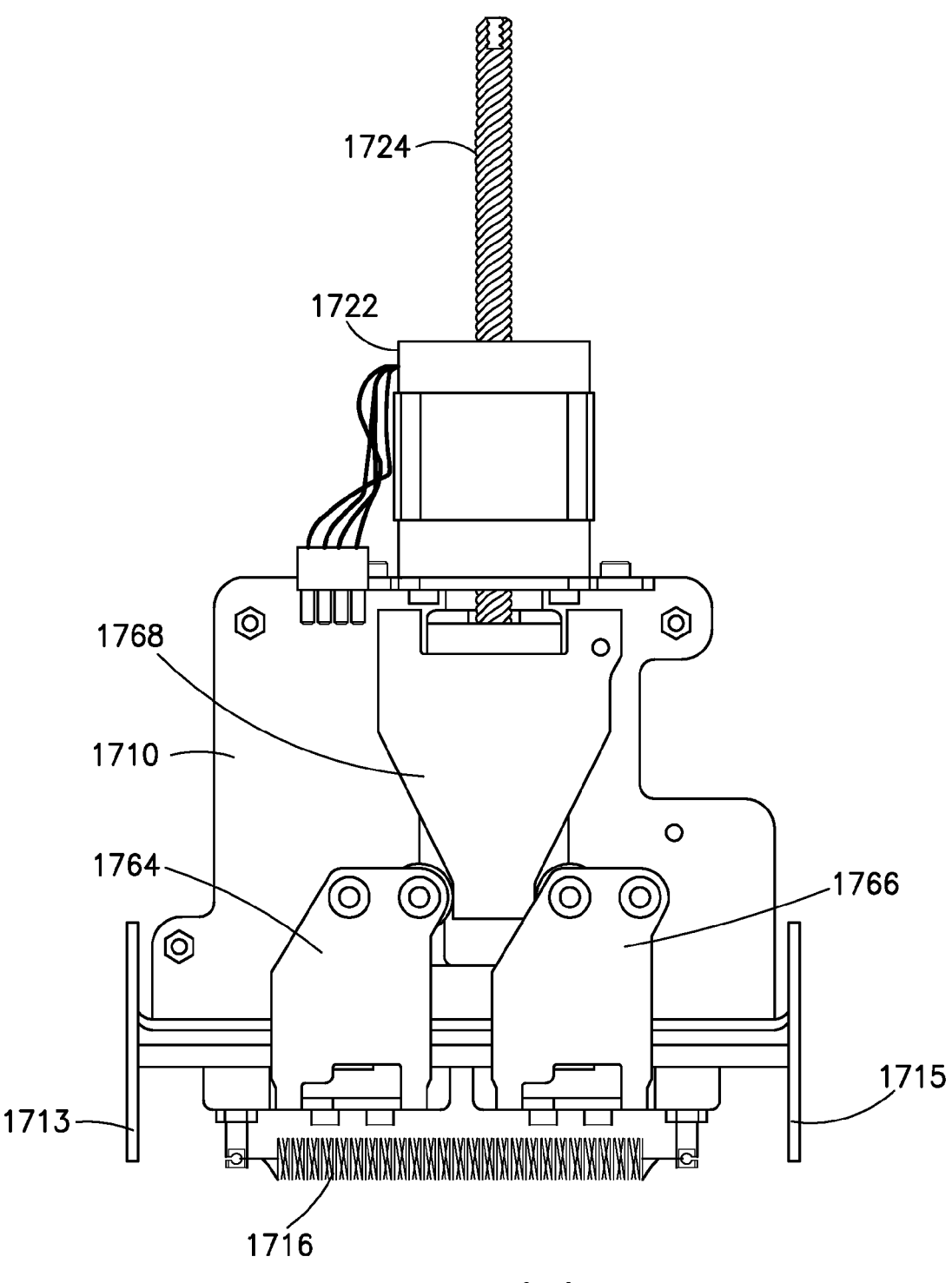
Figure 17D:
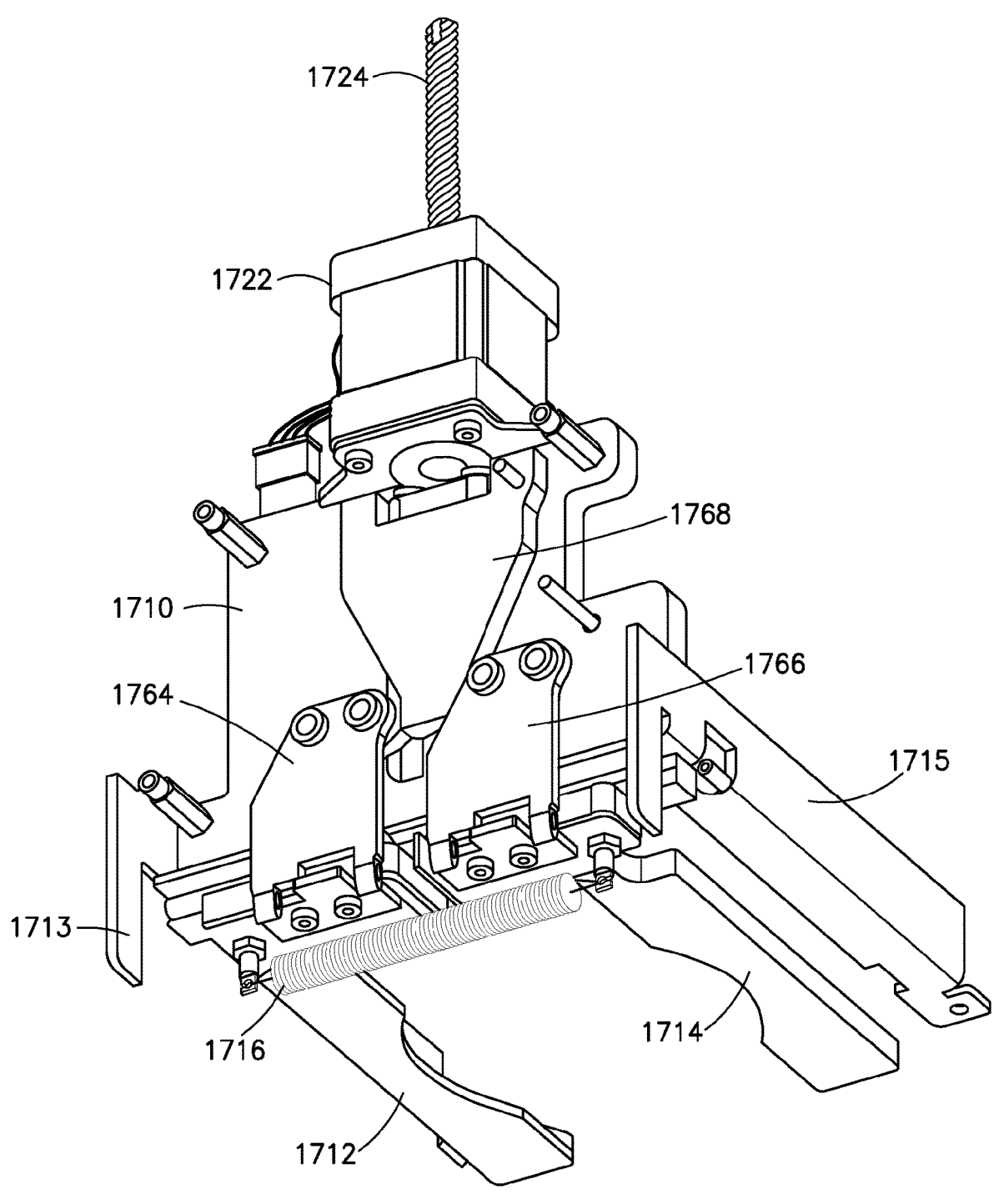
Figures 17E, 17F:
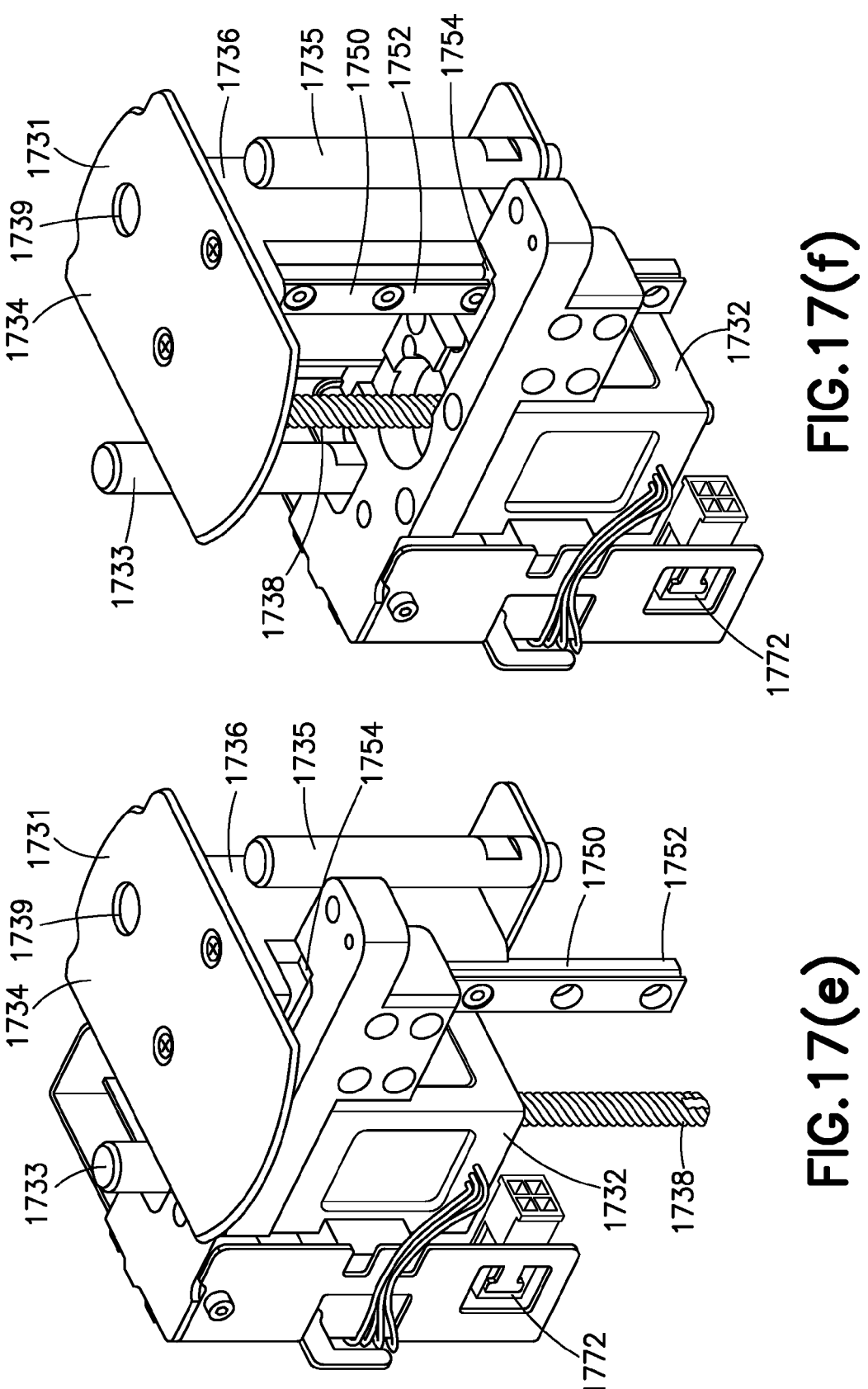

As shown in FIGS. 17(e) and 17(f), motor 1732 is connected to lift pad 1734 via lead screw 1738. Furthermore, a linear guideway 1750 is coupled to lift pad 1734. Linear guideway 1750 includes rail 1752 and bearing block 1754. Lift pad 1734 is coupled to rail 1752, which can slide upwards and downwards through bearing block 1754. Bearing block may be coupled to another stationary component, such as a bottom surface of stage 1701. During operation, motor 1732 may rotate lead screw 1738 clockwise or counterclockwise in order to raise or lower lift pad 1734. As lift pad 1734 is raised and lowered by motor 1732, linear guideway 1750 provides stability to lift pad 1734. As shown in FIG. 17(e), lift pad 1734 is in a lowered state. As shown in FIG. 17(f), lift pad 1734 is in a raised state.

Advantageously, lift pad 1734 includes posts 1733 and 1735, which provide additional support for a culture plate being stacked or de-stacked by automated stacker and de-stacker 1700. As shown, the top surfaces of posts 1733 and 1735 are approximately coplanar with a central pad 1731 of lift 1734. Furthermore, the gaps between posts 1733 and 1735 and central pad 1731 are large enough to accommodate belts 1704 and 1705. As a result, belts 1704 and 1705 do not impede the upward or downward movement of lift pad 1734. In some embodiments, lift pad 1734 may include additional posts. Furthermore, in some embodiments, posts 1733 and/or 1735 may be omitted from lift pad 1734. For example, lift pad 1734 may be structured more like lift pad 1134 (see, e.g., FIG. 11(b)). Similarly, in some embodiments, lift pad 1134 may be structured more like lift pad 1734 and include one or more posts that offer additional support for a culture plate being stacked or de-stacked by automated stacker and de-stacker 1100.

Figure 17H:
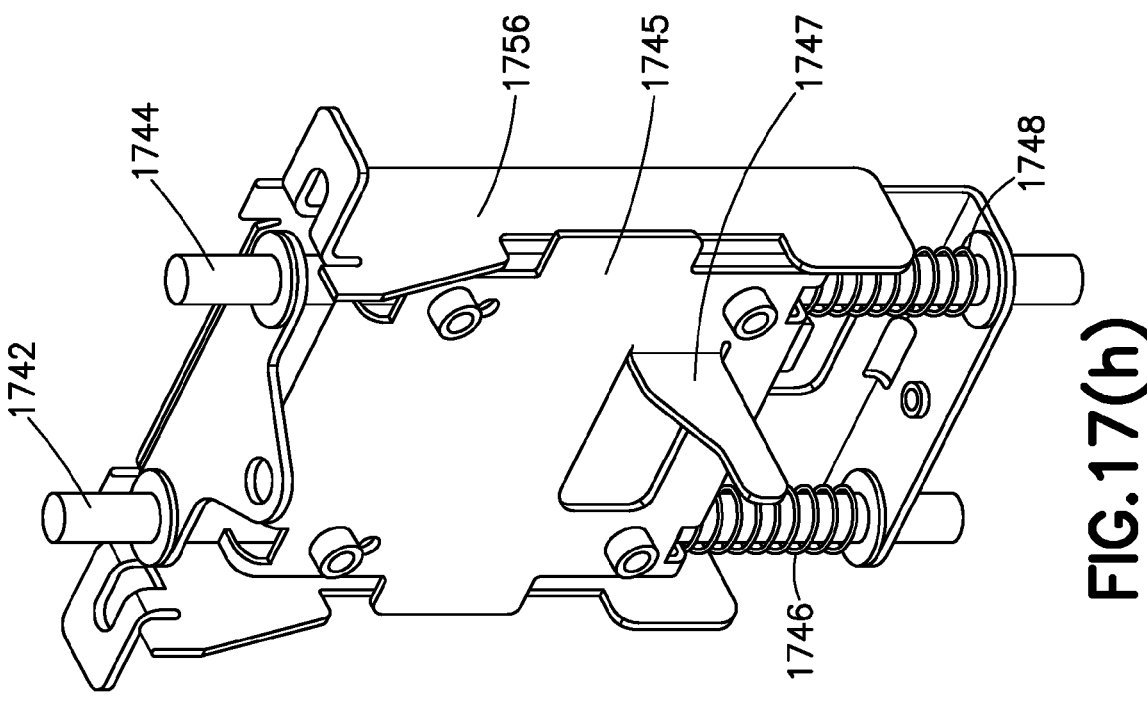
Figure 17G:
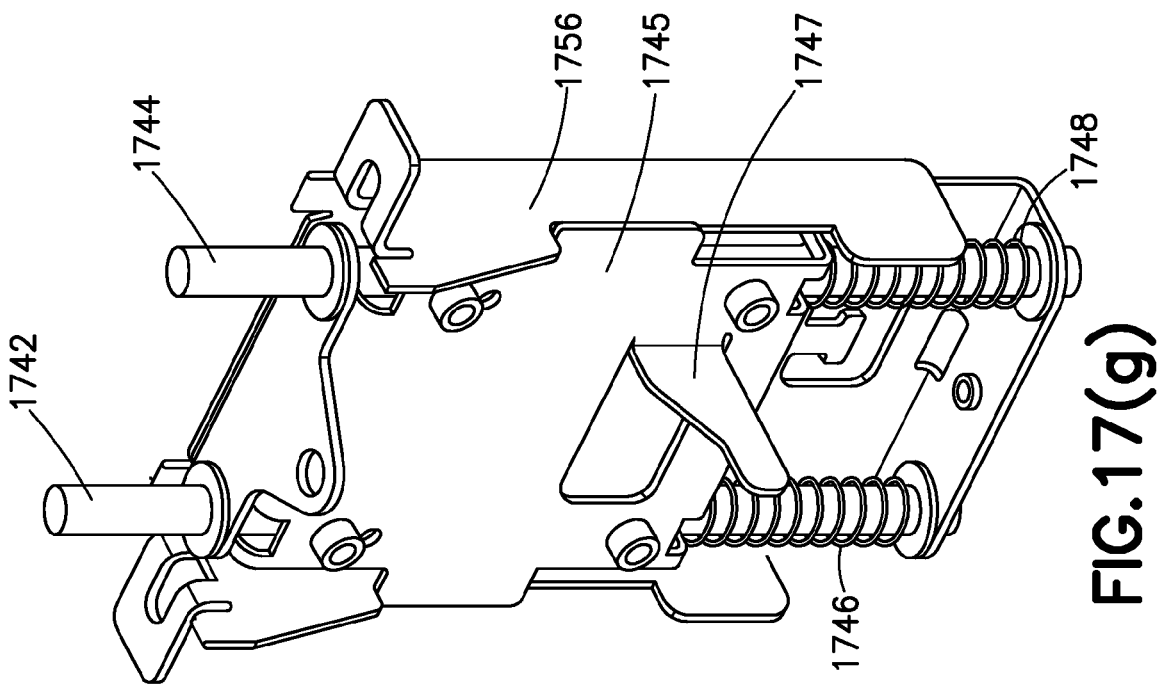

As shown in FIGS. 17(g) and 17(h), pins 1742 and 1744 are urged upward by springs 1746 and 1748, respectively. Furthermore, pin 1742 is coupled to pin 1744 via plate 1745. Springs 1746 and 1748 are positioned beneath plate 1745. The upward and downward movement of pins 1742 and 1744 is guided by guide structure 1756. In some embodiments, springs 1746 and 1748 may be configured to raise pins 1742 and 1744 by 6.5 mm to a position that is 4 mm above stage 1701. In some embodiments, springs 1746 and 1748 are conical compression springs, which, advantageously, can be fully flattened when compressed and minimize the space required by automated stacker and de-stacker 1700. As shown in FIG. 17(g), pins 1742 and 1744 are fully raised. As shown in FIG. 17(h), pins 1742 and 1744 are partially retracted. In some embodiments, pins 1742 and 1744 are configured to contact a base (not a lid) of a culture plate. In other embodiments, pins 1742 and 1744 are configured to contact a lid of a culture plate.

Figure 17I:
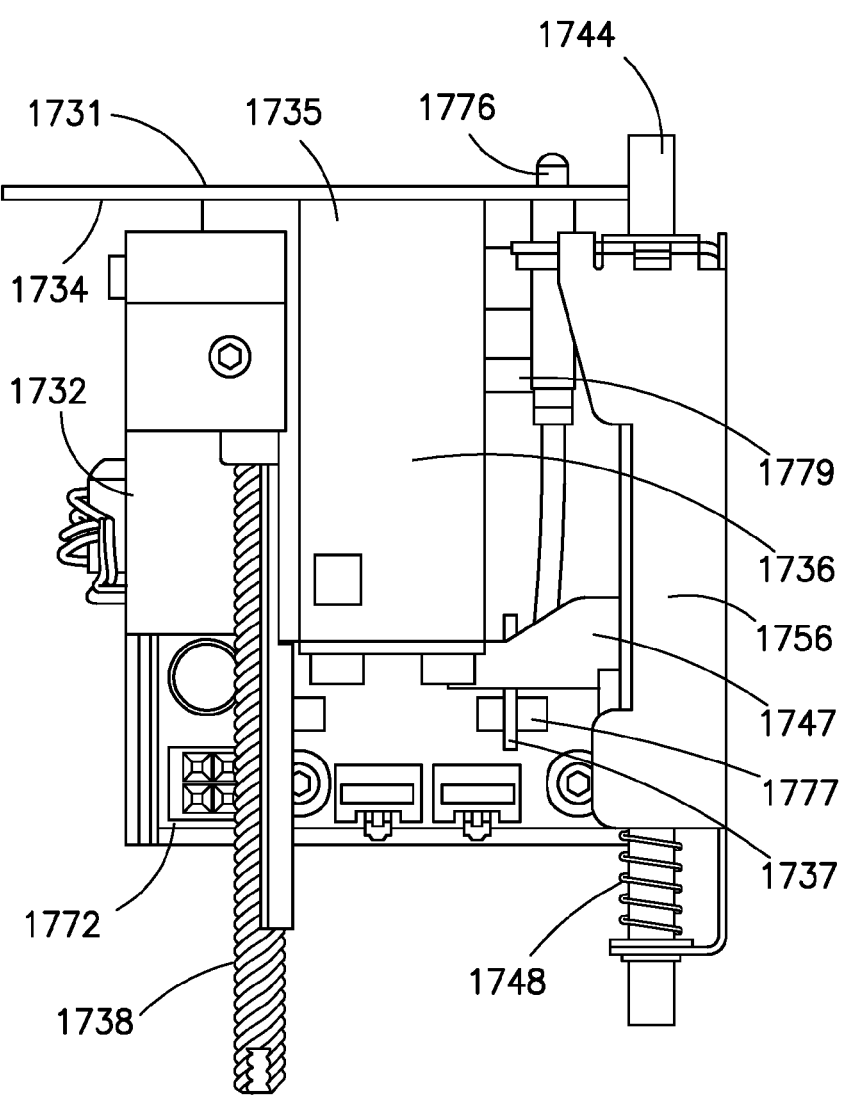
Figure 17J:
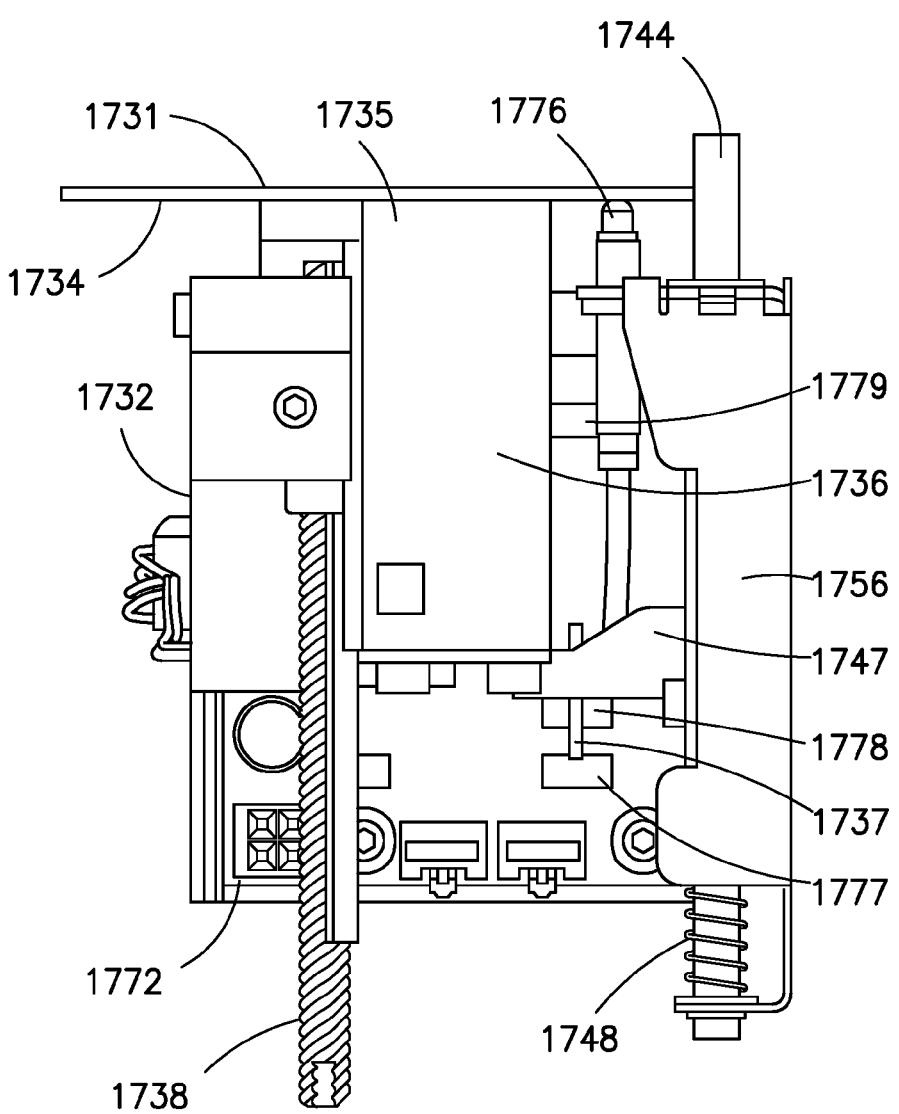
Figure 17K:
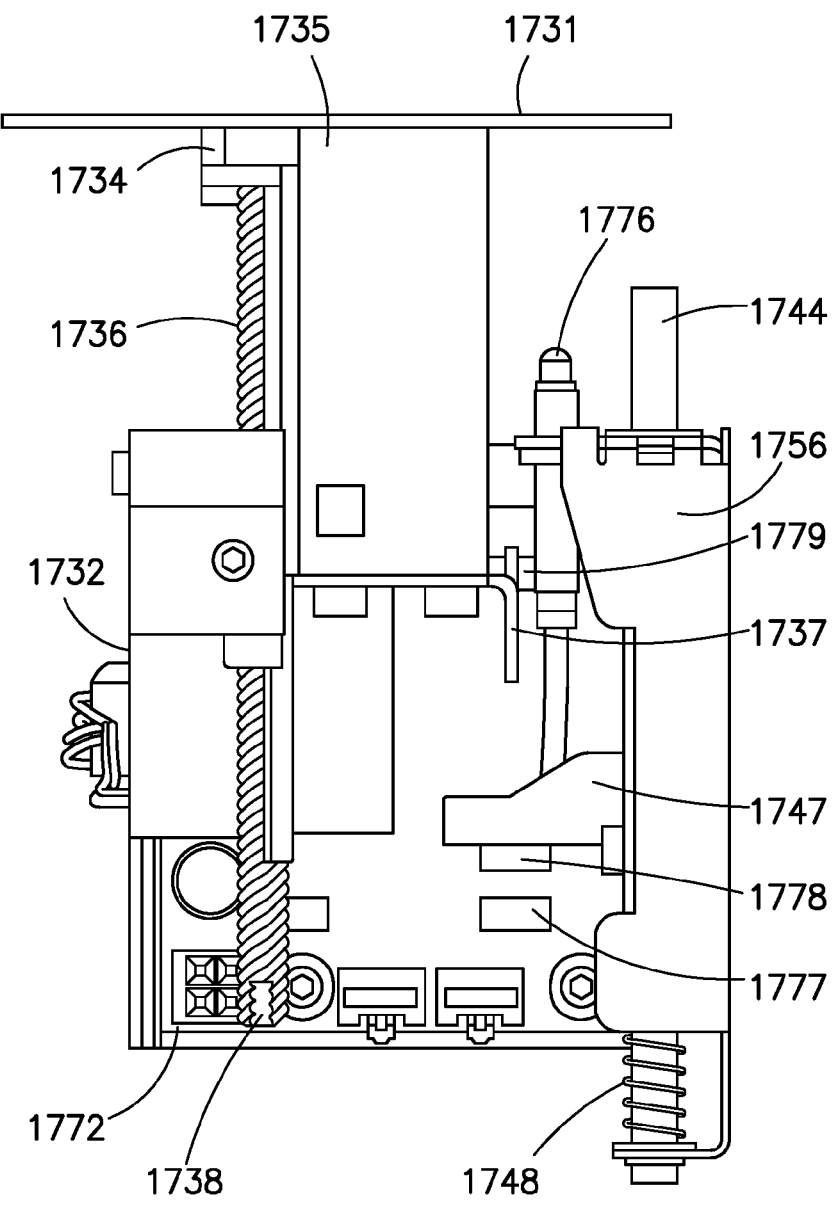

As shown in FIGS. 17(i)-17(k), lift pad 1734 may be used to lower pins 1742 and 1744. As a result, motor 1732 can advantageously be used to actuate lift pad 1734, post 1733, post 1735, pin 1742, and pin 1744. However, in other embodiments, multiple motors can be used to actuate these components. As shown in FIG. 17(i), lift pad 1734 may be lowered by motor 1732 to a position where a base 1736 of lift pad 1734 contacts an arm 1747 of plate 1745 and applies a downward force to springs 1746 and 1748. As shown in FIG. 17(j), lift pad 1734 may be raised by motor 1732 to a position where base 1736 touches arm 1747 without applying a significant downward force to springs 1746 and 1748. As shown in FIG. 17(k), lift pad 1734 may be raised by motor 1732 to a position where base 1736 does not touch arm 1747. As shown in FIGS. 17(j) and 17(k), pins 1742 and 1744 are fully raised.

In some embodiments, one or more blocks of methods 1300 and/or 1500 may be performed by automated stacker and de-stacker 1700. For example, as shown in FIG. 17(i), automated stacker and de-stacker 1700 may be initialized such that lift pad 1734, pin 1742, and pin 1744 are positioned below belts 1704 and 1705. Therefore, blocks 1310 and/or 1510 may be performed by automated stacker and de-stacker 1700. As another example, as explained above, motor 1732 may raise or lower lift pad 1734 and/or pins 1742 and 1744. Therefore, blocks 1320, 1330, 1340, 1370, 1380, 1520, 1530, 1560, and/or 1570 may be performed by automated stacker and de-stacker 1700. As yet another example, as explained above, motor 1722 may open or close clamping mechanism 1710. Therefore, blocks 1350, 1360, 1540, and/or 1550 may be performed by automated stacker and de-stacker 1700.

Figure 18A:
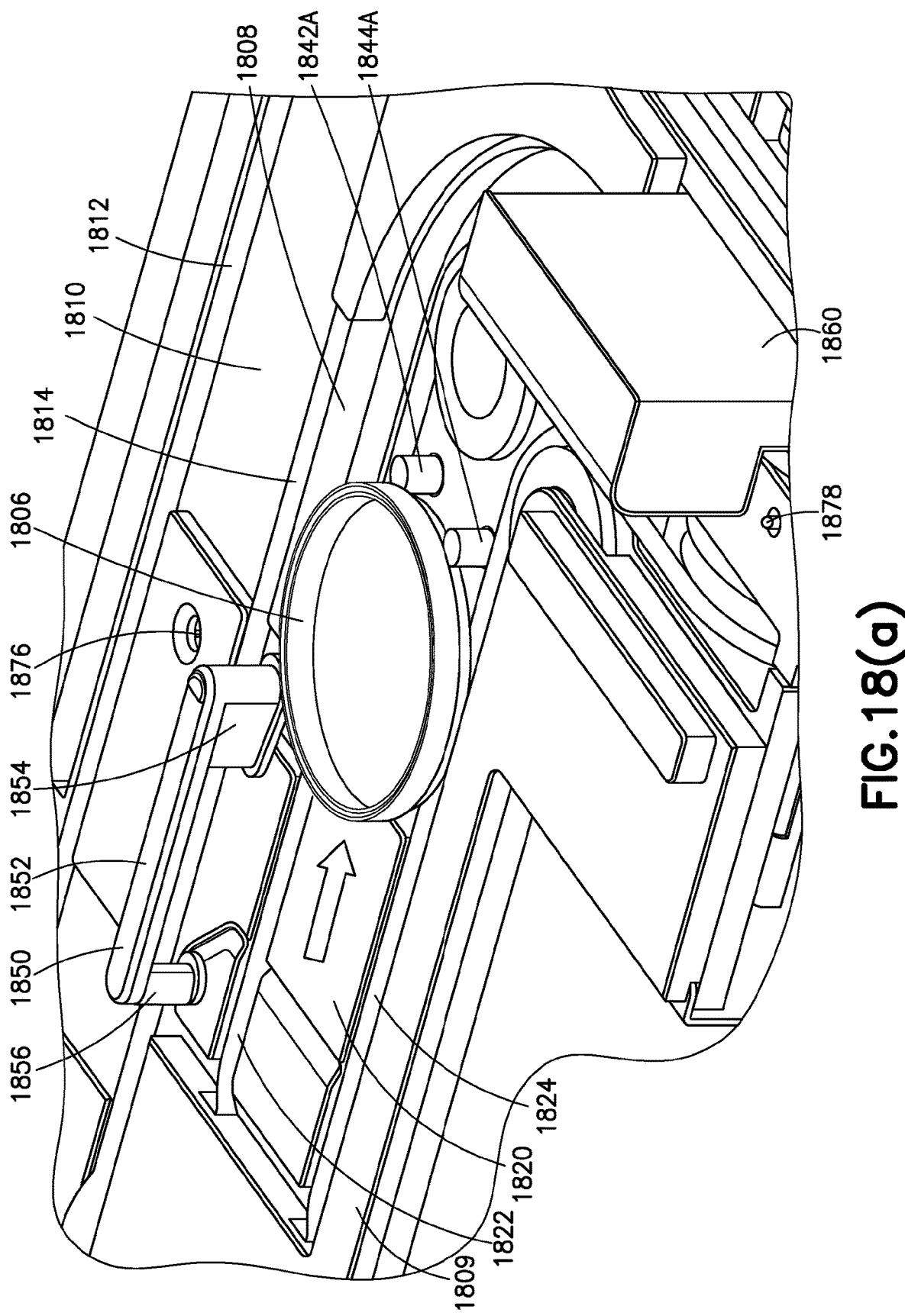
FIGS. 18(a)-18(q) illustrate different stopping mechanisms that may be integrated into an automated specimen processing system. More specifically.
Figures 18B, 18C, 18D:
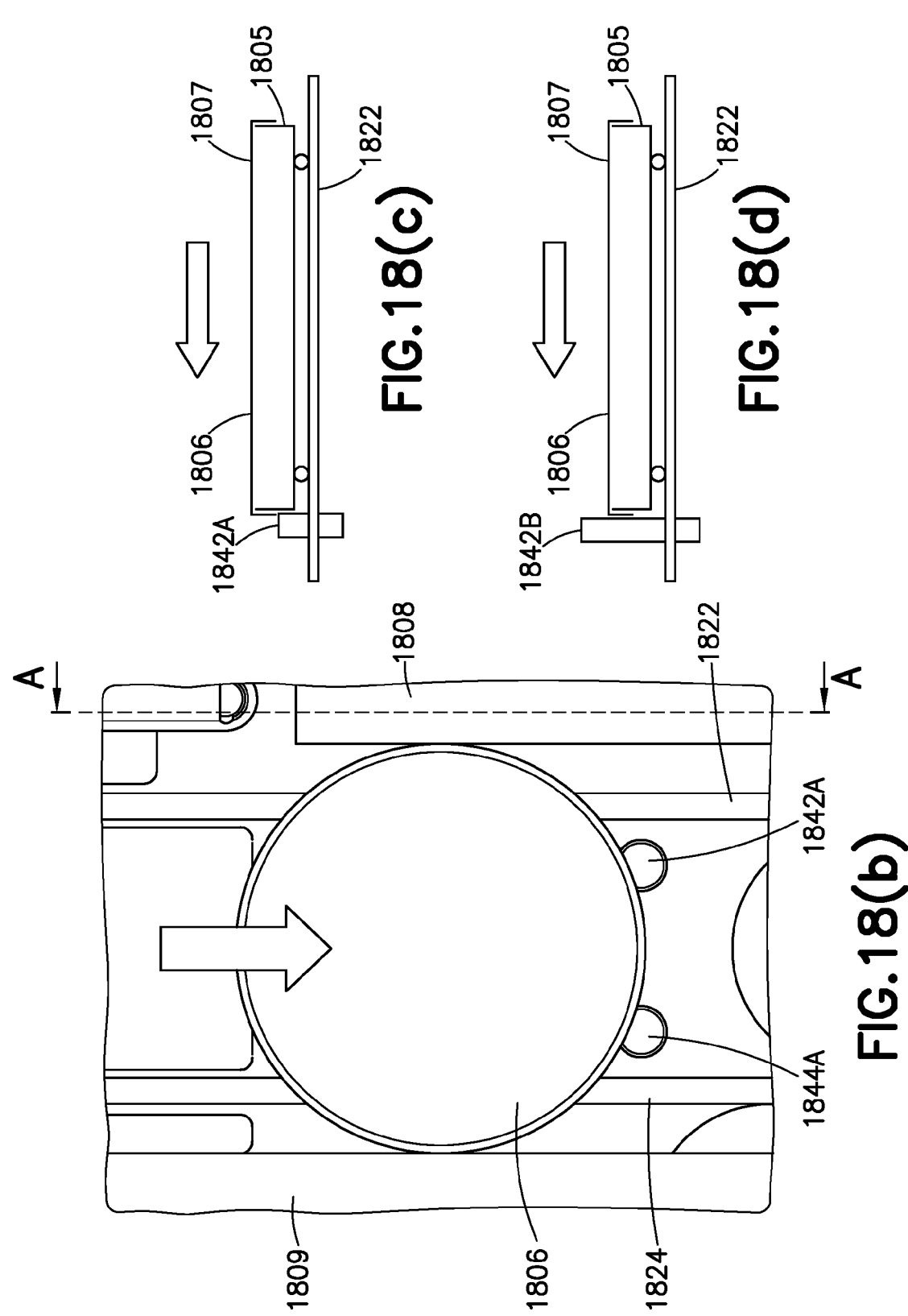
Figures 18E, 18F, 18G, 18H:
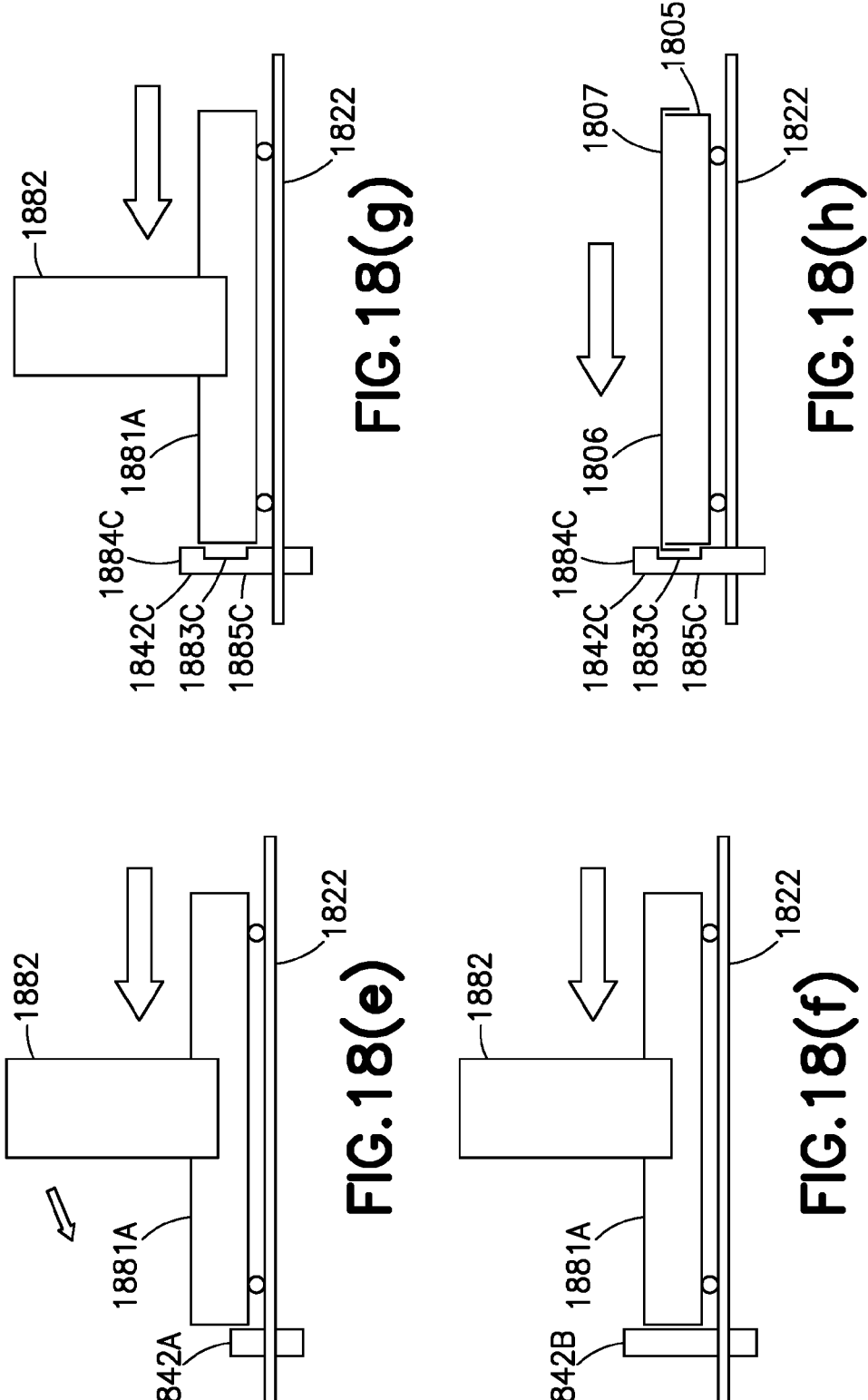
Figure 18K:
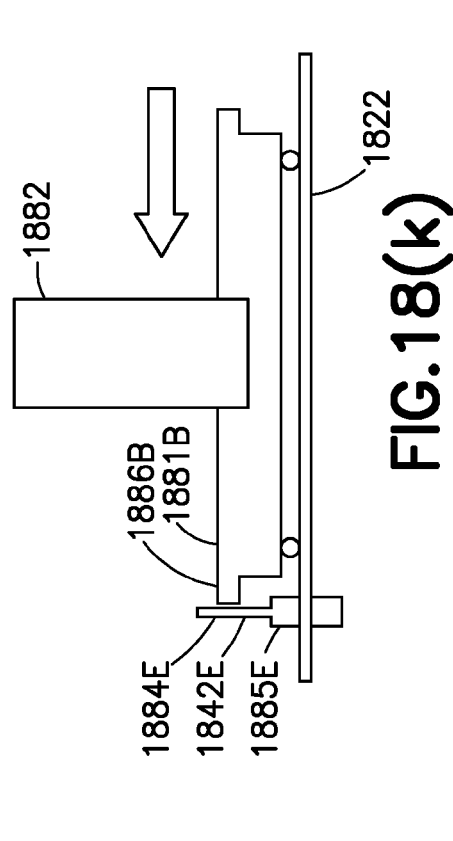
FIGS. 18(k) and 18(l) illustrate different cross-sections of a fifth stopping mechanism.
Figure 18L:
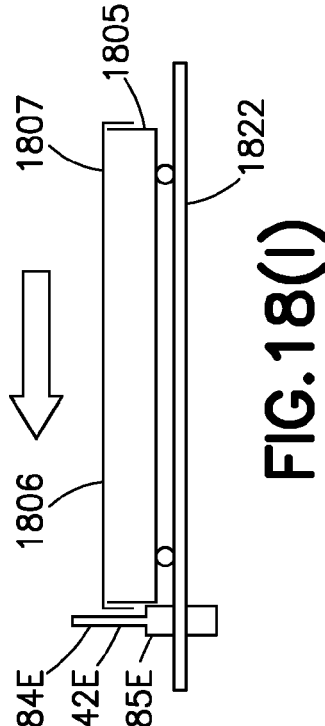
Figure 18I:
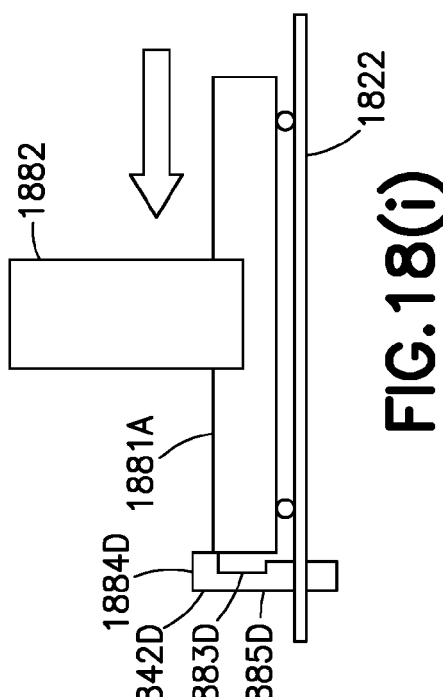
FIGS. 18(i) and 18(j) illustrate different cross-sections of a fourth stopping mechanism.
Figure 18J:
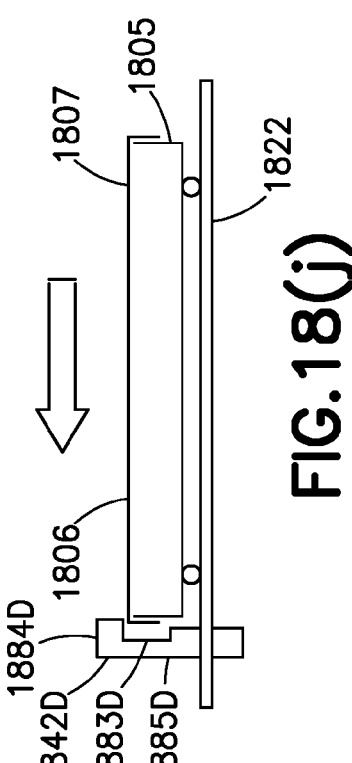
Figure 18Q:
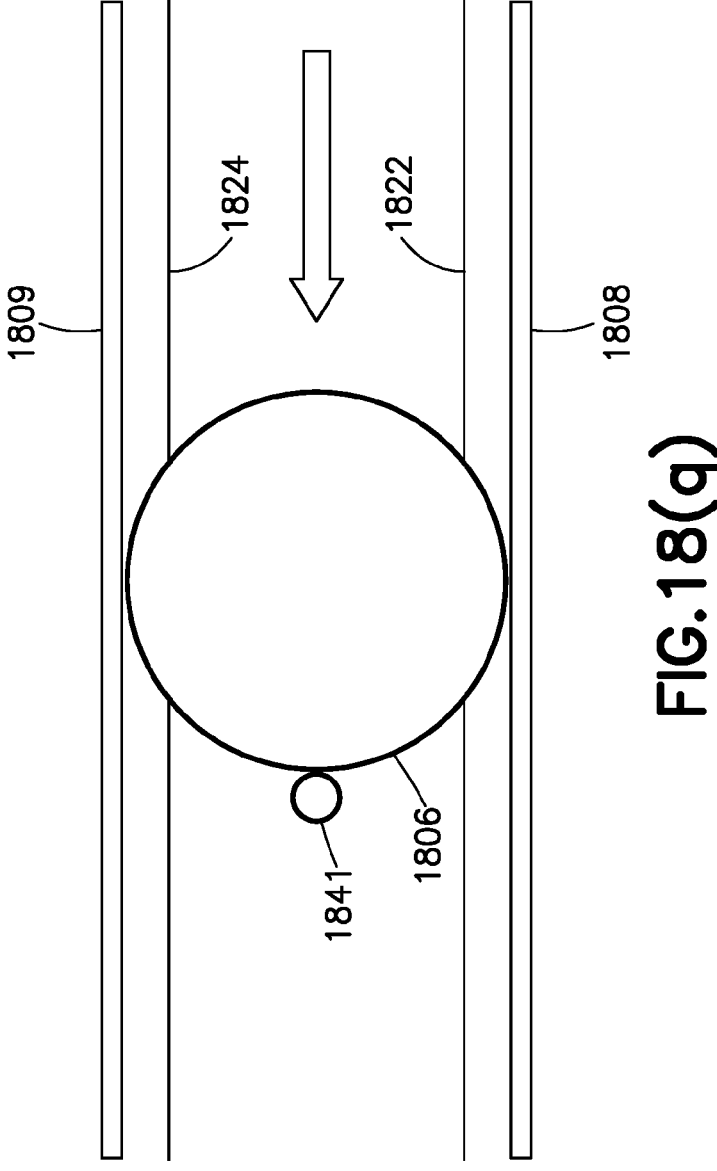
Figure 19A:
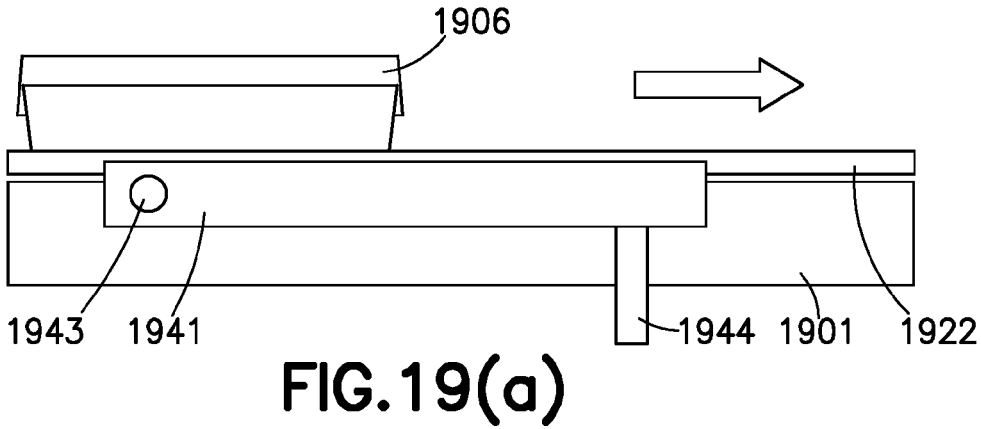
FIG. 19(a)-19(e) illustrate a stopping mechanism that may be integrated into an automated specimen processing system. More specifically.
Figure 19B:
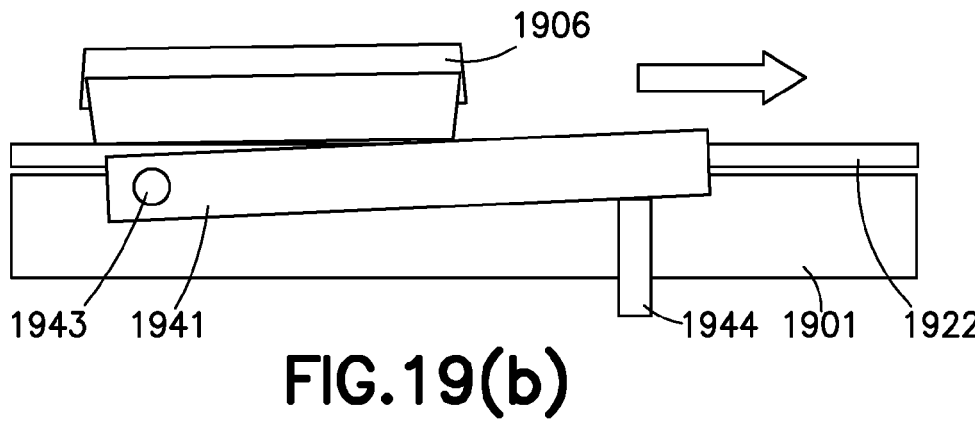
Figure 19C:
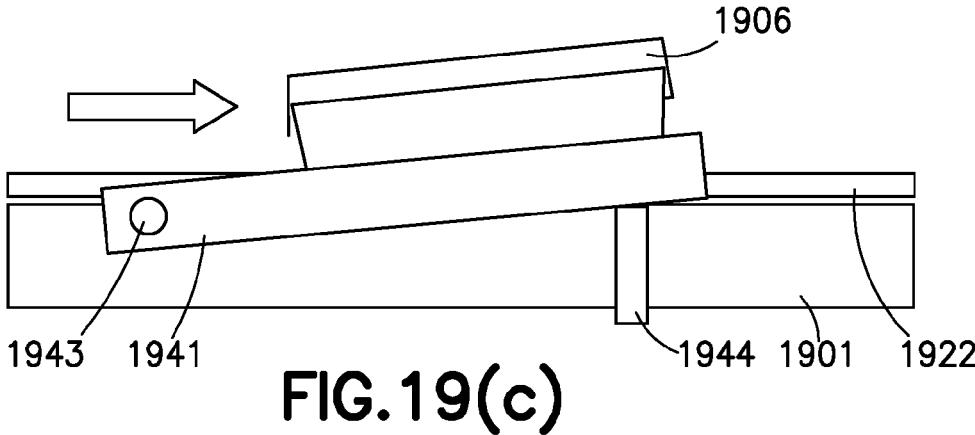
Figure 19D:
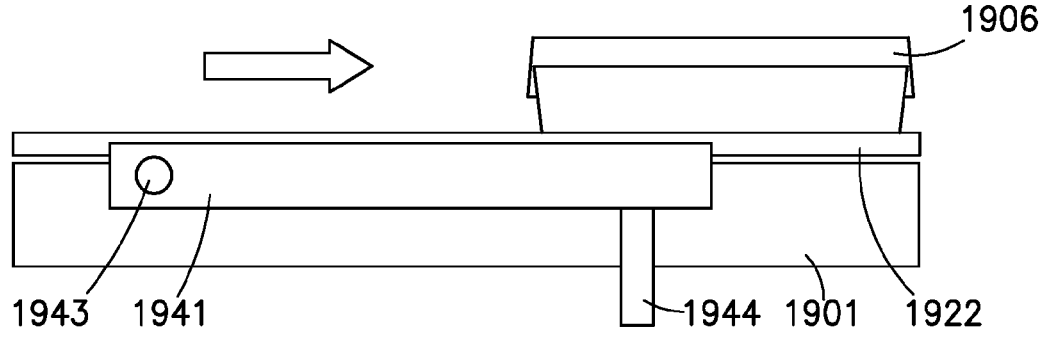
Figure 19E:
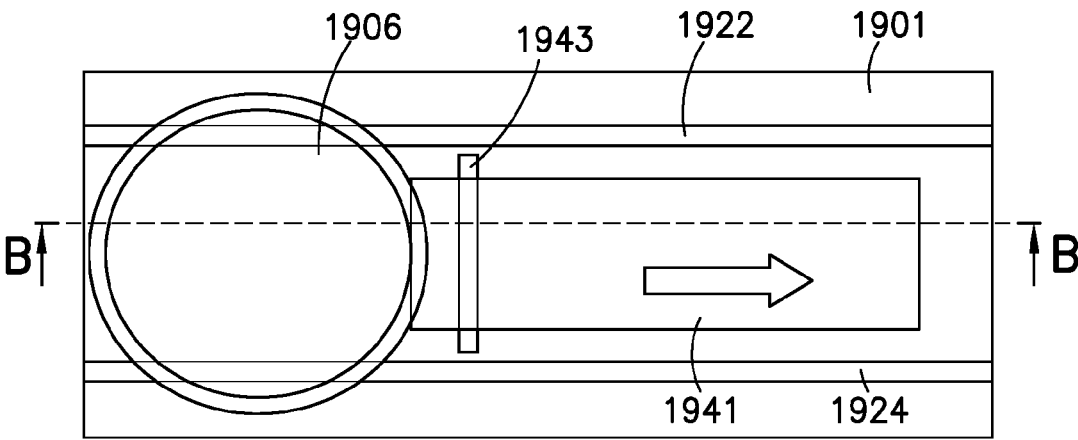

FIGS. 18(a)-18(q) illustrate stopping mechanisms that may be used alone or in combination with any of the automated stackers and de-stackers described above (e.g., automated stackers and de-stackers 300, 1100, 1400, 1600, and 1700). For example, one or more of these stopping mechanisms may replace stopping mechanisms 242, 244, and/or 246 in conveyor system 200. As another example, one or more of the stopping mechanisms of FIGS. 18(a)-18(q) may replace the pins and/or associated components of any of the automated stackers and de-stackers described above (e.g., pins 842, 844, 1142, 1144, 1442, 1444, 1642, 1644, 1742, and 1744).

As shown in FIGS. 18(a)-18(c), a stopping mechanism may include pins 1842A and 1844A. As shown in FIG. 18(a), pins 1842A and 1844A may be positioned along a side track 1820 having belts 1822 and 1824. During operation, an off-ramp catcher 1850 may transfer culture plates, such as culture plate 1806, to side track 1820 from a main track 1810 having belts 1812 and 1814. As shown, off-ramp catcher 1850 includes arm 1852, pivot joint 1854, and post 1856. Off-ramp catcher 1850 may operate in much the same way as off-ramp catcher 252 and/or on-ramp catcher 254. For example, during operation, off-ramp catcher 1850 may be rotated clockwise about pivot joint 1854 such that arm 1852 extends across belts 1812 and 1814. While in this position, off-ramp catcher 1850 may prevent a culture plate from further traveling along main track 1810. Sensor 1876 may be used to confirm that a culture plate has been stopped by off-ramp catcher 1850. After stopping a culture plate in this manner, off-ramp catcher 1850 may be rotated counterclockwise about pivot joint 1854 and push the stopped culture plate onto side track 1820. During operation, pins 1842A and 1844A may be raised to prevent a culture plate from further traveling along side track 1820. Similarly, stopper 1860 may be used to prevent a culture plate from further traveling along side track 1820. Sensors, such as sensor 1878, may be used to confirm that a culture plate has been stopped by pins 1842A and 1844A and/or stopper 1860. Walls 1808 and 1809 may help guide the culture plate along side track 1820.

FIG. 18(b) provides a top-view of culture plate 1806, which has been stopped by pins 1842A and 1844A. FIG. 18(c) illustrates a cross-section taken along line A of FIG. 18(b). As shown, pins 1842A and 1844A are configured to contact a base 1805 (not a lid 1807) of culture plate 1806. As discussed above, this configuration advantageously minimizes the distance pins 1842A and 1844A need to be raised and lowered. In embodiments where the space underneath side track 1820 is scarce, this is particularly important. However, pins 1842A and 1844A should still be raised to a sufficient height above side track 1820 (e.g., 4 mm) that prevents culture plate 1806 from jumping over pins 1842A and 1844A. Similarly, pins 1842A and 1844A should be lowered to a sufficient height below side track 1820 that allows culture plate 1806 to pass over pins 1842A and 1844A (e.g., 2.5 mm).

As shown in FIG. 18(*d*), pins 1842A and 1844A may modified to contact lid 1807 of culture plate 1806. In the side-view of FIG. 18(*d*), pin 1842A has been replaced with pin 1842B. One potential disadvantage of this configuration is that a collision between, for example, pin 1842B and lid 1807 may dislodge lid 1807 from base 1805. Since pins 1842A and 1844A are configured to contact base 1805 (not lid 1807) of culture plate 1806, the stopping mechanism of FIGS. 18(*a*)-18(*c*) addresses this potential problem.

However, as shown in FIGS. 18(*e*) and 18(*f*), different risks are present when culture plate 1806 is replaced with, for example, a carrier 1881A and a sample vessel 1882. As noted above, the automated specimen processing systems described herein may be used to handle a variety of different objects. Culture plates are commonly used carriers for transporting biological samples. However, other types of objects, such as slides, cartridges, and vessels (e.g., tubes, screw-top containers, etc.), may be used for transporting biological samples. As shown in FIGS. 18(*e*) and 18(*f*), carrier 1881A carries sample vessel 1882 as it travels along side track 1820. The structure of sample vessel 1882 may be such that it cannot safely and/or reliably travel along side track 1820 without carrier 1881A. For example, sample vessel 1882 may be a tube that is both fragile and prone to getting stuck between belts 1822 and 1824. In some embodiments, carrier 1881A may have a circular profile with a comparable diameter to culture plate 1806. However, as shown, carrier 1881A may be taller than culture plate 1806.

As shown in FIGS. 18(*e*) and 18(*f*), pin 1842A contacts carrier 1881A at a lower point than pin 1842B. As a result, there is an increased risk that sample vessel 1882 will tip in response to a collision between, for example, pin 1842A and carrier 1881A. However, as explained above, the height of pin 1842A is advantageous for culture plates. The stopping mechanisms illustrated in FIGS. 18(*g*)-18(*n*) combine some of the advantages offered by the stopping mechanisms described in relation to FIGS. 18(*a*)-18(*f*).

For example, as shown in FIGS. 18(*g*) and 18(*h*), pin 1842A has been replaced with pin 1842C. In contrast to pin 1842B, pin 1842C includes a recess 1883C. As shown in FIG. 18(*g*), carrier 1881A contacts both an upper portion 1884C and a lower portion 1885C of pin 1842C. As a result, pin 1842C contacts carrier 1881A at a higher point than pin 1842A. Therefore, there is a decreased risk that sample vessel 1882 will tip in response to a collision between, for example, pin 1842C and carrier 1881A. Furthermore, as shown in FIG. 18(*h*), base 1805 of culture plate 1806 contacts lower portion 1885C of pin 1842C. Lid 1807 of culture plate 1806 is received in recess 1883C, but it does not contact pin 1842C. As a result, there is a decreased risk that lid 1807 will be dislodged from base 1805.

As another example, as shown in FIGS. 18(*i*) and 18(*j*), pin 1842A has been replaced with pin 1842D. In contrast to pin 1842C, an upper portion 1884D of pin 1842D has an increased width. As shown in FIG. 18(*i*), carrier 1881A contacts only upper portion 1884D (not a lower portion 1885D) of pin 1842D. As a result, pin 1842D also contacts carrier 1881A at a higher point than pin 1842A. Therefore, there is a decreased risk that sample vessel 1882 will tip in response to a collision between, for example, pin 1842D and carrier 1881A. Furthermore, as shown in FIG. 18(*j*), base 1805 of culture plate 1806 contacts lower portion 1885D of pin 1842D. Lid 1807 of culture plate 1806 is received in a recess 1883D, but it does not contact pin 1842D. As a result, there is a decreased risk that lid 1807 will be dislodged from base 1805.

As yet another example, as shown in FIG. 18(*k*), pin 1842A has been replaced with pin 1842E, and carrier 1881A has been replace with carrier 1881B. In contrast to the embodiments, of FIGS. 18(*g*)-18(*j*), both pin 1842A and carrier 1881A have been modified. As shown, a lip 1886B of carrier 1881B contacts a narrow upper portion 1884E of pin 1842E. As a result, pin 1842E contacts carrier 1881B at a higher point than pin 1842A contacts carrier 1881A. Therefore, there is a decreased risk that sample vessel 1882 will tip in response to a collision between, for example, pin 1842E and carrier 1881B. Furthermore, as shown in FIG. 18(*l*), base 1805 of culture plate 1806 contacts a wide lower portion 1885E of pin 1842E. Since upper portion 1884E has a smaller width than lower portion 1885E, lid 1807 of culture plate 1806 does not contact pin 1842E. As a result, there is a decreased risk that lid 1807 will be dislodged from base 1805.

As yet another example, as shown in FIG. 18(*m*), pin 1842A has been replaced with pin 1842F, and carrier 1881A has been replace with carrier 1881C. In contrast to pin 1842E, a narrow upper portion 1884F of pin 1842F also includes an extension 1883F. Furthermore, in contrast to carrier 1881B, carrier 1881C has a lip 1886C with a recess 1887. As shown, lip 1886C contacts portion 1884F. Furthermore, recess 1887 receives extension 1883F. As a result, pin 1842F contacts carrier 1881C at a higher point than pin 1842A contacts carrier 1881A. Therefore, there is a decreased risk that sample vessel 1882 will tip in response to a collision between, for example, pin 1842F and carrier 1881C. Furthermore, as shown in FIG. 18(*n*), base 1805 of culture plate 1806 contacts a wide lower portion 1885F of pin 1842F. Since upper portion 1884F has a smaller width than lower portion 1885F and extension 1883F is positioned above culture plate 1806, lid 1807 of culture plate 1806 does not contact pin 1842F. As a result, there is a decreased risk that lid 1807 will be dislodged from base 1805.

Those skilled in the art will appreciate that various modifications can be made to the stopping mechanisms of FIGS. 18(*a*)-18(*n*). For example, a resilient element, such as a spring, may be added to any of the stopping mechanisms of FIGS. 18(*a*)-18(*l*) to reduce the collision forces with culture plate 1806 and/or carriers 1881A, 1881B, and/or 188C. For example, as shown in FIG. 18(*o*), a wide lower portion 1885F of a pin 1842G may extend below belt 1822 and be coupled with a resilient element 1888. When lip 1886B of carrier 1881B contacts a narrow upper portion 1884G of pin 1842G, resilient element 1888 will compress and absorb some of the collision forces. This configuration may also reduce the noise created by such a collision. As another example, any of the pins of the stopping mechanisms of FIGS. 18(*a*)-18(*n*) may be configured to rotate in order to rotate culture plate 1806 and/or carriers 1881A, 1881B, and/or 188C. For example, as shown in FIG. 18(*p*), a pin 1842H may be configured to rotate. In some embodiments, a motor (not shown) may be coupled to a wider lower portion 1885H of pin 1842H. While lip 1886B of carrier 1881B contacts a narrow upper portion 1884H of pin 1842H, pin 1842H may be rotated in order to rotate carrier 1881B. As carrier 1881B rotates, a scanner 1889 may scan carrier 1881B and/or sample vessel 1882 for a barcode and/or another identifying mark. As yet another example, the number of pins included in the stopping mechanisms of FIGS. 18(*a*)-18(*n*) may be increased or decreased. For example, as shown in FIG. 18(*q*), a single pin 1841 in combination with walls 1808 and 1809 can be used to stop culture plate 1806.

FIGS. 19(*a*)-19(*e*) illustrate another stopping mechanism that may be used alone or in combination with any of the automated stackers and de-stackers described above (e.g., automated stackers and de-stackers 300, 1100, 1400, 1600, and 1700). For example, the stopping mechanism of FIGS. 19(*a*)-19(*e*) may replace stopping mechanisms 242, 244, and/or 246 in conveyor system 200. As another example, the stopping mechanism of FIGS. 19(*a*)-19(*e*) may replace the pins and/or associated components of any of the automated stackers and de-stackers described above (e.g., pins 842, 844, 1142, 1144, 1442, 1444, 1642, 1644, 1742, 1744, 1841, 1842A, and 1844A).

As shown in FIGS. 19(*a*)-19(*e*), a stopping mechanism may include a platform 1941, a pin 1943, and a pin 1944. As shown in the top-view of FIG. 19(*e*), platform 1941 may be positioned on a stage 1901 between belts 1922 and 1924. FIGS. 19(*a*)-19(*d*) are cross-sections taken along line B of FIG. 19(*e*). As shown in FIGS. 19(*a*)-19(*d*), pin 1944 may be positioned beneath platform 1941 and extend through stage 1901. As shown in FIG. 19(*a*), during operation, a culture plate 1906 may travel along belts 1922 and 1924 towards platform 1941. As shown in FIG. 19(*b*), when all or some of culture plate 1906 is above platform 1941, pin 1944 may be raised. As pin 1941 is raised, it exerts an upward force on platform 1941 that causes platform 1941 to rotate counter-clockwise about pin 1943. As shown in FIG. 19(*c*), culture plate 1906 has stopped moving. More specifically, culture plate 1906 is resting above belts 1922 and 1924 on platform 1941. As shown in FIG. 19(*d*), pin 1944 may be lowered in order to lower culture plate 1906 back onto belts 1922 and 1924. As pin 1941 is lowered, the weight of platform 1941 causes it to rotate clockwise about pin 1943. Culture plate 1906 may then travel along belts 1922 and 1924 away from platform 1941.

In some embodiments, compressed air may be used to raise or lower pin 1944. In some embodiments, since pin 1944 does not need to be raised or lowered a great distance, an electric motor (not shown), such as an AC motor, a DC motor, or a stepper motor, may be used to raise or lower pin 1941. In some embodiments, pin 1944 may operate in much the same way as pins 842, 844, 1142, 1144, 1442, 1444, 1642, 1644, 1742, 1744, 1841, 1842A, and/or 1844A.

In some embodiments, a sensor (not shown) may be used to confirm that all or some of culture plate 1906 is above platform 1941. In some embodiments, the sensor may be a fiber optic sensor. In some embodiments, the sensor may be positioned alongside belts 1922 or 1924. In some embodiments, the sensor may be coupled to platform 1941. In some embodiments, the sensor may be positioned beneath a hole (not shown) in platform 1941. In such embodiments, the sensor may operate in much the same way as sensor 1776 by transmitting and/or receiving signals through the hole in platform 1941. For example, the sensor can transmit light signals and receive reflected light signals through the hole in platform 1941.

In comparison to the stopping mechanisms of FIGS. 18(*a*)-18(*q*), the stopping mechanism of FIGS. 19(*a*)-19(*e*) may produce less noise. In many conveyor systems, the belts of a track will often continue to move regardless of whether a culture plate has been stopped by, for example, one of the stopping mechanisms of FIGS. 18(*a*)-18(*q*) or the stopping mechanism of FIGS. 19(*a*)-19(*e*). However, when a culture plate is stopped by one of the stopping mechanisms of FIGS. 18(*a*)-18(*q*), the belts will rub against the base of the culture plate and create noise. In contrast, when a culture plate is stopped by the stopping mechanism of FIGS. 19(*a*)-19(*e*), there is no contact between the culture plate and the belts.

Figure 20A:
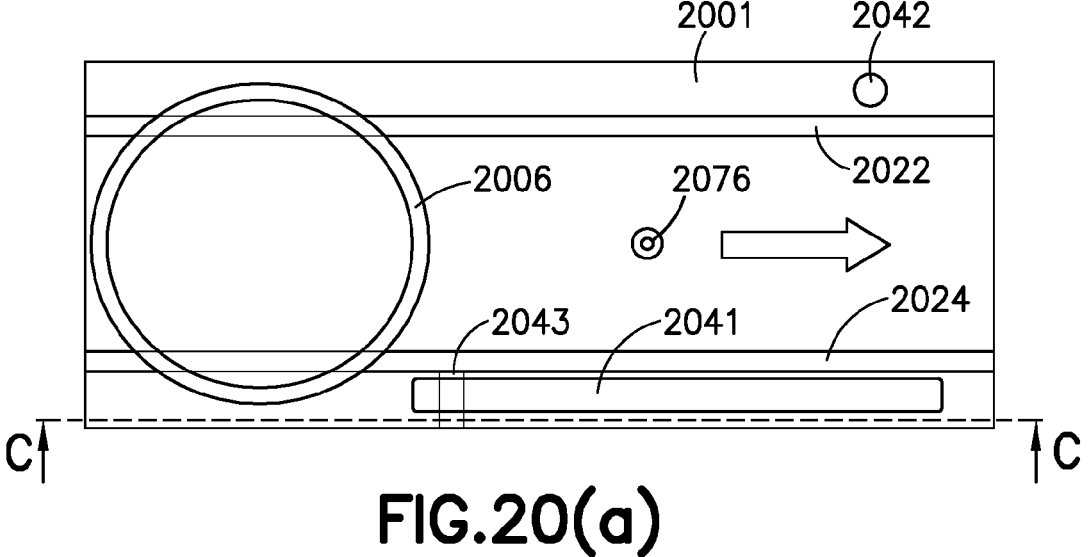
FIGS. 20(a) and 20(b) illustrates a top view and cross-section, respectively, of a stopping mechanism that may be integrated into an automated specimen processing system.
Figure 20B:
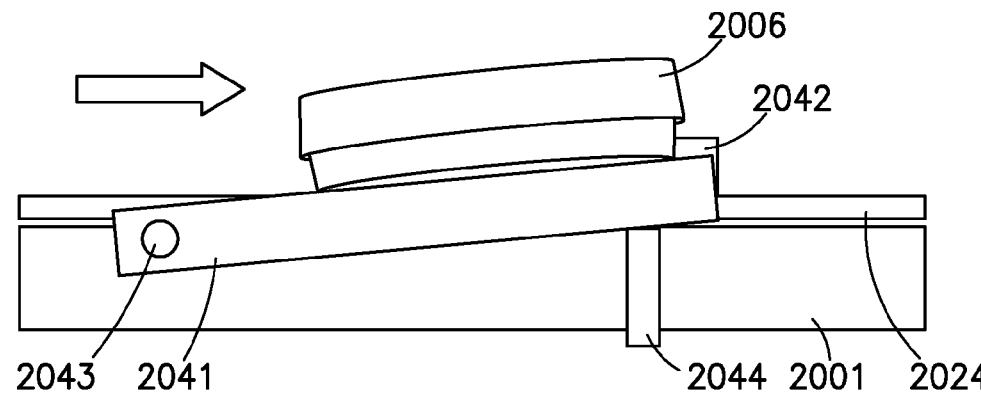

FIGS. 20(*a*) and 20(*b*) illustrate yet another stopping mechanism that may be used alone or in combination with any of the automated stackers and de-stackers described above (e.g., automated stackers and de-stackers 300, 1100, 1400, 1600, and 1700). For example, the stopping mechanism of FIGS. 20(*a*) and 20(*b*) may replace stopping mechanisms 242, 244, and/or 246 in conveyor system 200. As another example, the stopping mechanism of FIGS. 20(*a*) and 20(*b*) may replace the pins and/or associated components of any of the automated stackers and de-stackers described above (e.g., pins 842, 844, 1142, 1144, 1442, 1444, 1642, 1644, 1742, 1744, 1841, 1842A, and 1844A).

As shown in FIGS. 20(*a*) and 20(*b*), a stopping mechanism may include a platform 2041, a pin 2043, a pin 2042, and a pin 2044. As shown in the top-view of FIG. 20(*a*), platform 2041 may be positioned on a stage 2001 alongside a belt 2024. Furthermore, pin 2042 may be positioned on stage 2001 alongside a belt 2022. FIG. 20(*b*) is a cross-section taken along line C of FIG. 20(*a*). As shown in FIG. 20(*b*), pin 2044 may extend through stage 2001. Similarly, pin 2042 may also and extend through stage 2001. The stopping mechanism of FIGS. 20(*a*) and 20(*b*) may operate in much the same way as the stopping mechanism of FIGS. 19(*a*)-19(*e*). For example, when all or some of culture plate 2006 is above platform 2041, pins 2042 and 2044 may be raised. As pin 2044 is raised, it exerts an upward force on platform 2041 that causes platform 2041 to rotate counter-clockwise about pin 2043. As shown in FIG. 20(*b*), culture plate 2006 has stopped moving. More specifically, a portion of culture plate 2006 is held above belts 2022 and 2024 by platform 2041. Furthermore, pin 2042 is supporting culture plate 2006 and helping to ensure that culture plate 2006 does not slide off of platform 2041. Pins 2042 and 2044 may be lowered in order to lower culture plate 2006 back onto belts 2022 and 2024. As pin 2041 is lowered, the weight of platform 2041 causes it to rotate clockwise about pin 2043. Culture plate 2006 may then travel along belts 2022 and 2024 away from platform 2041.

In some embodiments, compressed air may be used to raise or lower pins 2042 and 2044. In some embodiments, since pins 2042 and 2044 do not need to be raised or lowered a great distance, an electric motor (not shown), such as an AC motor, a DC motor, or a stepper motor, may be used to raise or lower pin 2041. In some embodiments, pins 2042 and 2044 may operate in much the same way as pins 842, 844, 1142, 1144, 1442, 1444, 1642, 1644, 1742, 1744, 1841, 1842A, and/or 1844A.

As shown in FIG. 20(*a*), a sensor 2076 may be positioned on stage 2001 between belts 2022 and 2024 and used to confirm that all or some of culture plate 2006 is above platform 2041. In some embodiments, sensor 2076 may be a fiber optic sensor. In other embodiments, sensor 2076 may be moved to a different location. For example, sensor 2076 may be positioned alongside belts 2022 or 2024. In other embodiments, sensor 2076 may be coupled to platform 2041. In other embodiments, sensor 2076 may be positioned beneath a hole (not shown) in platform 2041. In such embodiments, sensor 2076 may operate in much the same way as sensor 1776 by transmitting and/or receiving signals through the hole in platform 2041. For example, sensor 2076 can transmit light signals and receive reflected light signals through the hole in platform 2041.

In comparison to the stopping mechanisms of FIGS. 18(*a*)-18(*q*), the stopping mechanism of FIGS. 20(*a*) and 20(*b*) may produce less noise. In many conveyor systems, the belts of a track will often continue to move regardless of whether a culture plate has been stopped by, for example, one of the stopping mechanisms of FIGS. 18(*a*)-18(*q*) or the stopping mechanism of FIGS. 20(*a*) and 20(*b*). However, when a culture plate is stopped by one of the stopping mechanisms of FIGS. 18(*a*)-18(*q*), the belts will rub against the base of the culture plate and create noise. In contrast, when a culture plate is stopped by the stopping mechanism of FIGS. 20(*a*) and 20(*b*), there is no contact between the culture plate and the belts.

Those skilled in the art will appreciate that various modifications can be made to the stopping mechanism of FIGS. 20(*a*) and 20(*b*). For example, the positions of platform 2041 and pin 2042 may be reversed such that platform 2041 is positioned on stage 2001 alongside belt 2022, and pin 2042 is positioned on stage 2001 alongside a belt 2024. As another example, platform 2041 may be positioned on stage 2001 between belts 2022 and 2024. As yet another example, pin 2042 may be replaced with a second platform hingedly engaged with a pin that operates in conjunction with platform 2041 to stop an incoming culture plate. As yet another example, platform 2041 may be rotated by a different mechanism than pin 2042.

Figure 21:
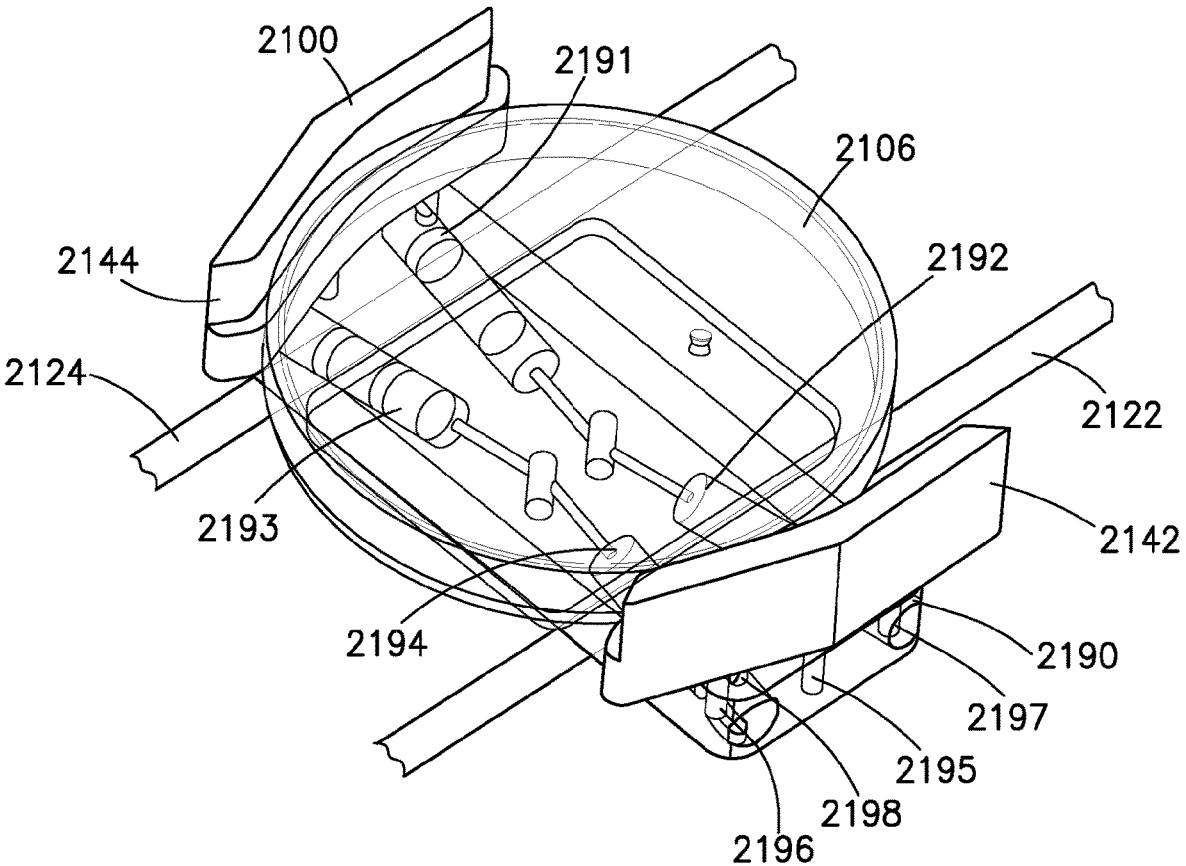
FIG. 21 illustrates a flipper stopper that may be integrated into an automated specimen processing system.

FIG. 21 illustrates yet another stopping mechanism (i.e., flipper stopper 2100) that may be used alone or in combination with any of the automated stackers and de-stackers described above (e.g., automated stackers and de-stackers 300, 1100, 1400, 1600, and 1700). For example, flipper stopper 2100 may replace stopping mechanisms 242, 244, and/or 246 in conveyor system 200. As another example, flipper stopper 2100 may replace the pins and/or associated components of any of the automated stackers and de-stackers described above (e.g., pins 842, 844, 1142, 1144, 1442, 1444, 1642, 1644, 1742, 1744, 1841, 1842A, and 1844A).

As shown, flipper stopper 2100 includes flippers 2142 and 2144, a housing 2190, actuators 2191, 2192, 2193, and 2194, and shafts 2195, 2196, and 2197. Actuators 2191, 2192, 2193, and 2194 are disposed within housing 2190. In some embodiments, one or more of actuators 2191, 2192, 2193, and 2194 may be voice coil actuators. For example, one or more of actuators 2191, 2192, 2193, and 2194 may be moving magnet actuators or moving coil actuators. In some embodiments, one or more of actuators 2191, 2192, 2193, and 2194 may be pneumatic actuators. As shown, flipper 2142 is rotatably coupled to housing 2190 through shaft 2195. As a result, flipper 2142 can rotate about an axis defined by shaft 2195. Flipper 2142 is also coupled to actuators 2192 and 2194 through shafts 2197 and 2196, respectively. As shown, actuators 2192 and 2194 can push or pull flipper 2142. During such operations, shafts 2197 and 2196 slide back and forth in slots (e.g., slot 2198) defined in housing 2190. The length of these slots may limit the movement of flipper 2142. Although not easily seen from the perspective of FIG. 21, flipper 2144 is also be coupled to housing 2190 and actuators 2191 and 2193 in a similar manner (i.e., through three separate shafts). As shown, flippers 2142 and 2144 include two roughly straight edges separated by an angular bend. However, in other embodiments, the edges and/or bends of flippers 2142 and/or 2144 may be curved. Similarly, in other embodiments, flippers 2142 and 2144 may be curved without any bends.

During operation, flipper stopper 2100 may stop culture plates traveling along belts 2122 and 2124. For example, as shown, flipper stopper 2100 has stopped a culture plate 2106. To reach this position, actuators 2191 and 2192 pushed flippers 2142 and 2144 outward, and actuators 2193 and 2194 pulled flippers 2142 and 2144 inward. As a result, flippers 2142 and 2144 rotate in opposite directions and prevent culture plate 2106 from further traveling along belts 2122 and 2124. A similar operation may be performed to permit culture plate 2106 to travel along belts 2122 and 2124. For example, actuators 2191 and 2192 may pull flippers 2142 and 2144 inward, and actuators 2193 and 2194 may push flippers 2142 and 2144 outward. Advantageously, such an operation may also prevent another culture plate (not shown) traveling along belts 2122 and 2124 from passing through flippers 2142 and 2144. Therefore, when operated in this manner, only a single culture plate may pass through flippers 2142 and 2144 at a time.

As noted above, in some embodiments, flipper stopper 2100 may replace the pins and/or associated components of any of the automated stackers and de-stackers described above (e.g., pins 842, 844, 1142, 1144, 1442, 1444, 1642, 1644, 1742, and 1744). In such embodiments, housing 2190 may be positioned beneath the lift pads of those systems (e.g., lift pads 334, 1134, 1434, 1634, and 1734). Furthermore, in such embodiments, the lengths of the shafts (e.g., shafts 2195, 2196, and 2197) connecting flippers 2142 and 2144 to housing 2190 and actuators 2191, 2192, 2193, and 2194 may be increased to compensate for the lift pad.

Figure 22A:
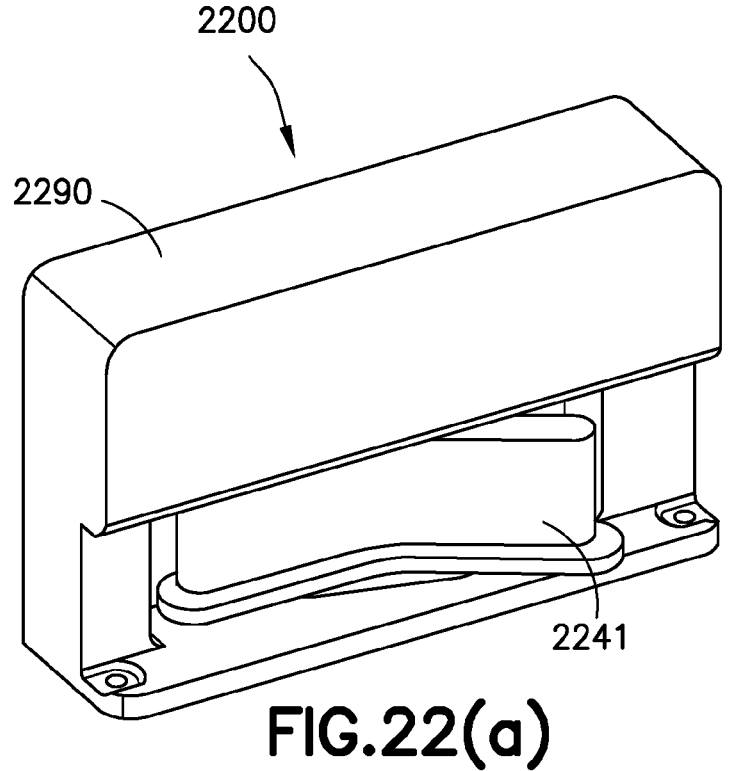
FIGS. 22(a)-22(c) illustrate different side views of a flipper stopper that may be integrated into an automated specimen processing system.
Figure 22B:
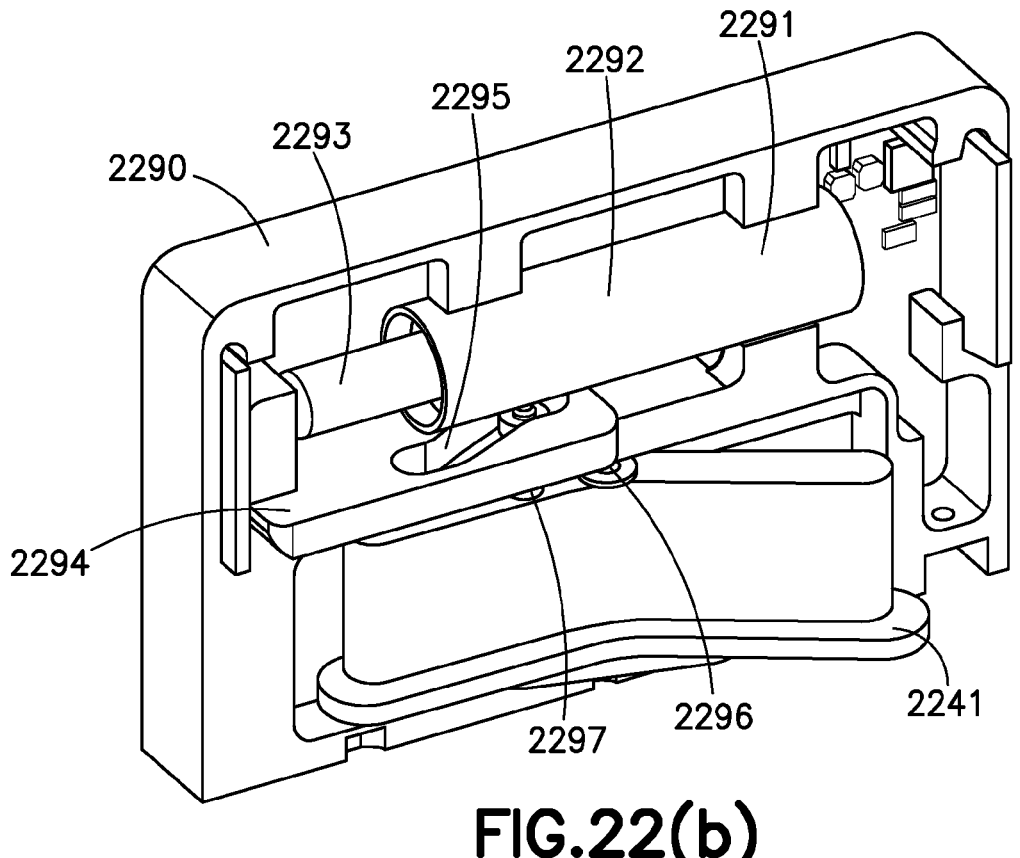
Figure 22C:
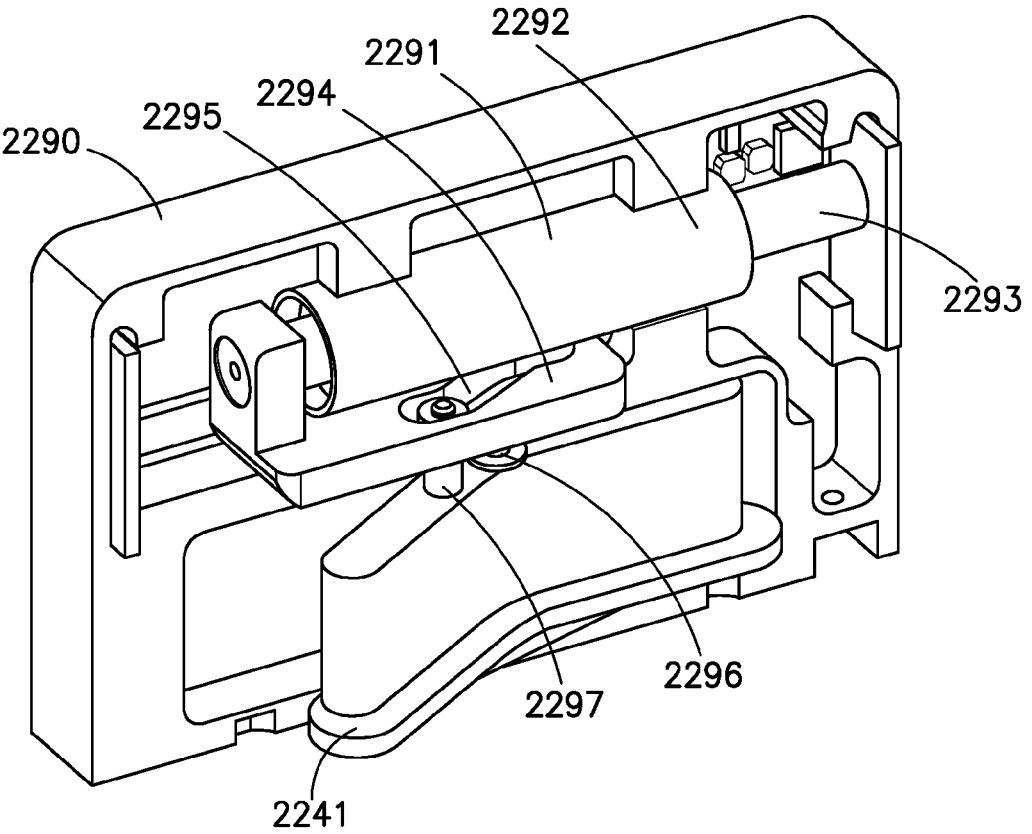

FIGS. 22(*a*)-22(*c*) illustrate yet another stopping mechanism (i.e., flipper stopper 2200) that may be used alone or in combination with any of the automated stackers and de-stackers described above (e.g., automated stackers and de-stackers 300, 1100, 1400, 1600, and 1700). For example, flipper stopper 2200 may replace stopping mechanisms 242, 244, and/or 246 in conveyor system 200. As another example, flipper stopper 2200 may replace the pins and/or associated components of any of the automated stackers and de-stackers described above (e.g., pins 842, 844, 1142, 1144, 1442, 1444, 1642, 1644, 1742, 1744, 1841, 1842A, and 1844A).

As shown, flipper stopper 2200 includes a flipper 2241, a housing 2290, an actuator 2291, a guide structure 2294, shaft 2296, and shaft 2297. In comparison to FIG. 22(*a*), a portion of housing 2290 has been removed in FIGS. 22(*b*) and 22(*c*) to reveal some of the components within housing 2290, such as actuator 2291. As shown, actuator 2291 includes casing 2292 and piston 2293. Guide structure 2292 is coupled to piston 2293. In some embodiments, actuator 2291 may be a voice coil actuator. For example, actuator 2291 may be a moving magnet actuator or a moving coil actuator. In some embodiments, actuator 2291 may be a pneumatic actuator. As shown, flipper 2241 is rotatably coupled to housing 2290 through shaft 2296. As a result, flipper 2241 can rotate about an axis defined by shaft 2296. Flipper 2241 is also coupled to shaft 2297, which extends through a slanted slot 2295 of guide structure 2294. As shown, flipper 2241 includes two roughly straight edges separated by an angular bend. However, in other embodiments, the edges and/or bend of flipper 2241 may be curved. Similarly, in other embodiments, flipper 2241 may be curved without any bends.

During operation, piston 2293 (and consequently guide structure 2294) may oscillate between the two positions illustrated in FIGS. 22(*b*) and 22(*c*). Since shaft 2297 extends through slot 2295 of guide structure 2294, the oscillation of piston 2293 will also cause shaft 2297 to oscillate in directions approximately perpendicular to the directions of oscillation of piston 2293. Furthermore, since shaft 2297 is coupled to flipper 2241, the oscillation of shaft 2297 will also cause flipper 2241 to rotate about the axis defined by shaft 2296.

Much like flipper stopper 2100, flipper stopper 2200 may stop culture plates traveling along a conveyor track through the rotation of flipper 2241. For example, flipper 2241 may be rotated in one direction to stop an incoming culture plate, and flipper 2241 may be rotated in an opposite direction to release that culture plate. In some embodiments, when flipper stopper 2200 is operated in this manner, only a single culture plate may pass through flipper stopper 2200 at a time. In some embodiments, a wall may be positioned across the conveyor track from flipper stopper 2200 (see, e.g., the position of flipper stopper 2300 in relation to a wall 2309 in FIG. 23(*a*)) to stabilize a stopped culture plate. In some embodiments, a second flipper stopper may be positioned across the conveyor track from flipper stopper 2200. In some such embodiments, the second flipper stopper may be structured and/or operated in much the same way as flipper stopper 2200. In some embodiments, a sensor (e.g., a fiber optic sensor) may be used to confirm that a culture plate has been stopped and/or released by flipper stopper 2200.

Figure 23A:
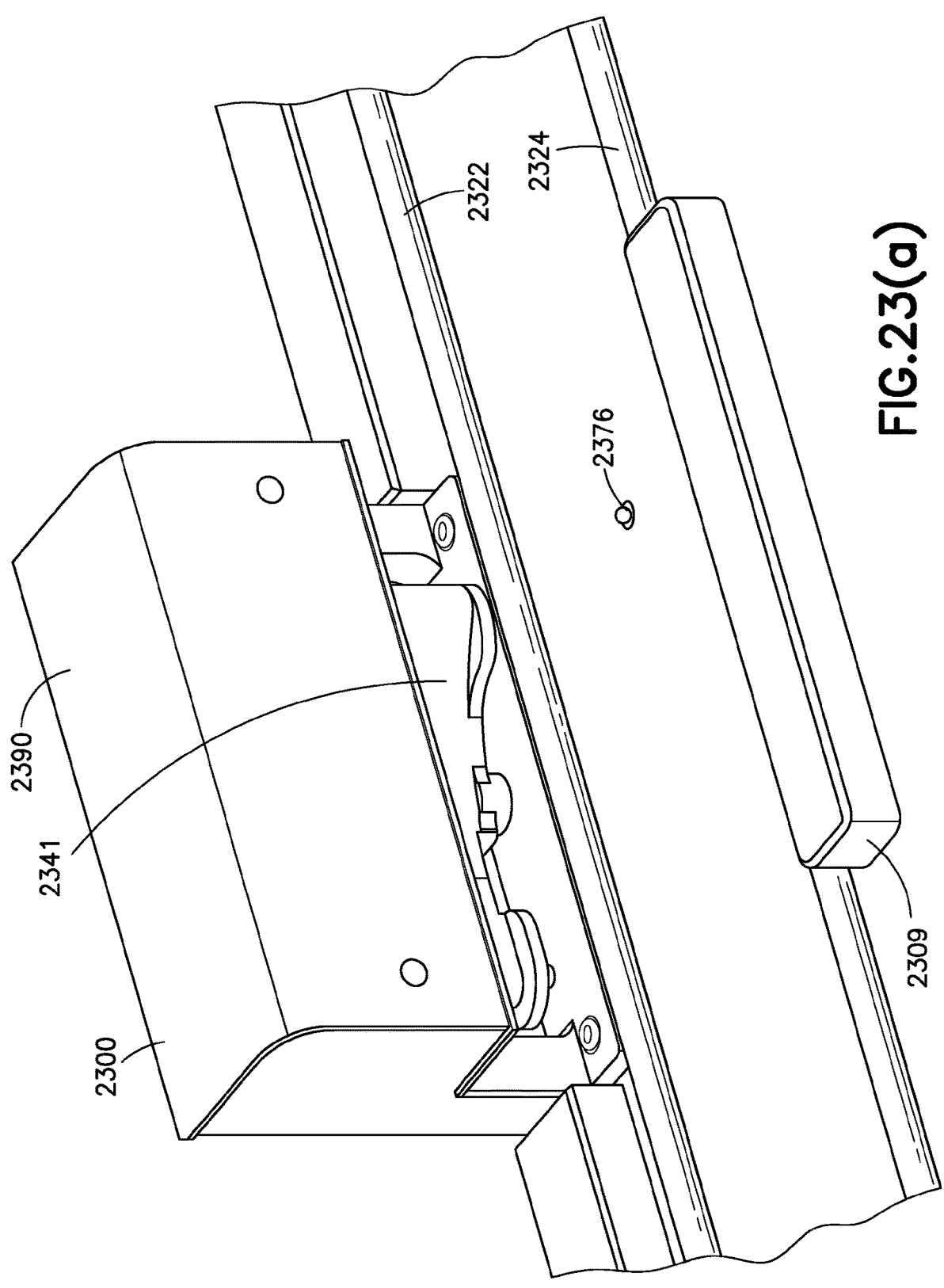
FIGS. 23(a)-23(c) illustrate a flipper stopper that may be integrated into an automated specimen processing system. More specifically.
Figure 23B:
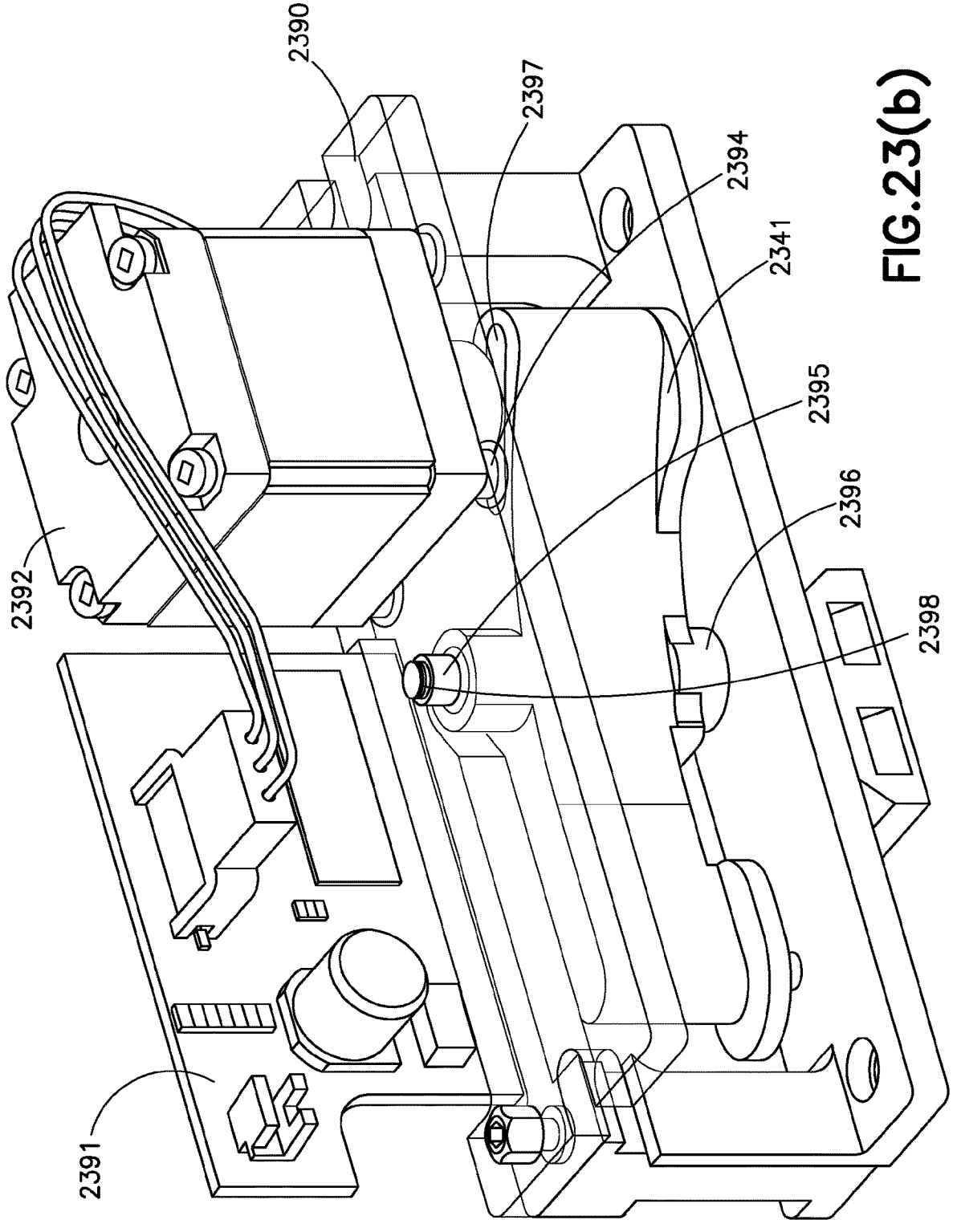
Figure 23C:
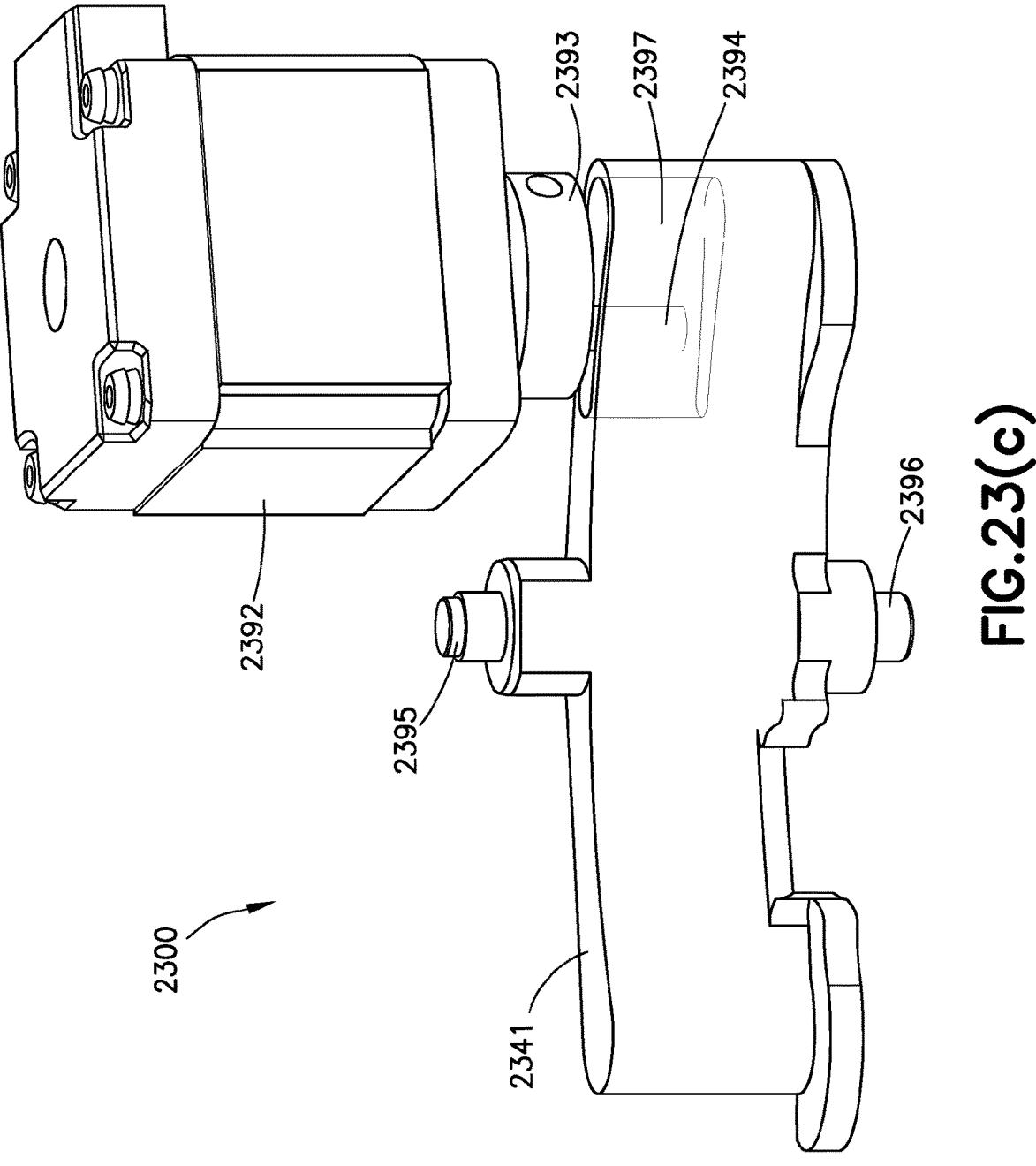

FIGS. 23(*a*)-23(*c*) illustrate yet another stopping mechanism (i.e., flipper stopper 2300) that may be used alone or in combination with any of the automated stackers and de-stackers described above (e.g., automated stackers and de-stackers 300, 1100, 1400, 1600, and 1700). For example, flipper stopper 2300 may replace stopping mechanisms 242, 244, and/or 246 in conveyor system 200. As another example, flipper stopper 2300 may replace the pins and/or associated components of any of the automated stackers and de-stackers described above (e.g., pins 842, 844, 1142, 1144, 1442, 1444, 1642, 1644, 1742, 1744, 1841, 1842A, and 1844A).

As shown, flipper stopper 2300 includes a flipper 2341, a housing 2390, a controller 2391, a motor 2392, and an eccentric arm 2394. In comparison to FIG. 22(*a*), some or all of housing 2390 has been removed in FIGS. 22(*b*) and 22(*c*) to reveal some of the components within housing 2390, such as controller 2391 and motor 2392. As shown, motor 2392 is coupled to eccentric arm 2394 through disc 2393. In some embodiments, motor 2392 is an electric motor (e.g., AC motors, DC motors, stepper motors, etc.). As shown, flipper 2341 includes cylindrical extensions 2395 and 2396. Furthermore, housing 2390 includes complementary cylindrical recesses (see, e.g., the transparent illustration of recess 2398 in FIG. 22(*b*)) for receiving extensions 2395 and 2396. As a result, flipper 2341 can rotate about an axis defined by extensions 2395 and 2396. As shown, flipper 2341 also includes a recess 2397 through which a portion of eccentric arm 2394 extends. Flipper 2341 also includes two roughly straight edges separated by an angular bend. However, in other embodiments, the edges and/or bend of flipper 2341 may be curved. Similarly, in other embodiments, flipper 2341 may be curved without any bends.

During operation, controller 2391 may control motor 2392 to rotate disc 2393 (and consequently eccentric arm 2394). Since eccentric arm 2394 extends through recess 2397 of flipper 2341, the rotation of eccentric arm 2394 will also cause flipper 2341 to rotate about the axis defined by extensions 2395 and 2396. In some embodiments, controller 2391 may control motor 2392 to only rotate disc 2393 clockwise or counter-clockwise. In other embodiments, controller 2391 may control motor 2392 to alternate between rotating disc 2393 clockwise and counter-clockwise.

Much like flipper stoppers 2100 and 2200, flipper stopper 2300 may stop culture plates traveling along belts 2322 and 2324 through the rotation of flipper 2341. For example, flipper 2341 may be rotated in one direction to stop an incoming culture plate, and flipper 2341 may be rotated in an opposite direction to release that culture plate. In some embodiments, when flipper stopper 2300 is operated in this manner, only a single culture plate may pass through flipper stopper 2300 at a time. As shown, a wall 2309 may be positioned across belts 2322 and 2324 from flipper stopper 2300 to stabilize a stopped culture plate. However, in other embodiments, wall 2309 may be replaced with a second flipper stopper. In some such embodiments, the second flipper stopper may be structured and/or operated in much the same way as flipper stopper 2300. As shown, a sensor 2376 (e.g., a fiber optic sensor) may be used to confirm that a culture plate has been stopped and/or released by flipper stopper 2300. However, in other embodiments, sensor 2376 may be omitted or moved to a different location.

Figure 24:
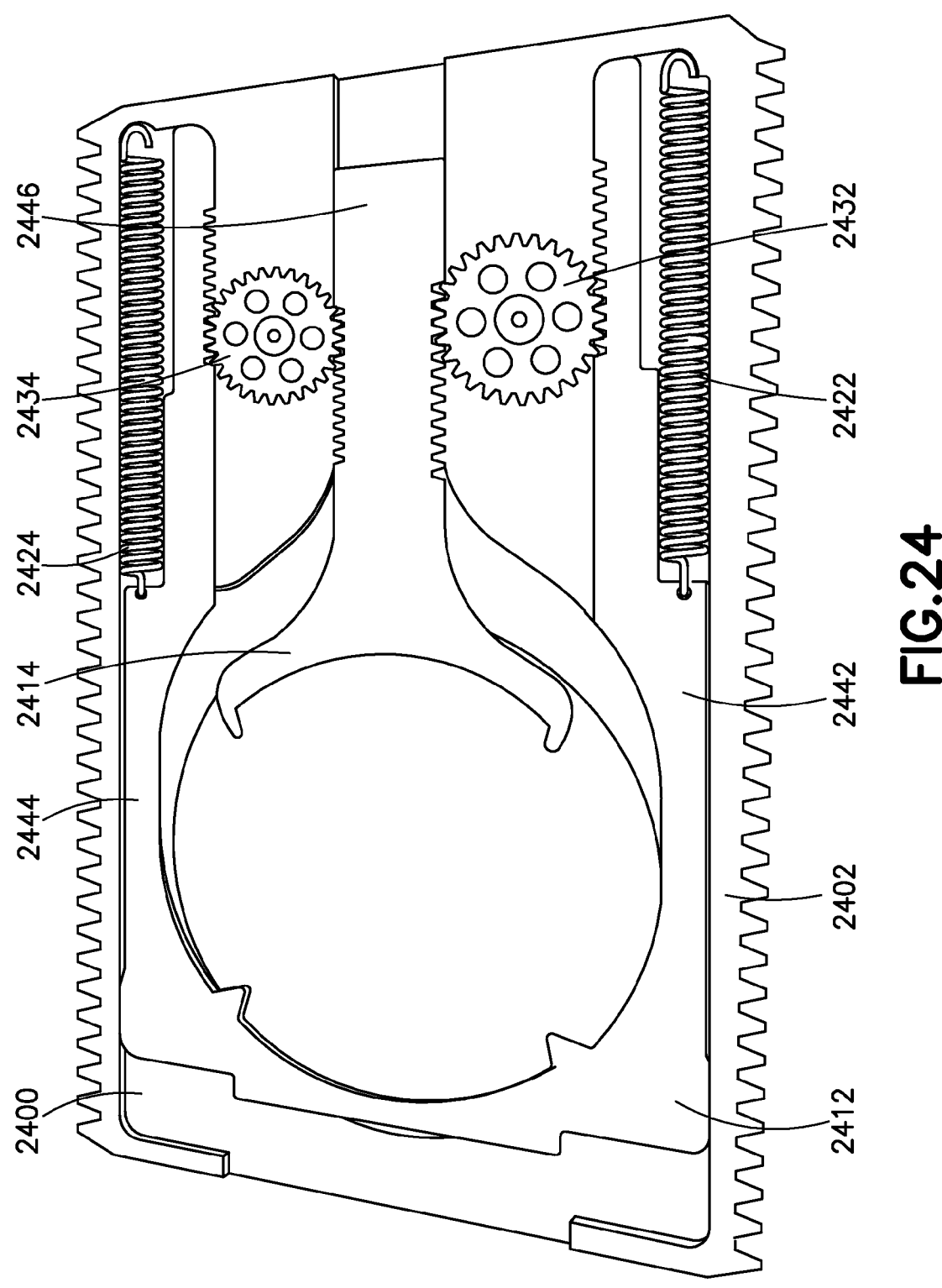
FIG. 24 illustrates a clamping mechanism that may be integrated into an automated stacker and de-stacker.

From the foregoing and with reference to the various figure drawings, those skilled in the art will appreciate that certain modifications can also be made to the present disclosure without departing from the scope of the same. For example, a different clamping mechanism, such as the one illustrated in FIG. 24, can be integrated into any of the automated stackers and de-stackers discussed above (e.g., automated stackers and de-stackers 300, 1100, 1400, 1600, and 1700). As shown, clamping mechanism 2400 includes base 2402, clamp 2412, clamp 2414, spring 2422, spring 2424, gear 2432, and gear 2434. Clamp 2412 includes arms 2442 and 2444. Clamp 2414 includes arm 2446. As shown, arms 2442, 2444, and 2446 include complementary sets of teeth that are configured to mesh together with the teeth of gears 2432 and 2434. During operation, springs 2422 and 2424 pull clamps 2412 and 2424 into a closed position. However, an opposing force may be applied to, for example, arm 2446 of clamp 2414 in order to open clamping mechanism 2400. In some embodiments, the opposing force maybe be applied through the use of an electric motor (e.g., AC motors, DC motors, stepper motors, etc.).

As another example, the shape of the clamping mechanisms described above (e.g., clamping mechanisms 310, 1110, 1410, 1610, and 1710) can be modified. In many of the embodiments discussed above, the clamping mechanisms contacted the culture plates at four different points. However, in other embodiments, the clamping mechanism can, for example, be configured to contact the culture plates at three different points. Similarly, the clamping mechanism can, for example, be configured to contact the culture plates at five different points. Furthermore, in many of the embodiments discussed above, the contact points were along roughly straight edges separated by angular bends. However, in other embodiments, the edges and/or bends may be curved. Similarly, in other embodiments, the contact points may be along a singular curved edge. Moreover, in some embodiments, the contact points may include rollers mounted to the clamps of the clamping mechanism in order to reduce the amount of friction between the clamps and the culture plates.

As yet another example, a sensor can be added to any of the automated stackers and de-stackers discussed above (e.g., automated stackers and de-stackers 300, 1100, 1400, 1600, and 1700) in order to detect the height of incoming culture plates. For example, in some embodiments, the clamping mechanism (e.g., clamping mechanisms 310, 1110, 1410, 1610, and 1710) can be configured to clamp culture plates having heights with a predetermined range.

However, by including a sensor configured to detect the height of incoming culture plates, that range can be expanded. More specifically, the height information obtained from the sensor can be used to adjust the height at which the clamping mechanism closes around a culture plate.

Figure 25:
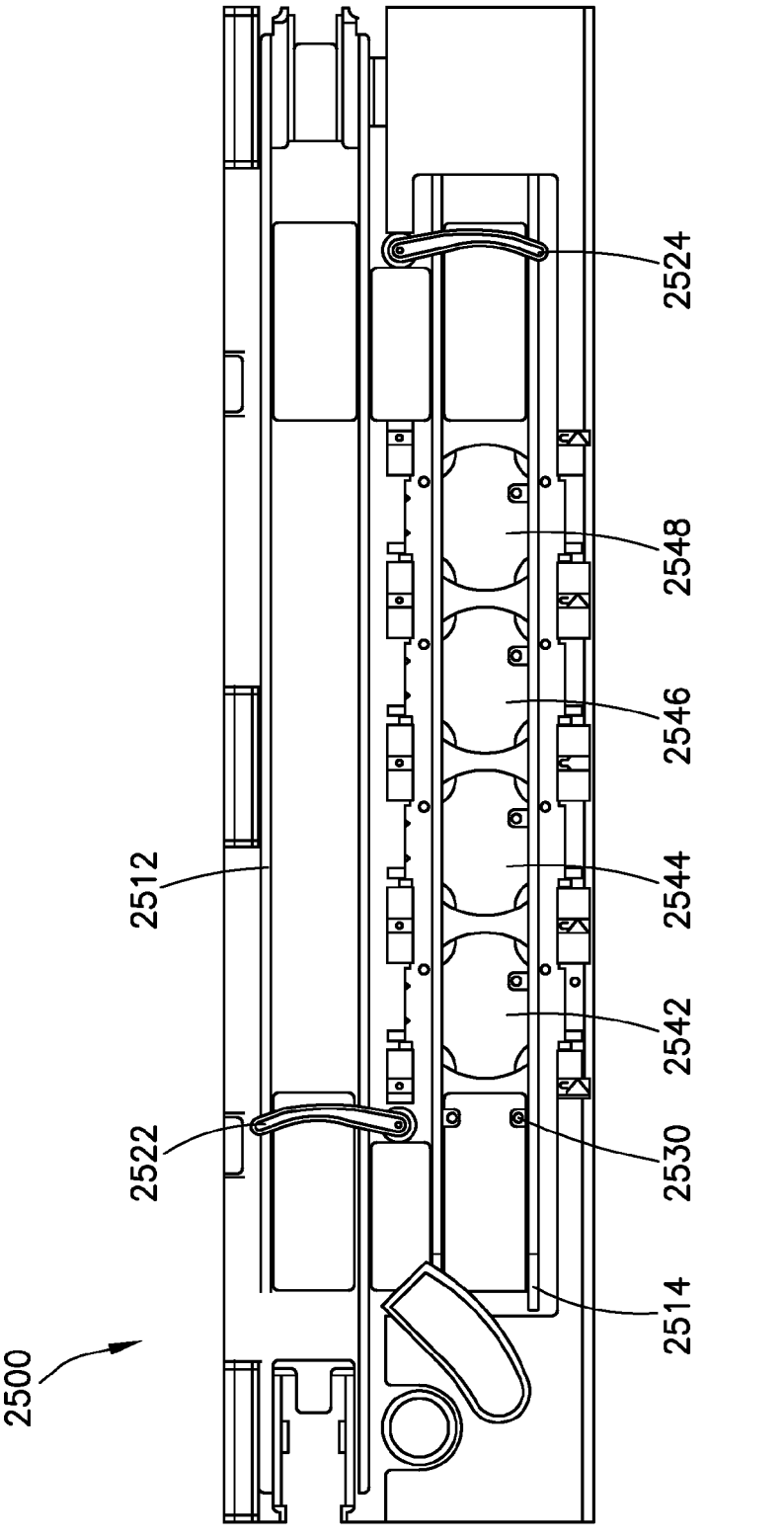
FIG. 25 illustrates an automated specimen processing system with a gate stopper and a plurality of automated stackers and de-stackers.

As yet another example, a gate stopper may be included in any of the automated specimen processing systems described above. For example, as illustrated in FIG. 25, a gate stopper may be included in automated specimen processing system 2500. As shown, automated specimen processing system 2500 includes main track 2512, side track 2514, off-ramp catcher 2522, on-ramp catcher 2524, gate stopper 2530, and automated stackers and de-stackers 2542, 2544, 2546, and 2548. During operation, an incoming culture plate may be transferred from main track 2512 to side track 2514 by off-ramp catcher 2522. Once on side track 2514, the culture plate may be stopped by gate stopper 2530 at a position preceding automated stackers and de-stackers 2542, 2544, 2546, and 2548. This may be done to prevent the incoming culture plate from interfering with the stacking and/or de-stacking of one or more other culture plates. In some embodiments, gate stopper 2530 may be controlled independently from automated stackers and de-stackers 2542, 2544, 2546, and 2548. In other embodiments, one or more motors in automated stackers and de-stackers 2542, 2544, 2546, and/or 2548 may be used to control gate stopper 2530. For example, a motor that controls one or more of the pins of automated stackers and de-stackers 2542, 2544, 2546, and/or 2548 may be used to control gate stopper 2530.

As yet another example, a pusher mechanism could be added to one or more of the cabinets of the automated stackers and de-stackers described above (e.g., cabinets 120A, 130A, 120B, 130B, 140B, 150B, 302, and 1102). A pusher mechanism could be used to automatically push a stack of culture plates out of a cabinet and onto a plate cart of a workbench. In some embodiments, the pusher mechanism could be configured to push all of the culture plates in the cabinet except for the bottom culture plate that is clamped by the clamping mechanism. In other embodiments, the clamping mechanism may be opened and the bottom culture plate may be raised by the lift pad so that the entire stack of culture plates can be pushed out of the cabinet by the pusher mechanism.

Figure 26A:
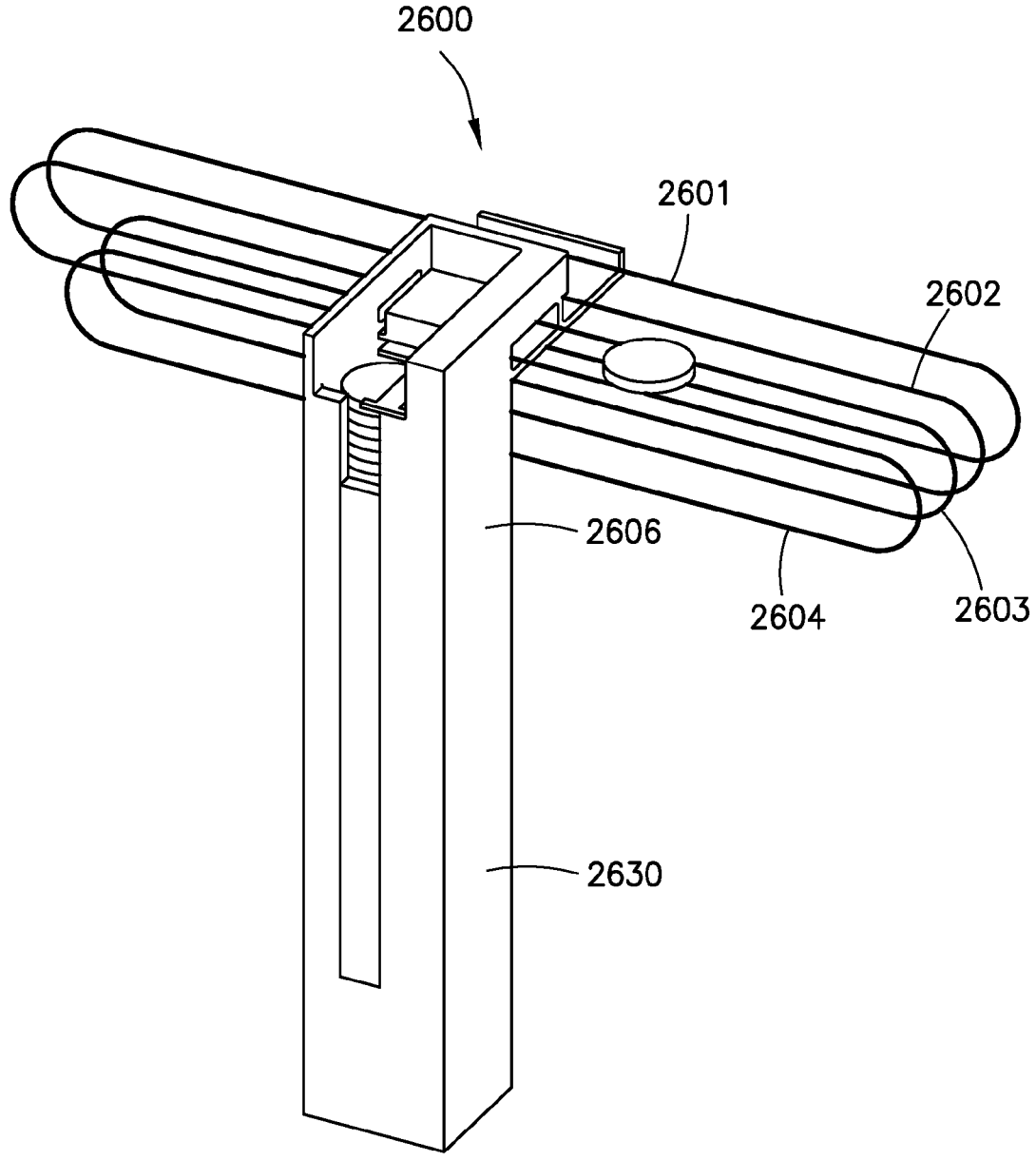
FIGS. 26(*a*) and 26(*b*) illustrate a side-view and a cross-section, respectively, of a cabinet for storing a stack of culture plates and an automated stacker and de-stacker that may be integrated into an automated specimen processing system.
Figure 26B:
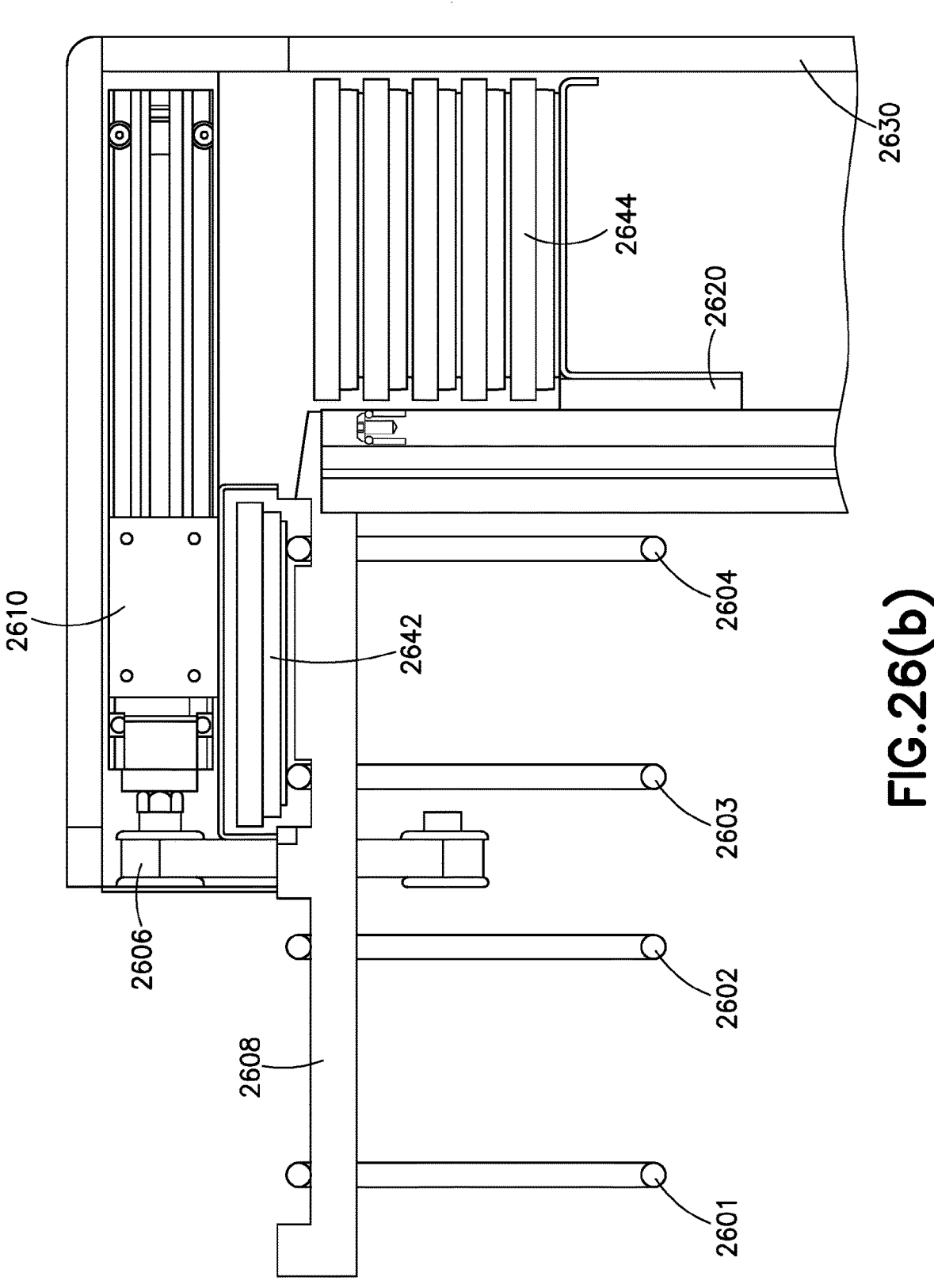

As yet another example, any of the automated stackers and de-stackers discussed above (e.g., automated stackers and de-stackers 300, 1100, 1400, 1600, and 1700) may be reconfigured such that the culture plates are stored beneath the conveyor system. For example, as shown in FIGS. 26(a)-26(b), automated specimen processing system 2600 includes a main track, a side track, automated stacker and de-stacker 2606, and stage 2608. The main track includes belts 2601 and 2602. The side track includes belts 2603 and 2604. Automated stacker and de-stacker 2606 includes actuator 2610, actuator 2620, and cabinet 2630. Actuator 2620 can raise or lower a stack of culture plates (e.g., stack of culture plates 2644) in cabinet 2630. During a stacking operation, actuator 2620 can raise or lower the stack of culture plates such that the top surface of the culture plate at the top of the stack of culture plates is approximately level with a top surface of stage 2608. Furthermore, actuator 2610 can slide a culture plate (e.g., culture plate 2642) off of belts 2603 and 2604 of the side track and onto the stack of culture plates. During a de-stacking operation, actuator 2620 can raise or lower the stack of culture plates such that the top surface of the culture plate second from the top of the stack of culture plates is approximately level with a top surface of stage 2608. Furthermore, actuator 2610 can slide the culture plate at the top of the stack of culture plates onto belts 2603 and 2604 of the side track.

In contrast to some of the embodiments discussed above, the embodiment of FIGS. 26(a)-26(b) requires less accuracy because the culture plates do not need to be clamped within a predetermined range of heights. However, in this embodiment, an actuator is included in the cabinet housing the stack of culture plates. As a result, the cabinet is wider and has a larger footprint. Furthermore, the embodiment of FIGS. 26(a)-26(b) does not split the interlocking rims on the lids and the bases of the culture plates. Therefore, a significant amount of force (e.g., 110 newtons) may need to be applied during a de-stacking operation.

Figure 27:
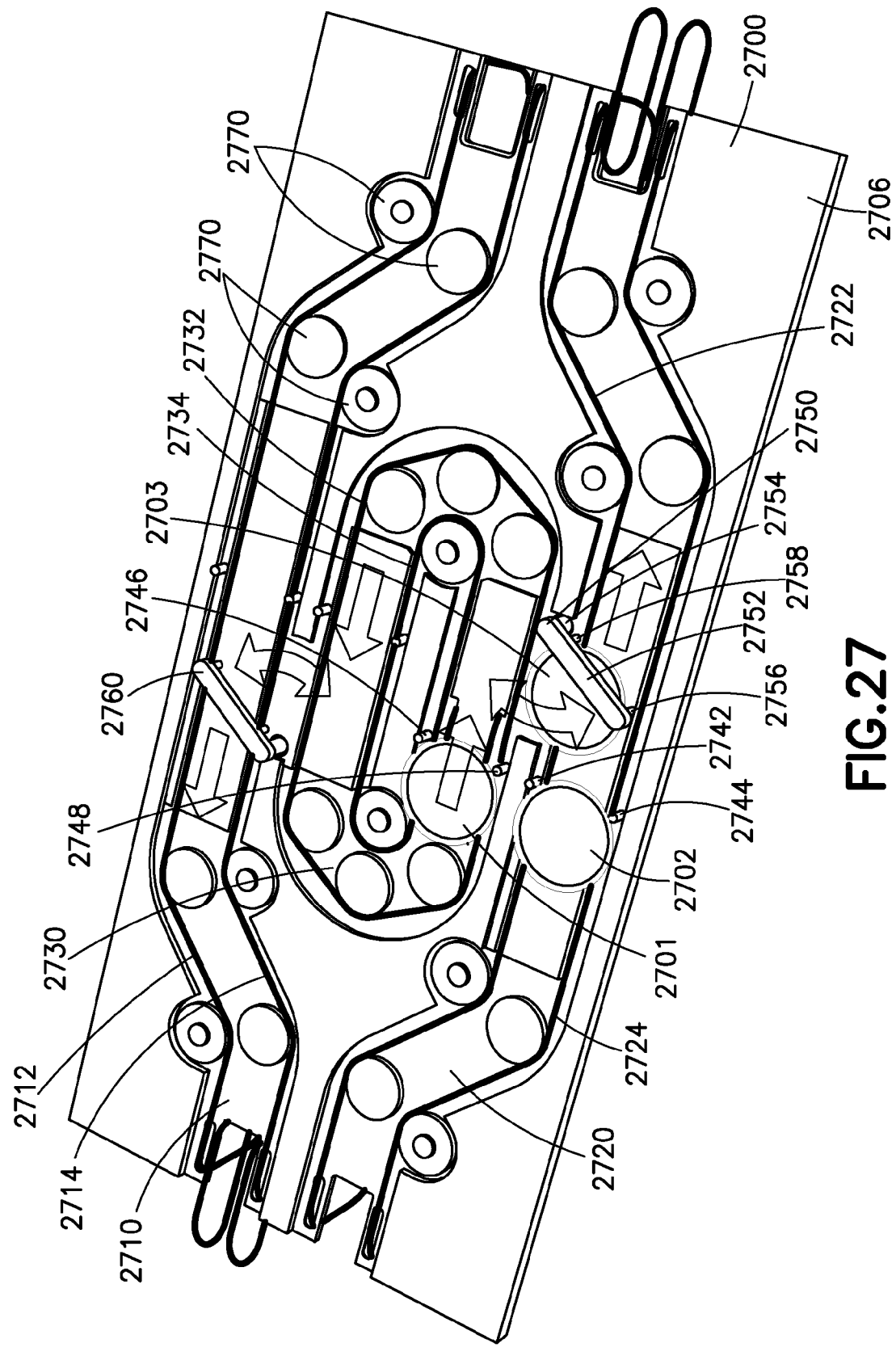
FIG. 27 illustrates a conveyor system that may be integrated into an automated specimen processing system.
Figure 28A:
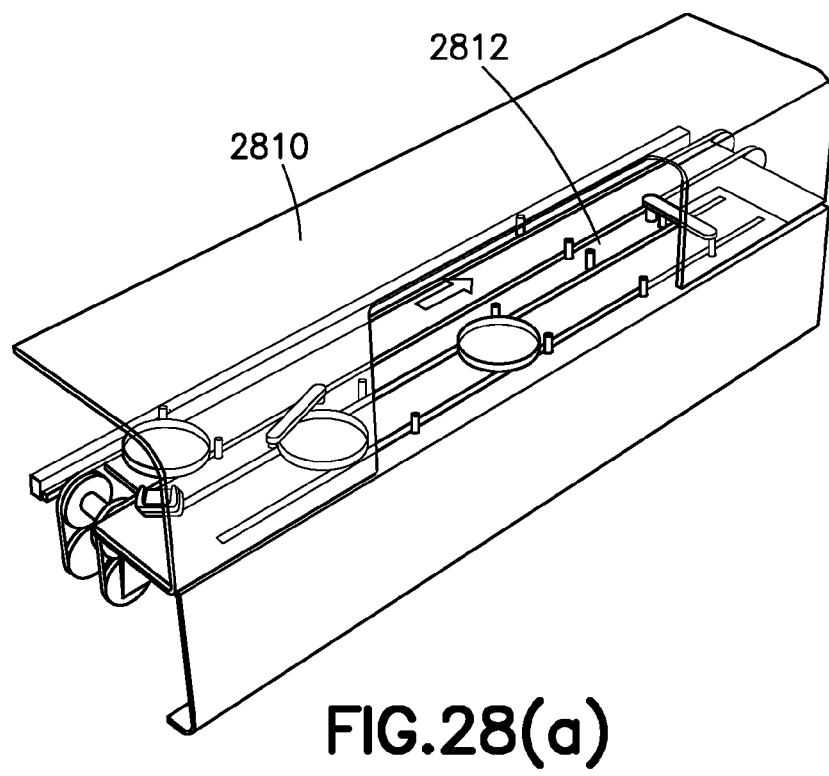
FIGS. 28(*a*)-28(*f*) illustrate different modules that may be integrated into an automated specimen processing system. More specifically, FIG. 28(*a*) illustrates a two-way highway module.
Figure 28B:
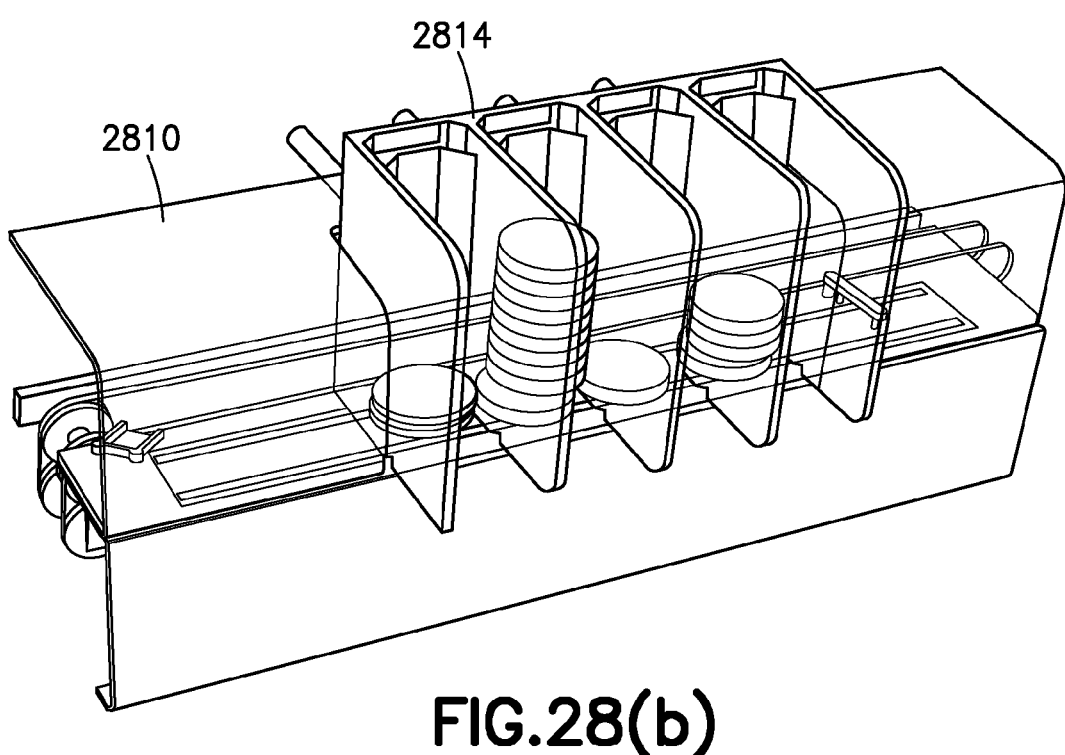
Figure 28C:
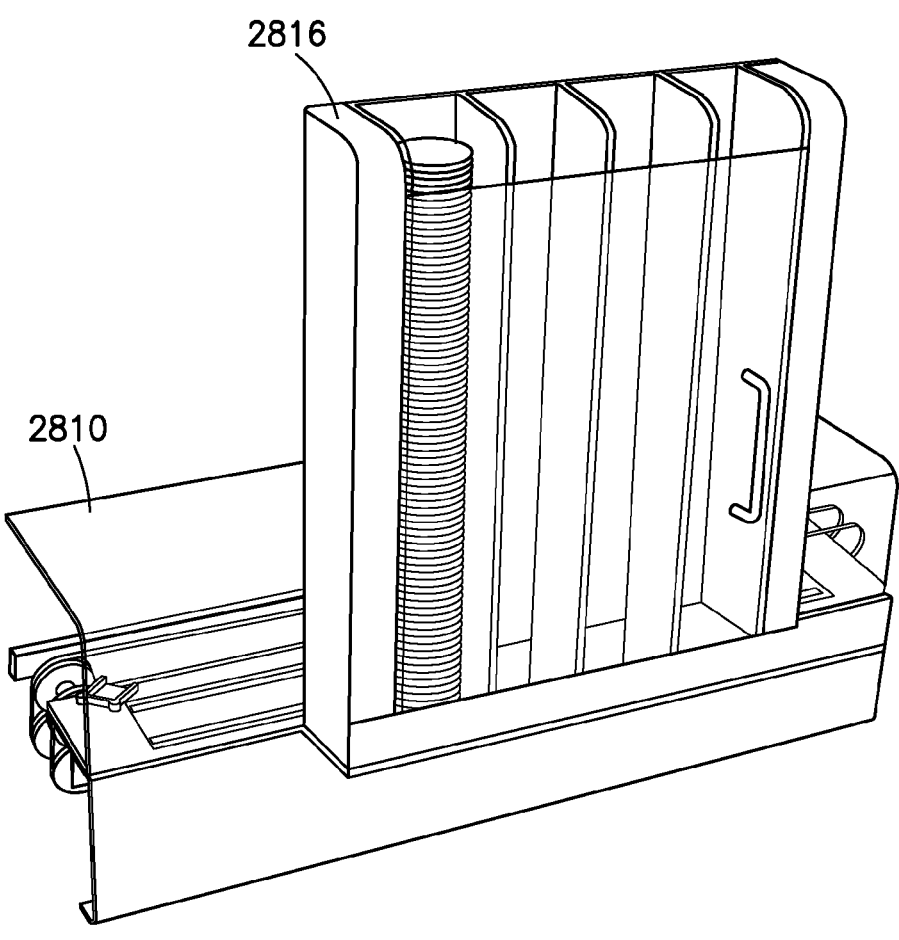
Figure 28D:
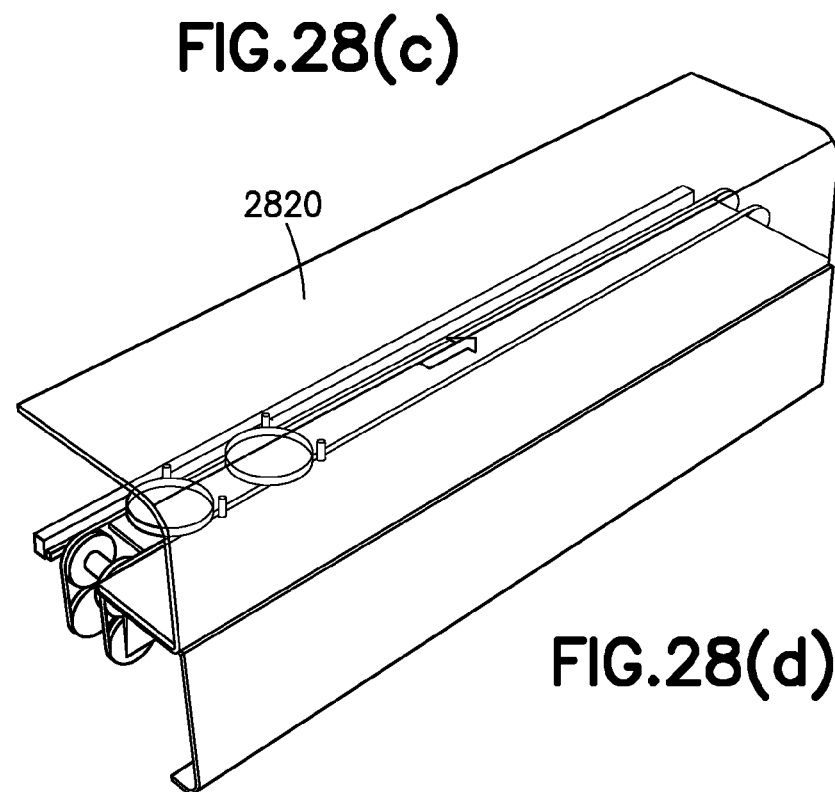
Figure 28E:
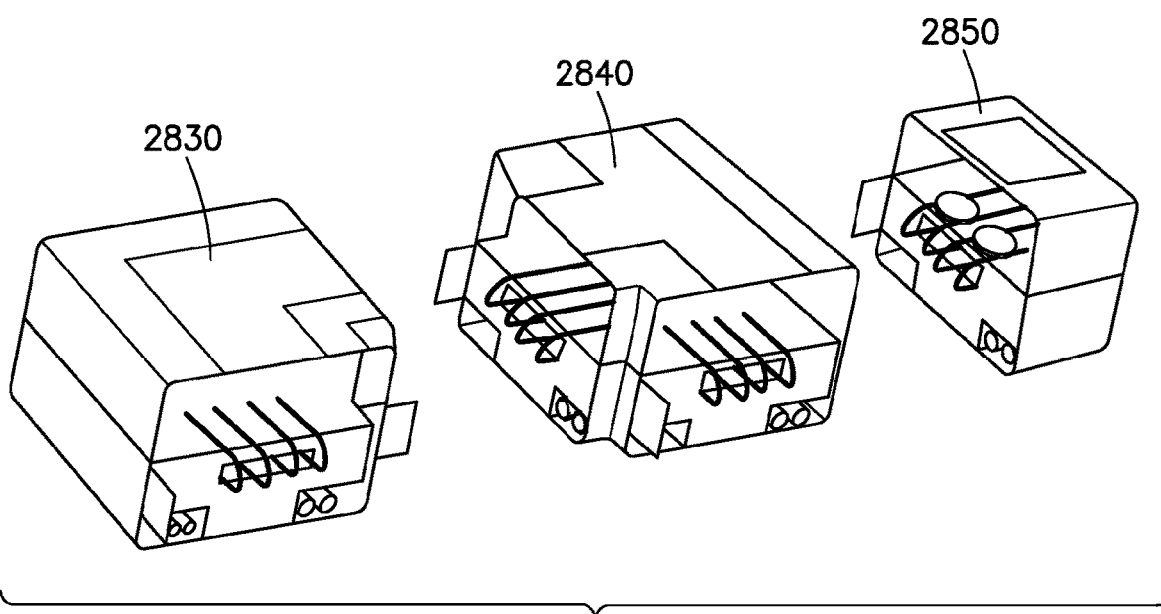
Figure 28F:
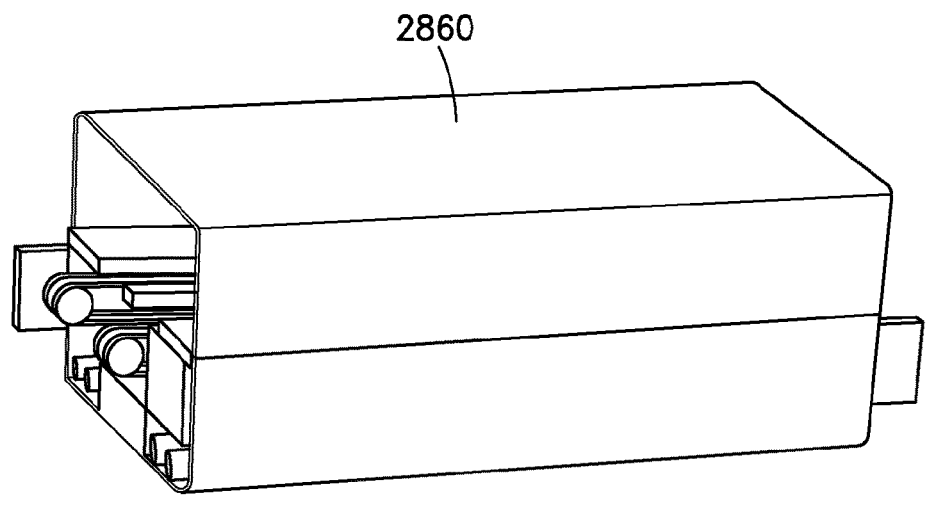

As yet another example, any of the conveyor systems discussed above (e.g., conveyor systems 110A, 110B, and 200) may be modified to include a shortcut. For example, as shown in FIG. 27, a conveyor system 2700 may include a stage 1706, a main track 2710 having belts 2712 and 2714, a side track 2720 having belts 2722 and 2724, a transfer track 2730 having belts 2732 and 2734, pin 2742, pin 2744, pin 2746, pin 2748, transfer mechanism 2750, transfer mechanism 2760, and wheels 2770. Wheels 2770 are included in conveyor system 2700 to bend portions of main track 2710, side track 2720, and transfer track 2730. In other embodiments, one or more of the wheels 2770 may be added or removed.

As shown in FIG. 27, a culture plate 2701 is prevented from further traveling along transfer track 2730 by pins 2746 and 2748, a culture plate 2702 is prevented from further traveling along side track 2720 by pins 2742 and 2744, and a culture plate 2703 is being transferred from side track 2720 to transfer track 2730 by transfer mechanism 2750. Transfer mechanism 2750 includes arm 2752, pivot joint 2754, post 2756, and post 2758. As shown, posts 2756 and 2758 contact culture plate 2703. Furthermore, arm 2752 is supported by pivot joint 2754 at a height exceeding the height of culture plate 2703. As a result, a portion of culture plate 2703 is positioned beneath arm 2752. While culture plate 2703 is positioned in this manner, arm 2752 is rotated clockwise about pivot joint 2754. This rotation of arm 2752 causes posts 2756 and 2758 to push culture plate 2703 from side track 2720 to transfer track 2730. In some embodiments, this process may involve rotating arm 2752 clockwise until it is approximately perpendicular with side track 2720 and/or transfer track 2730 (e.g., within 30 degrees of this position).

A similar operation may be performed to transfer another culture plate, such as culture plate 2701 from transfer track 2730 to side track 2720. For example, after culture plate 2703 is transferred to transfer track 2730, arm 2752 may remain at a position that is approximately perpendicular with side track 2720 and/or transfer track 2730 and pins 2746 and 2748 may be lowered beneath stage 2706. As a result, culture plate 2701 will travel along transfer track 2730 until it contacts posts 2756 and 2758. While culture plate 2701 is positioned in this manner, arm 2752 is rotated counterclockwise about pivot joint 2754. This rotation of arm 2752 causes posts 2756 and 2758 to push culture plate 2701 from transfer track 2730 to side track 2720. In some embodiments, this process may involve rotating arm 2752 counterclockwise until it is approximately perpendicular with side track 2720 and/or transfer track 2730.

After transferring a culture plate between side track 2720 and transfer track 2730, arm 2752 may be rotated to a neutral position in which it is approximately parallel with side track 2720 and/or transfer track 2730. While arm 2752 is in this neutral position, it does not interfere with culture plates traveling along side track 2720 and/or transfer track 2730.

Transfer mechanism 2760 may operate in much the same way transfer mechanism 2750 to transfer culture plates between main track 2710 and transfer track 2730. Furthermore, transfer mechanism 2760 may be rotated to a neutral position in which it is approximately parallel with main track 2710 and/or transfer track 2730. Collectively, transfer track 2730, transfer mechanism 2750, and transfer mechanism 2760 provide a shortcut for transferring culture plates between main track 2710 and side track 2720. In automated specimen processing systems comprising a plurality of modules, this shortcut may expedite the processing of biological samples by reducing the time spent transferring those samples between the plurality of modules.

In other embodiments, the structure of transfer mechanisms 2750 and/or 2760 may be modified. For example, post 2758 may be removed from transfer mechanisms 2750. In such embodiments, transfer mechanisms 2750 may be structured much like off-ramp catcher 1850. As another example, additional posts and/or structures for contacting culture plates may be added to transfer mechanism 2750. As yet another example, the shape of arm 2752 of transfer mechanisms 2750 may be modified. For example, arm 2752 may be curved much like off-ramp catcher 252 or on-ramp catcher 254.

As yet another example, any of the mechanisms described above may be integrated into any of the modules illustrated in FIGS. 28(*a*)-28(*f*). FIG. 28(*a*) illustrates a two-way highway module 2810 with an opening 2812. As shown in FIGS. 28(*b*) and 28(*c*), opening 2812 may provide an interface for a variety of different mechanisms. For example, an automated output stacker 2814 or an automated stacker and de-stacker 2816 may be coupled to module 2810 through interface 2812. Module 2810 may include a conveyor system that is structured and/or operated much like conveyor system 200. FIG. 28(*d*) illustrates a one-way highway module 2820. Module 2820 may only include a single conveyor track. FIG. 28(*e*) illustrates a 90-degree turn module 2830, a T-intersection module 2840, and a 180-degree turn module 2850. Module 2830 may include one or more conveyor tracks with a 90-degree turn. Module 2840 may include a T-intersection between a plurality of conveyor tracks. Module 2850 may include one or more conveyor tracks with a 180-degree turn. FIG. 28(*f*) illustrates a shortcut module 2860. Module 2860 may include a conveyor system that is structured and/or operated much like conveyor system 2700.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. An automated stacker and de-stacker comprising:
a lift pad;
a clamping mechanism comprising two or more clamps; and
one or more processors for controlling the lift pad and the clamping mechanism,
wherein the one or more processors are configured to control the lift pad and the clamping mechanism to stack a first culture plate by:

raising the lift pad along with the first culture plate resting atop the lift pad until a top surface of a lid of the first culture plate touches or is proximate to a bottom surface of a base of a second culture plate at the bottom of a first stack of culture plates;
opening the clamping mechanism;
further raising the lift pad along with the first culture plate and the first stack of culture plates supported thereon; and
closing the clamping mechanism such that the two or more clamps contact a base of the first culture plate, and
wherein the one or more processors are configured to control the lift pad and the clamping mechanism to de-stack a third culture plate by:
raising the lift pad until a top surface of the lift pad touches or is proximate to a bottom surface of a base of the third culture plate;
opening the clamping mechanism;
lowering the lift pad along with the third culture plate and a second stack of culture plates supported thereon;
closing the clamping mechanism such that the two or more clamps contact a base of a fourth culture plate within the second stack of culture plates and that is resting atop a lid of the third culture plate; and
further lowering the lift pad to carry the third culture plate away from the second stack of culture plates, and
wherein a force applied to the first and fourth culture plates by the clamping mechanism after the clamping mechanism closes is small enough to permit the first and fourth culture plates to slide downwards until the lid of the first culture plate and a lid of the fourth culture plate contacts the two or more clamps.

2. The automated stacker and de-stacker of claim 1, wherein the one or more processors are configured to control the lift pad and the clamping mechanism by controlling one or more electric motors.

3. The automated stacker and de-stacker of claim 1, wherein each of the two or more clamps of the clamping mechanism comprise two edges positioned at an angle between 80 and 160 degrees relative to each other, and wherein each of the two edges contact the bases of the first and fourth culture plates at different contact points.

4. An automated specimen processing system comprising:
an automated stacker and de-stacker comprising:
a lift pad;
a clamping mechanism comprising two or more clamps, each clamp comprising two edges; and
one or more processors for controlling the lift pad and the clamping mechanism,
wherein the one or more processors are configured to control the lift pad and the clamping mechanism to stack a first culture plate by:
raising the lift pad along with the first culture plate resting atop the lift pad until a top surface of a lid of the first culture plate touches or is proximate to a bottom surface of a base of a second culture plate at the bottom of a first stack of culture plates;
opening the clamping mechanism;
further raising the lift pad along with the first culture plate and the first stack of culture plates supported thereon; and
closing the clamping mechanism such that the clamping mechanism contacts a base of the first culture plate, and wherein the one or more processors are configured to control the lift pad and the clamping mechanism to de-stack a third culture plate by:

raising the lift pad until a top surface of the lift pad touches or is proximate to a bottom surface of a base of the third culture plate;

opening the clamping mechanism;

lowering the lift pad along with the third culture plate and a second stack of culture plates supported thereon;

closing the clamping mechanism such that the two or more clamps contact a base of a fourth culture plate within the second stack of culture plates and that is resting atop a lid of the third culture plate; and further lowering the lift pad to carry the third culture plate away from the second stack of culture plates; and a conveyor system comprising a track configured to transport culture plates to and from the automated stacker and de-stacker, wherein the further lowering of the lift pad to carry the third culture plate away from the second stack of culture plates comprises lowering the lift pad to a position beneath the track and consequently placing the third culture plate on the track; and wherein a force applied to the first and fourth culture plates by the clamping mechanism after it closes is small enough to permit the first and fourth culture plates to slide downwards until the lid of the first culture plate and a lid of the fourth culture plate contacts the two or more clamps.

5. The automated specimen processing system of claim 4, wherein the lift pad comprises a shield configured to stop other culture plates traveling along the track while the lift pad is raised above the track.

6. The automated specimen processing system of claim 4, wherein the automated stacker and de-stacker is in coopera-tive communication with a stopping mechanism comprising one or more pins, wherein the one or more processors of the automated stacker and de-stacker are further configured to control the one or more pins for stacking the first culture plate by raising the one or more pins above the track to stop the first culture plate from continuing to travel along the track at a position above the lift pad, and wherein the one or more processors of the automated stacker and de-stacker are further configured to control the one or more pins for de-stacking the third culture plate by lowering the one or more pins below the track to permit the third culture plate to travel along the track.

7. The automated specimen processing system of claim 6, wherein at least one motor is coupled to the one or more pins and the lift pad such that the one or more processors can control the one or more pins and the lift pad by controlling the at least one motor.

8. The automated specimen processing system of claim 6, wherein the one or more pins contact the base of the first culture plate, but not the lid of the first culture plate, when stopping the first culture plate from continuing to travel along the track.

9. The automated specimen processing system of claim 4, wherein the automated stacker and de-stacker is in coopera-tive communication with a flipper stopper comprising at least one flipper having two or more edges separated by a bend, wherein the one or more processors of the automated stacker and de-stacker are further configured to control the flipper stopper for stacking the first culture plate by rotating the at least one flipper to stop the first culture plate as it travels along the track at a position above the lift pad, and wherein the one or more processors of the automated stacker and de-stacker are further configured to control the flipper stopper for de-stacking the third culture plate by rotating the at least one flipper to permit the third culture plate to travel along the track.

10. The automated specimen processing system of claim 9, wherein the at least one flipper is rotated by a pair of actuators when the pair of actuators apply opposing forces to separate portions of the flipper.

11. The automated specimen processing system of claim 9, wherein the at least one flipper is rotated by a moving magnet actuator.

12. The automated specimen processing system of claim 9, wherein the at least one flipper is coupled to a shaft disposed in a slot defined in a housing or a guide structure.

13. A method comprising:

positioning a first culture plate beneath a stack of culture plates and above a lift pad;

raising the lift pad along with the first culture plate resting atop the lift pad until a top surface of a lid of the first culture plate touches or is proximate to a bottom surface of a base of a second culture plate at the bottom of the stack of culture plates;

opening a clamping mechanism comprising two or more clamps;

further raising the lift pad along with the first culture plate and the stack of culture plates supported thereon; and closing the clamping mechanism such that the two or more clamps contact a base of the first culture plate, wherein a force applied to the first culture plate by the clamping mechanism after it closes is small enough to permit the first culture plate to slide downwards until the lid of the first culture plate contacts the two or more clamps.

14. The method of claim 13, further comprising:

raising the lift pad until a top surface of the lift pad touches or is proximate to a bottom surface of a base of a third culture plate;

opening the clamping mechanism a second time;

lowering the lift pad along with the third culture plate and a second stack of culture plates supported thereon;

closing the clamping mechanism such that the two or more clamps contact a base of a fourth culture plate within the second stack of culture plates, wherein the fourth culture plate is resting atop a lid of the third culture plate; and further lowering the lift pad to separate the third culture plate from the second stack of culture plates.

15. A method comprising:

raising a lift pad until a top surface of the lift pad touches or is proximate to a bottom surface of a base of a first culture plate at the bottom of a stack of culture plates;

opening a clamping mechanism comprising two or more clamps;

lowering the lift pad along with the first culture plate and the stack of culture plates supported thereon;

closing the clamping mechanism such that the two or more clamps contact a base of a second culture plate within the stack of culture plates, wherein the second culture plate is resting atop a lid of the first culture plate, and wherein a force applied to the second culture plate by the clamping mechanism after it closes is small enough to permit the second culture plate to slide downwards until a lid of the second culture plate contacts the two or more clamps; and further lowering the lift pad to separate the first culture
plate from the stack of culture plates.

* * * * *